United States Patent
Dane et al.

(10) Patent No.: US 8,660,175 B2
(45) Date of Patent: Feb. 25, 2014

(54) SELECTIVE DISPLAY OF INTERPOLATED OR EXTRAPOLATED VIDEO UNITS

(75) Inventors: Gokce Dane, San Diego, CA (US); Khaled Helmi El-Maleh, San Diego, CA (US); Min Dai, Encinitas, CA (US); Chia-Yuan Teng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1336 days.

(21) Appl. No.: 12/111,782

(22) Filed: Apr. 29, 2008

(65) Prior Publication Data

US 2009/0147854 A1  Jun. 11, 2009

Related U.S. Application Data

(60) Provisional application No. 61/012,703, filed on Dec. 10, 2007.

(51) Int. Cl.
*H04N 7/12* (2006.01)

(52) U.S. Cl.
USPC ..................... 375/240.02; 370/241

(58) Field of Classification Search
None
See application file for complete search history.

(56) References Cited

U.S. PATENT DOCUMENTS

| | | | |
|---|---|---|---|
| 5,642,170 A | 6/1997 | Hackett et al. | |
| 6,075,918 A | 6/2000 | Strongin et al. | |
| 6,192,079 B1 | 2/2001 | Sharma et al. | |
| 6,208,760 B1 | 3/2001 | De Haan et al. | |
| 7,088,774 B1 | 8/2006 | Moni et al. | |
| 2001/0017889 A1 | 8/2001 | Borer | |
| 2003/0202605 A1* | 10/2003 | Hazra et al. | 375/240.26 |
| 2004/0101058 A1 | 5/2004 | Sasai et al. | |
| 2004/0189867 A1 | 9/2004 | Pelagotti et al. | |
| 2004/0208246 A1 | 10/2004 | Conklin | |

(Continued)

FOREIGN PATENT DOCUMENTS

| | | |
|---|---|---|
| CN | 1515111 A | 7/2004 |
| EP | 1422928 A2 | 5/2004 |

(Continued)

OTHER PUBLICATIONS

Eden A: "No-Reference Estimation of the Coding PSNR for H.264-coded Sequences" IEEE Transactions on Consumer Electronics, IEEE Service Center, New York, NY, US, vol. 53, No. 2, May 1, 2007, pp. 667-674, XP011186792.

(Continued)

*Primary Examiner* — Kevin C Harper
(74) *Attorney, Agent, or Firm* — Brent Boyd

(57) ABSTRACT

Display of an interpolated or extrapolated video unit, such as a video frame, may be selectively enabled based on a quality analysis. This disclosure also describes selection of reference video frames to be used for interpolation or extrapolation. A decoder may apply a quality-focused mode to select a reference frame based on quality criteria. The quality criteria may indicate a level of quality likely to be produced by a reference frame. If no reference frames satisfy the quality criteria, interpolation or extrapolation may be disabled. A decoder may apply a resource-focused frame interpolation mode to enable or disable frame interpolation or extrapolation for some frames based on power and quality considerations. In one mode, frame interpolation may be disabled to conserve power when reference frames are not likely to produce satisfactory quality. In another mode, the threshold may be adjustable as a function of power saving requirements of the decoder.

30 Claims, 17 Drawing Sheets

(56) References Cited

U.S. PATENT DOCUMENTS

| | | |
|---|---|---|
| 2004/0218669 A1 | 11/2004 | Hannuksela |
| 2004/0246374 A1 | 12/2004 | Mishima et al. |
| 2004/0252759 A1 | 12/2004 | Winder et al. |
| 2005/0100235 A1* | 5/2005 | Kong et al. .................. 382/261 |
| 2006/0002465 A1 | 1/2006 | Raveendran et al. |
| 2006/0017843 A1 | 1/2006 | Shi et al. |
| 2006/0039471 A1 | 2/2006 | Dane et al. |
| 2006/0045365 A1 | 3/2006 | De Haan et al. |
| 2006/0067407 A1 | 3/2006 | Kitamura |
| 2006/0165176 A1* | 7/2006 | Raveendran et al. .... 375/240.16 |
| 2006/0165716 A1 | 7/2006 | Telford et al. |
| 2006/0188019 A1* | 8/2006 | Lin .......................... 375/240.16 |
| 2006/0233253 A1* | 10/2006 | Shi et al. .................. 375/240.16 |
| 2006/0268991 A1 | 11/2006 | Segall et al. |
| 2007/0071100 A1 | 3/2007 | Shi et al. |
| 2007/0074251 A1 | 3/2007 | Oguz et al. |
| 2007/0242748 A1 | 10/2007 | Mahadevan et al. |
| 2007/0268965 A1 | 11/2007 | Alfonso et al. |
| 2008/0025390 A1* | 1/2008 | Shi et al. .................. 375/240.02 |
| 2008/0055311 A1 | 3/2008 | Aleksic et al. |
| 2008/0063067 A1 | 3/2008 | Hirayama et al. |
| 2008/0084491 A1 | 4/2008 | He et al. |
| 2009/0147853 A1 | 6/2009 | Dane et al. |
| 2009/0148058 A1 | 6/2009 | Dane et al. |
| 2009/0231314 A1 | 9/2009 | Hanaoka et al. |
| 2011/0129015 A1* | 6/2011 | Nguyen et al. ........... 375/240.16 |

FOREIGN PATENT DOCUMENTS

| | | |
|---|---|---|
| GB | 2305569 | 4/1997 |
| JP | 11513541 A | 11/1999 |
| JP | 2004297719 A | 10/2004 |
| JP | 2005006275 A | 1/2005 |
| JP | 2005223454 A | 8/2005 |
| JP | 2005538630 A | 12/2005 |
| JP | 2006504175 A | 2/2006 |
| JP | 2007189704 A | 7/2007 |
| JP | 2007311843 A | 11/2007 |
| KR | 20050061556 A | 6/2005 |
| KR | 20090007437 A | 1/2009 |
| WO | 9711557 A1 | 3/1997 |
| WO | 2004025958 A1 | 3/2004 |
| WO | WO2004039074 | 5/2004 |
| WO | 2006023789 | 3/2006 |
| WO | WO2007121342 | 10/2007 |

OTHER PUBLICATIONS

International Search Report and Written Opinion—PCT/US2008/086282, International Search Authority—European Patent Office—May 13, 2009.

Paolo Gastaldo et al: "Objective Quality Assessment of MPEG-2 Video Streams by Using CBP Neural Networks" IEEE Transactions on Neural Networks, IEEE Service Center, Piscataway, NJ, US, vol. 13, No. 4, Jul. 1, 2002, XP011077278.

Wu H R et al: "Video Coding Distortion Classification and Quantitative Impairment Metrics" Signal Processing, 1996., 3rd International conference on beijing, china, Oct. 14-18, 1996, vol. 2, Oct. 14, 1996, pp. 962-965, XP010209488.

Castagno, R. et al., "A Method for Motion Adaptive Frame Rate Up-Conversion," p. 1-24, D.E.E.I, University of Trieste, Italy.

Sasai, Hisao et al., "Frame-Rate Up-Conversion Using Reliable Analysis of Transmitted Motion Information," ICASSP 2004, p. V-257-V260, 2004.

Zhai, Jiefu et al., "A Low Complexity Motion Compensated Frame Interpolation Method," 2005 IEEE, p. 4927-4930, 2005.

Taiwan Search Report—TW097148036—TIPO—May 25, 2012.

* cited by examiner

SELECTIVE DISPLAY OF INTERPOLATED OR EXTRAPOLATED VIDEO UNITS

This application claims the benefit of U.S. provisional application No. 61/012,703, filed Dec. 10, 2007, the entire content of which is incorporated herein by reference.

TECHNICAL FIELD

The disclosure relates to digital video coding and, more particularly, techniques for video frame interpolation or extrapolation.

BACKGROUND

A number of video encoding techniques have been developed for encoding digital video sequences. The Moving Picture Experts Group (MPEG), for example, has developed several techniques including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support efficient transmission of video sequences by encoding data in a compressed manner. Compression reduces the overall amount of data that needs to be transmitted.

Video compression may involve spatial and/or temporal prediction to reduce redundancy inherent in video sequences. Intra-coding uses spatial prediction to reduce spatial redundancy between video blocks within the same video frame. Inter-coding uses temporal prediction to reduce temporal redundancy between video blocks in successive video frames. For inter-coding, a video encoder performs motion estimation to generate motion vectors indicating displacement of video blocks relative to corresponding prediction video blocks in one or more reference frames. The video encoder performs motion compensation to generate a prediction video block from the reference frame, and forms a residual video block by subtracting the prediction video block from the original video block being coded.

To meet low bandwidth requirements, some video applications may encode video at a reduced frame rate and/or skip encoding of some frames. Unfortunately, low frame rate video can produce temporal artifacts in the form of motion jerkiness. Frame interpolation or extrapolation may be employed at the decoder side to approximate the content of frames that are skipped by the encoder, or frames that are beyond the basic frame rate produced by the encoder. Frame interpolation or extrapolation may generally be referred to as frame substitution. Frame substitution may be used, in effect, to upconvert an actual frame rate to provide a perception of smoother motion. Frame substitution may be used to support a process often referred to as frame rate up conversion (FRUC). Although FRUC may enhance temporal quality by substituting frames, e.g., using interpolation or extrapolation, substitution of some frames may introduce undesirable spatial artifacts that undermine visual quality.

SUMMARY

This disclosure is directed to techniques for selecting one or more reference video units to be used for substitution of a video unit, e.g., by interpolation or extrapolation. The video units may be video frames, slices, blocks, or other units. A video coder may apply a quality-focused video mode to select a reference video unit based on analysis of one or more quality criteria. The quality criteria may indicate, for example, a level of interpolation or extrapolation quality likely to be produced by a selected reference video unit. Quality criteria may include spatial and/or temporal visual quality. If none of the reference video units satisfies applicable quality criteria, substitution may be disabled for a particular video unit to be added.

A video coder may apply a resource-focused video mode to selectively enable or disable substitution for some video units based on a motion level of the video sequence. If one or more reference video units are generally static, the video decoder or another device may disable substitution, thereby conserving resources such as power, computing and/or memory resources. The motion level may be compared to a threshold, which may be fixed or adjustable as a function of a level of available resources. If the reference video units include substantial motion, the video decoder or another device may enable substitution, e.g., using quality criteria for selection of reference video units.

For delay-sensitive video applications, such as video telephony, a video coder or another device may be configured to select video reference video units to reduce processing and presentation delay. For example, when selecting future reference video units, a video coder may be configured to select reference video units based on distance from a video unit to be added. A video coder also may be configured to analyze one or more quality characteristics associated with a video unit that has been interpolated or extrapolated, and selectively enable or disable display of the video unit based on the analysis, thereby conserving resources needed to display the additional video unit in some cases.

In one aspect, the disclosure provides a method comprising analyzing at least one characteristic of one or more candidate reference video units, and selecting one or more of the candidate reference video units as a reference video unit for interpolation or extrapolation of an additional video unit based at least in part on the analysis.

In another aspect, the disclosure provides a device comprising an analysis unit that analyzes at least one characteristic of one or more candidate reference video units, and a selection unit that selects one or more of the candidate reference video units as a reference video unit for interpolation or extrapolation of an additional video unit based at least in part on the analysis.

In an additional aspect, the disclosure provides a method comprising analyzing a motion level of one or more candidate reference video units for interpolation or extrapolation of an additional video unit, determining a resource level for interpolation or extrapolation of the additional video unit, and selectively disabling interpolation or extrapolation of the additional video unit based on the motion level and the resource level.

In a further aspect, the disclosure provides device comprising a motion analyzer configured to analyze a motion level of one or more candidate reference video units for interpolation or extrapolation of an additional video unit, a resource monitor configured to determine a resource level for interpolation or extrapolation of the additional video unit, and a selection unit that selectively disables interpolation or extrapolation of the additional video unit based on the motion level and the resource level.

In another aspect, the disclosure provides a video decoding device comprising an analysis unit that analyzes one or more characteristics associated with an interpolated or extrapolated video unit produced by a frame rate upconversion process, and a control unit that selectively disables presentation of the interpolated or extrapolated video unit on a display based on the analysis.

In an additional aspect, the disclosure provides a method comprising analyzing one or more characteristics associated with an interpolated or extrapolated video unit produced by a frame rate upconversion process, and selectively disabling presentation of the interpolated or extrapolated video unit on a display based on the analysis.

The techniques described in this disclosure may be implemented in hardware, software, firmware, or a combination thereof. If implemented in software, the software may be executed by one or more processors. The software may be initially stored in a computer readable medium and loaded by a processor for execution. Accordingly, this disclosure contemplates computer-readable media comprising instructions to cause one or more processors to perform techniques as described in this disclosure.

For example, in some aspects, the disclosure provides a computer-readable medium comprising instructions to cause one or more processors to analyze at least one characteristic of one or more candidate reference video units, and select one or more of the candidate reference video units as a reference video unit for interpolation or extrapolation of an additional video unit based at least in part on the analysis.

In other aspects, the disclosure provides a computer-readable medium comprising instructions to cause one or more processors to analyze a motion level of one or more candidate reference video units for interpolation or extrapolation of an additional video unit, determine a resource level for interpolation or extrapolation of the additional video unit, and selectively disable interpolation or extrapolation of the additional video unit based on the motion level and the resource level.

In another aspect, the disclosure provides a computer-readable medium comprising instructions to cause one or more processors to analyze one or more characteristics associated with an interpolated or extrapolated video unit produced by a frame rate upconversion process, and selectively enable and disable presentation of the interpolated or extrapolated video unit on a display based on the analysis.

The details of one or more aspects of the disclosed techniques are set forth in the accompanying drawings and the description below. Other features, objects, and advantages will be apparent from the description and drawings, and from the claims.

DETAILED DESCRIPTION

Figure 1:
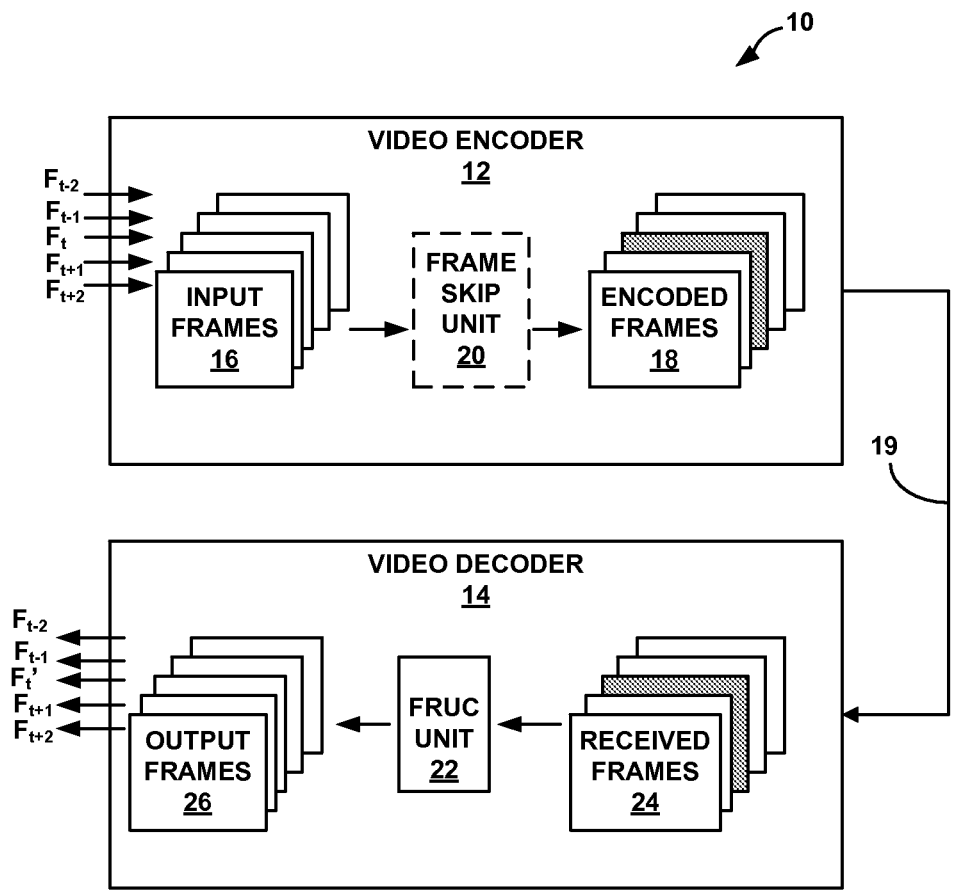
FIG. 1 is a block diagram illustrating a video encoding and decoding system configured to select reference video units for use in video unit substitution.

FIG. 1 is a block diagram illustrating a video encoding and decoding system 10 configured to select reference video units for use in video unit substitution. In various aspects, the substituted video units and selected reference video units may be, for example, video frames, video slices, or video blocks. As shown in FIG. 1, system 10 may include a video encoder 12 and a video decoder 14, each of which may be generally referred to as a video coder. In the example of FIG. 1, video encoder 12 encodes input video frames 16 to produce encoded video frames 18. Video encoder 12 may transmit encoded video frames 18 to video decoder 14 via a communication channel 19.

Although the techniques described in this disclosure may be applicable to a variety of video units, such as frames, slices, blocks or sub-blocks, this disclosure will generally describe application of the techniques to video frames for purposes of illustration, but without limitation of the aspects of such techniques as broadly described in this disclosure.

To reduce the amount of data that must be transmitted between encoder 12 and decoder 14, and thereby adhere to reduced bandwidth requirements for channel 19, video encoder 12 may operate at a basic video unit coding rate that is less than a source video unit coding rate. For example, video encoder 12 may operate at a reduced video frame rate, such as, e.g., 15, 30, 60 frames per second (fps).

Alternatively, or additionally, in some cases, video encoder 12 may operate at a given video frame rate, but optionally include or selectively activate a skip unit 20 that causes encoder 12 to skip encoding of some video units. For example, video unit skip unit 20 may be configured to cause encoder 12 to skip the encoding of some frames, thereby reducing the effective frame rate of video encoder 12, e.g., relative to a source video frame rate. In FIG. 1, a skipped video frame is illustrated by the shaded frame in encoded frames 18.

In the case of skipped frames or a coding rate that can be upconverted, it may be desirable to substitute additional video units at the decoder side, e.g., by interpolation or extrapolation, to convert the actual video frame rate to an increased video frame rate. Such a process is sometimes referred to as frame substitution to support frame rate up conversion (FRUC). In effect, decoder 14 may increase the actual frame rate produced by video encoder 12 to an up-converted frame rate.

As an example, if the actual frame rate produced by encoder 12, with or without frame skipping, is 30 fps, then decoder 14 may be configured to substitute additional frames, e.g., by interpolation or extrapolation, to increase the effective frame rate from 30 fps to 60 fps or 120 fps. In effect, the additional frames are substituted for frames that have been skipped or frames that could have been included if the basic frame coding rate of video encoder 12 was greater. As described above, the frame rate produced by video encoder 12 may be less than desired due to a basic frame rate that is less than a source video rate and/or the optional skipping of some frames, e.g., by optional skip unit 20.

By skipping some frames or coding fewer frames per second, as described above, video encoder 12 may encode video at a reduced frame rate. However, low frame rate video can produce temporal artifacts in the form of motion jerkiness. Frame substitution may be employed by decoder 14 to approximate the content of skipped frames or other excluded frames and, in effect, upconvert the actual frame rate to provide a perception of smoother motion. For example, video decoder 14 may include a frame rate up conversion (FRUC) unit 22 that interpolates or extrapolates at least some additional video frames to increase the effective frame rate of the decoded video.

Again, although FRUC unit 22 is described with respect to up-conversion of the effective coding rate for frames, the techniques described in this disclosure may be applied to other video units, such as slices, blocks, or sub-blocks. Video decoder 14 may decode received frames 24 and approximate additional video frames via FRUC unit 22 to produce output video frames 26. The decoded output video frames 26 may be used to drive a display device. In FIG. 1, the example of a skipped frame is illustrated by the shaded video frame in received video frames 24.

In the example of FIG. 1, FRUC unit 22 is shown within video decoder 14. In other implementations, FRUC unit 22 may form part of a video post-processing module. A video post-processing module may process the output of video decoder 14, and may perform a variety of processing operations such as smoothing, sharpening, brightness control, and/ or contrast enhancement, as well as a FRUC operation. As another alternative, FRUC unit 22 may form part of a video display processor or mobile display processor (MDP) device, e.g., for a mobile multimedia device. Accordingly, implementation of FRUC unit 22 within video decoder 14 is depicted in FIG. 1 and other figures for purposes of illustration, and should not be considered limiting of the techniques broadly described in this disclosure.

Motion-compensated (MC) video frame interpolation (VFI) is an example of a technique used to enhance the temporal perceptual quality of video in applications such as FRUC at the decoder side. Other interpolation techniques, as well as extrapolation techniques, may be applied to approximate additional frames to support a FRUC process. Although FRUC techniques may enhance temporal quality by approximating skipped frames, or generating additional frames beyond the basic frame rate of the video encoder 12, interpolation or extrapolation of some frames may introduce undesirable spatial artifacts that undermine visual quality.

For example, the visual quality of a substituted video frame may not be guaranteed and may be highly dependent on the particular reference frame or frames that are used to perform the interpolation or extrapolation. In addition, VFI methods may be very complex and consume a great deal of power and other resources, which may discourage the use of VFI for video applications in some devices, such as mobile devices with limited power, computing and/or memory resources. Other frame substitution techniques may present similar quality and resource issues.

FRUC unit 22 may be configured to analyze at least one characteristic associated with one or more reference video frames received by video decoder 14, and select one or more of the reference video frames for use in substitution of a video frame by the video decoder based on the analysis. The reference video frames may be selected from received frames 24 that reside temporally prior to or subsequent to a frame to be substituted. In other words, FRUC unit 22 may select one or more previous or future frames 24 for use in approximating an additional frame to be substituted.

A previous video frame may include a frame that immediately precedes the frame to be substituted, or one or more prior frames in proximity to the frame to be substituted. A future frame may include a frame that immediately follows the frame to be substituted, or one or more frames in proximity to the frame to be substituted. In the case of substitution by interpolation, one or more previous frames and one or more future frames may be used to interpolate an additional, intermediate frame. In the case of substitution by extrapolation, one or more previous frames or one or more future frames may be used for extrapolation of an additional, previous or future frame.

In some aspects, FRUC unit 22 may analyze the quality of the reference video frames to select one or more reference frames for use in substitution of an additional video frame. In this manner, FRUC unit 22 determines which frames to use as reference frames for video frame substitution, e.g., by interpolation or extrapolation. In this case, FRUC unit 22 may select reference video frames to enhance spatio-temporal video quality of output video frames 26. In other aspects, FRUC unit 22 may analyze both the quality of the reference frames and resource constraints of a device in which video decoder 14 resides. In this case, FRUC unit 22 may enhance spatio-temporal video quality of output video frames 26 while balancing interests in reducing power consumption, conserving computing resources, and/or conserving memory resources. FRUC unit 22 may enhance interpolated or extrapolated frame quality as well as temporal quality of the video sequence. In general, consumption of computing and memory resources may contribute to increased power consumption, as well as latency in some cases.

In addition, in some aspects, FRUC unit 22 may be configured to select reference video frames with a bias toward reducing end-to-end processing and/or presentation delays. Such delays may be especially undesirable from some real-time or near real-time applications, such as video telephony, which may be delay-sensitive. For example, when future reference video frames are used to approximate a substituted frame, FRUC unit 22 may be configured to favor selection of future reference video frames that are relatively close in time to the frame to be approximated. Alternatively, FRUC unit 22 may disable video frame substitution for such delay-sensitive applications.

In a video telephony application, as an illustration, it may less desirable to select frame extrapolation based on future frames or, in the case of video frame interpolation, it may be desirable to select closer future frames rather than future frames that are further in the future in order to reduce end-to-end delay, and thereby preserve temporal quality for the user. In particular, reliance on future reference frames that reside further in the future may result in delays due to need to wait for such future frames to be decoded. The further the frame resides in the future, the longer the wait may be, which may cause disconcerting delays in the video telephony presentation.

In some aspects, video decoder 14 may provide a quality-focused frame substitution mode as a first operational mode to select a reference frame based on analysis of one or more reference frame quality criteria. In addition, video decoder 14 may provide a resource-focused frame substitution mode as a second operational mode to selectively enable or disable frame substitution for some frames based on a combination of resource and quality considerations. The quality-focused and resource-focused modes, in some aspects, may be referred to as quality-optimized and power-optimized modes. Hence, in some aspects, video decoder 14 may decide which frames to use as reference frames for video frame interpolation or extrapolation and also decide which frames to interpolate or extrapolate in order to save power and to enhance interpolated frame quality as well as temporal quality of video. Alternatively, or additionally, video decoder 14 may be configured to disable transmission of substitute frames from a video buffer to a display, even after interpolation or extrapolation has been performed, based on quality criteria.

In some aspects, this resource-focused mode may be considered a power-optimized mode, as discussed above. For example, video decoder 14 may be configured to balance visual quality versus power conservation and/or computing load. In some cases, video decoder 14 may be selectively switchable between a quality-focused mode and a resource-focused mode, e.g., according to resources available to the video decoder at the time a FRUC operation for a frame to be substituted is applied.

In the quality-focused mode and/or resource-focused mode, the quality criteria may include, for example, one or more characteristics indicative of a level of substituted frame quality likely to be produced using a selected reference frame or frames. In other words, the characteristics may be selected as an indication of the likely quality of a frame that is interpolated or extrapolated using the reference frame. If none of the reference frames satisfies the quality criteria, video decoder 14 may disable frame substitution for a particular frame. Hence, in the quality-focused mode, video decoder 14 may disable frame interpolation or extrapolation to conserve power when none of the reference frames is likely to produce interpolation or extrapolation quality that is satisfactory, e.g., above a threshold.

In some aspects, the quality-focused criteria may be applied before or after a substituted frame is actually generated by decoder 14. For example, the quality analysis may be applied after frame interpolation or extrapolation, in which case the substitute frame may be selectively applied to a display device based on the outcome. If the quality of an interpolated or extrapolated frame does not satisfy a threshold quality level, FRUC unit 22 may discard the interpolated or extrapolated frame rather than send it from an output video frame buffer to drive a display device.

In this case, even though interpolation or extrapolation has already been performed, discarding the frame may still be advantageous if the quality level does not justify the additional resources required to display the frame. A substantial amount of power may be expended in sending a frame from a video buffer to a display buffer to drive the display. Accordingly, discarding a substitute frame, even after interpolation or extrapolation has been performed, may save power consumption that otherwise would result from video data traffic between the video buffer and the display.

In the resource-focused mode, video decoder 14 may disable frame substitution if a motion level of one or more candidate reference frames is less than a threshold. In this case, when a video scene is generally static, the difference between an interpolated or extrapolated frame and a repeated frame may be negligible. Accordingly, using frame repetition instead of interpolation or extrapolation can conserve resources, such as power. The motion level threshold may be fixed or adjustable as a function of the resource level or resource saving requirements of the video decoder. In either case, whether the quality-focused or resource-focused mode is activated, if frame substitution is enabled, one or more quality criteria may be used to select reference frames.

The one or more quality criteria used to analyze a candidate reference frame may be selected as characteristics indicating a quality of interpolation or extrapolation likely to be produced by using the candidate reference frames. For example, the quality criteria may indicate a likely quality of the interpolated or extrapolated frame if the candidate reference frame under consideration is used in the interpolation or extrapolation of that additional frame. Also, FRUC unit 22 may analyze motion vector reliability as a further indication of reference frame quality. Examples of quality criteria analyzed by FRUC unit 22 may include quantization parameter (QP) values, coded block pattern (CBP) values and the number of non-zero transform coefficients associated with reference video frames. If the CBP value is not equal to zero, the QP values may be coupled with the number of non-zero coefficients to judge the reliability of motion vectors provided by the reference frames.

FRUC unit also may consider objective quality metrics such as a structural similarity metric (SSIM), blockiness, and/or blurriness to determine the quality of candidate reference frames for use in interpolation or extrapolation. In addition, the type of intra mode in addition to intra mode and motion vector count for a reference frame may be considered.

FRUC unit 22 may analyze other quality criteria such as evidence of full or partial video unit loss, which may be generally referred to as video unit loss. For example, FRUC unit 22 may analyze slice or frame losses for a reference video frame in conjunction with the lack of availability of an error concealment mechanism for the frame. For example, FRUC unit 22 may evaluate a level of the error and a quality of an error concealment mechanism. Other quality criteria may be used in addition, or as an alternative, to the types of quality criteria described above.

In some cases, FRUC unit 22 may select reference video frames that satisfy one or more quality thresholds. In other cases, FRUC unit 22 may score and rank quality for multiple reference video frames, and select one or more reference frames producing the best scores. If two frames (e.g., two previous frames or two future frames) are ranked substantially the same, it may be desirable to select the frame that is temporally closer to the skipped frame to be interpolated.

For purposes of illustration, this disclosure generally refers to the selection of reference frames for interpolation or extrapolation of additional frames. In some implementations, however, the disclosure contemplates more generally the selection of reference video units for approximation of additional video units, other than frames. For example, the techniques described in this disclosure may be adapted to analyze and select any of a variety of reference video units such as video frames, video slices, or video blocks such as macroblocks.

When a video unit such as a frame, slice or block is skipped by video encoder 12, the techniques may be used to identify a corresponding frame, slice or block among various candidate reference frames that can be used for interpolation or extrapolation. Alternatively, even when a frame, slice or block is not skipped, the techniques may be used to approximate additional frames to augment the basic frame coding rate of encoder 12, e.g., for frame rate conversion applications.

Even when it is desirable to approximate an entire frame due to skipping or low frame rate, it may be advantageous to select individual slices or blocks for use in interpolating the slices or blocks of the frame to be approximated. In this case, slices or blocks from different candidate frames may be selected to interpolate or extrapolate corresponding slices or blocks in the frame to be approximated. For example, quality analysis or analyses similar to those described in this disclosure may be applied on a slice-by-slice or block-by-block basis to select reference video units for interpolation or extrapolation of additional video units. Accordingly, by focusing on selection of reference frames for interpolation or extrapolation of skipped frames to be substituted, the disclosure should not be considered limiting of the aspects as broadly described.

With further reference to FIG. 1, video encoder 12 and video decoder 14 may be connected by transmission channel 19. Transmission channel 19 may be a wired or wireless medium, or a combination of both, capable of conveying video frames within a bitstream. Channel 19 may support bi-directional or uni-directional video transmission. System 10 may be configured for video telephony, video streaming, video broadcasting, or the like. Accordingly, reciprocal encoding, decoding, multiplexing (MUX) and demultiplexing (DEMUX) components may be provided on opposite ends of channel 19. In some implementations, encoder 12 and decoder 14 may be provided within video communication devices such as wireless mobile terminals equipped for video streaming, video broadcast reception, and/or video telephony, such as so-called wireless video phones or camera phones.

Such wireless communication devices include various components to support wireless communication, audio coding, video coding, and user interface features. For example, a wireless communication device may include one or more processors, audio/video encoders/decoders (CODECs), memory, one or more modems, transmit-receive (TX/RX) circuitry such as amplifiers, frequency converters, filters, and the like. In addition, a wireless communication device may include image and audio capture devices, image and audio output devices, associated drivers, user input media, and the like.

Encoder 12, decoder 14 or both may be incorporated in a wireless or wired communication device as described above. Also, encoder 12, decoder 14 or both may be implemented as an integrated circuit device, such as an integrated circuit chip or chipset, which may be incorporated in a wireless or wired communication device, or in another type of device supporting digital video applications, such as a digital media player, a personal digital assistant (PDA), a digital television, or the like.

System 10 may support video telephony according to the Session Initiated Protocol (SIP), ITU-T H.323 standard, ITU-T H.324 standard, or other standards. Video encoder 12 may generate encoded video data according to a video compression standard, such as MPEG-2, MPEG-4, ITU-T H.263, ITU-T H.264, or MPEG-4, Part 10. Although not shown in FIG. 1, video encoder 12 and video decoder 14 may be integrated with an audio encoder and decoder, respectively, and include appropriate hardware and software components to handle both audio and video portions of a data stream.

Encoder 12 encodes video frames 16, which may include Intra frames (I frames), predictive frames (P frames), and bi-directional predictive frames (B frames). I frames are frames that completely encode all video information using spatial coding techniques. The encoded frames may comprise information describing a series of video blocks that form a frame. The video blocks, sometimes referred to as macroblocks (MBs), may include coding bits that define pixel values, e.g., in luminance (Y), chrominance red (Cr) and chrominance blue (Cb) color channels.

As described above, encoder 12 may implement frame skipping to reduce the frame rate of data transmitted over transmission channel 19. In particular, encoder 12 may be configured to intentionally skip selected frames, e.g., by not coding selected frames or not transmitting selected coded frames. Alternatively, encoder 12 may generate frames at a basic frame coding rate, with or without frame skipping, that is less than a desired frame rate. Frame skipping or reduced frame rate coding may permit encoder 12 to conform to a reduced transmission rate requirement of channel 19.

In the case of frame skipping, frames may be skipped by frame skip unit 20 at a fixed rate such that skipping occurs at alternating frames or at every nth frame. Alternatively, frames may be skipped at a varying rate, e.g., based on intelligent frame skipping criteria. Also, encoder 12 may encode frames at a given frame rate on a fixed basis, or an adaptive basis such that frame rate is varied according to considerations such as channel conditions or other requirements. In either case, the frame rate may be effectively up-converted by the decoder 14 to produce an increased frame rate, e.g., from 30 fps to 60 fps or 120 fps.

FRUC unit 22 may be used by decoder 14 to perform frame substitution to replace frames that are skipped or generate additional frames to augment the frame rate. In addition, in some implementations, FRUC unit 22 may be used for frames that are dropped or lost during transmission. Frames skipped by encoder 12 and frames dropped or lost during transmission may generally be referred to as skipped frames in this disclosure. In each case, to increase the effective frame rate, and thereby improve temporal quality, FRUC unit 22 of decoder 14 may perform a FRUC process to approximate at least some of the skipped frames with substitute frames using video frame interpolation or extrapolation and reference frame selection.

If none of the reference video frames is likely to support frame substitution with a sufficient quality level, FRUC unit 22 may disable frame substitution and apply frame repetition. When frame substitution is disabled, decoder 14 may simply repeat a previous or future frame, instead of interpolating or extrapolating a frame between the previous frame and the future frame. In this case, decoder 14 may use a duplicate version of a previous or future frame in place of a skipped frame or as an additional frame for frame rate conversion.

By using frame repetition, decoder 14 may avoid undesirable spatial artifacts that could be introduced by interpolation or extrapolation. Because frame repetition may reduce the perceived temporal quality of the video, frame substitution by interpolation or extrapolation will ordinarily be more desirable when sufficient quality can be achieved. However, excessive consumption of power, computing, and/or memory resources may reduce the overall value of substitution techniques. A resource-focused mode, as described in this disclosure, may serve to balance quality versus resource consumption.

In the example of FIG. 1, video encoder 12 receives input frames 16 ($F_{t-2}$, $F_{t-1}$, $F_t$, $F_{t+1}$, $F_{t+2}$) of video information. $F_t$ represents a frame that is not coded at time t, either due to frame skipping by optional frame skip unit 20 or due to the basic frame rate produced by encoder 12. Accordingly, it should be noted that frame substitution, as described in this disclosure, generally refers to the addition of a frame $F_t'$ that approximates a frame $F_t$ that was not provided in the frames received by decoder 14, either due to frame skipping, channel loss, or the basic frame rate of encoder 12.

If frame skip unit 20 is applicable, frames may be skipped according to a fixed, adjustable or dynamic frame skipping process, as described above. $F_{t-2}$ and $F_{t-1}$ represent past frames that are temporally prior to frame $F_t$, and $F_{t+1}$ and $F_{t+2}$ are future frames that are temporarily after frame $F_t$. Reference frames that may be used for interpolation or extrapolation of frame $F_t$ may include numerous frames both before and after frame $F_t$. For ease of illustration, however, only two frames before and two frames after $F_t$ are shown in FIG. 1.

In general, video encoder 12 encodes input frames 16 as one of the above described I, P, or B frames to produce encoded frames 18. Again, frame $F_t$ resides temporally between previous frames $F_{t-2}$, $F_{t-1}$ and future frames $F_{t+1}$, $F_{t+2}$. Video encoder 12 transmits encoded frames 18, which includes encoded frames $F_{t-2}$, $F_{t-1}$, $F_{t+1}$, $F_{t+2}$, but not frame $F_t$, to video decoder 14 via transmission channel 19. Typically, encoder 12 transmits these frames in a pre-defined sequence, such as IBBPBBPBBPBBI, where I, B, and P refer to I frames, B frames, and P frames, respectively.

Encoded frames 18 may be intra-coded or inter-coded, and may be decoded to produce video content present in input frames 16. In addition, encoded frames 18 may serve as reference frames for decoding of other inter-coded frames in a video sequence, i.e., as a reference for motion estimation and motion compensation of a predicted frame. As is well known in the art of predictive coding, an encoded frame may be characterized by motion vectors that indicate displacement of blocks in the encoded frame relative to similar, corresponding blocks in a different encoded frame, which serves as a reference frame. In addition, the encoded frame may be characterized by residual information that indicates differences between video blocks in the encoded frame and corresponding video blocks in the reference frame.

Encoding of input frames 16 and decoding of received frames 24 may rely on reference frames as described above for predictive coding. In the case of a frame to be substituted, however, a reference frame as described in this disclosure generally refers to a frame that is used for interpolation or extrapolation to provide an additional frame at the decoder side. Hence, it should be noted that a reference frame for interpolation or extrapolation is different in its usage from a reference frame for predictive coding, even though a given frame may be used as a reference frame for both interpolation and predictive coding in some instances. Reference frames for predictive coding are specified at the encoder side and used for predictive coding. On the contrary, reference frames for interpolation or extrapolation may be selected at the decoder side and used for substitution of additional frames, e.g., by interpolation or extrapolation.

In the example of FIG. 1, frames 16 represent five frames in a video sequence containing many frames, and are used to describe the interpolation or extrapolation of an additional, i.e., extra, frame $F_t'$ that approximates a frame $F_t$ that resides temporally between encoded frames 18 (e.g., between previous frames $F_{t-2}$, $F_{t-1}$ and future frames $F_{t+1}$, $F_{t+2}$). In some aspects, multiple frames may be need to be added, in which case more than one frame residing between two transmitted frames may require interpolation or extrapolation. For ease of illustration, this disclosure will refer to the example case in which a single frame $F_t'$ between a previous frame and a future frame is interpolated using selected reference frames.

Video decoder 14 receives frames 24 via transmission channel 19. Received frames 24 may be substantially identical to the encoded frames 18 transmitted by video encoder 12, subject to slice, frame or block losses due to characteristics of transmission channel 19. Video decoder 14 may apply standard decoding techniques to decode each of the received frames 24 ($F_{t-2}$, $F_{t-1}$, $F_{t+1}$, $F_{t+2}$), e.g., according to one of the MPEG-1, MPEG-2, MPEG-4, H.263, H.264, or MPEG-4, Part 10 standards. In accordance with this disclosure, decoder 14 further includes FRUC unit 22, which it applies to frames 24 in order to selectively approximate the additional frame $F_t'$. With FRUC unit 22, video decoder 14 interpolates or extrapolates a frame to generate frame $F_t$ and generates output frames 26, which include the decoded frames $F_{t-2}$, $F_{t-1}$, $F_{t+1}$, $F_{t+2}$ and an approximation $F_t'$ of the frame $F_t$ to be added.

FRUC unit 22 receives successive frames in the video sequence. For each additional frame to be interpolated, there is at least one previous frame and at least one future frame that can be used as reference frames for interpolation. The frame to be interpolated resides temporally between multiple previous frames and multiple future frames. If extrapolation is used for approximation, instead of interpolation, then the frame to be extrapolated may reside temporally after one or more reference frames or temporally before one or more reference frames. Some of the previous and future frames may produce better frame substitution results that others. Interpolation may be performed by any of a variety of techniques, such as motion-compensated interpolation (MCI), linear interpolation, bilinear interpolation, bicubic interpolation, spline interpolation, nearest neighbor interpolation, non-linear interpolation, linear or non-linear filtering of candidate frames, or the like. Interpolation may make use of a single reference frame for unidirectional interpolation or two or more frames for bidirectional interpolation. Similarly, extrapolation may make use of a single reference frame or two or more frames for unidirectional extrapolation.

FRUC unit 22 may analyze candidate previous and/or future frames and select one or more of the frames for use as reference frames in interpolation or extrapolation of the additional frame. FRUC unit 22 may be configured to select particular reference frames that are more likely to produce favorable frame substitution results. For example, FRUC unit 22 may analyze one or more characteristics of a set of candidate reference frames. The candidate reference frames may be selected from a subset of frames within a video sequence. For example, FRUC unit 22 may analyze subsets of N previous frames and M future frames, where N and M are either equal or not equal.

If analysis shows that none of the candidate reference frames has a sufficient quality level for frame substitution, FRUC unit 22 may disable frame substitution. In this case, FRUC unit 22 may detect a potential FRUC failure in terms of the quality of the frame substitution result. Instead of wasting power and computing resources to produce a low quality interpolation result, for example, FRUC unit 22 may apply frame repetition to produce an approximation of the skipped frame. In the case of frame repetition, as described previously, decoder 14 uses a duplicate version of one of the previous or future frames in place of the skipped frame. Hence, in a quality-focused mode, FRUC unit 22 may be configured to select particular reference frames for interpolation or extrapolation, and disable frame substitution when an acceptable quality level is unlikely. FRUC unit 22 may seek higher quality levels to justify frame substitution when decoder 14 operates in a resource-focused mode.

In some configurations, system 10 may provide one or more benefits. For example, in some configurations, system 10 may reduce power consumption in video decoder 14 by disabling frame substitution when it is not likely to produce favorable results. In addition, in some configurations, system 10 may enhance the quality of substituted frames by selecting particular reference frames for use in frame substitution. Selection of higher quality reference frames for use in interpolation or extrapolation of substituted frames may be useful in a variety of video applications, such as applications in which encoded video is compressed using variable bit rate (VBR) rate control techniques. In the case of VBR, quality may vary among different frames, such that some frames may be better than other frames when used as reference frames for interpolation or extrapolation.

Also, video decoder 14 may be configured to detect candidate reference frames suffering slice, frame or block losses, and eliminate such frames from consideration when there is no error concealment mechanism applied, or if an available error concealment mechanism is not likely to provide good quality frames. Elimination of candidate reference frames with insufficient error concealment may be useful when significant transmission losses occur such as in the case of video telephony applications. A resource-focused mode may be useful in reducing power consumption while maintaining reasonable objective and subjective video quality, e.g., in low-motion video clips.

Figure 2A:
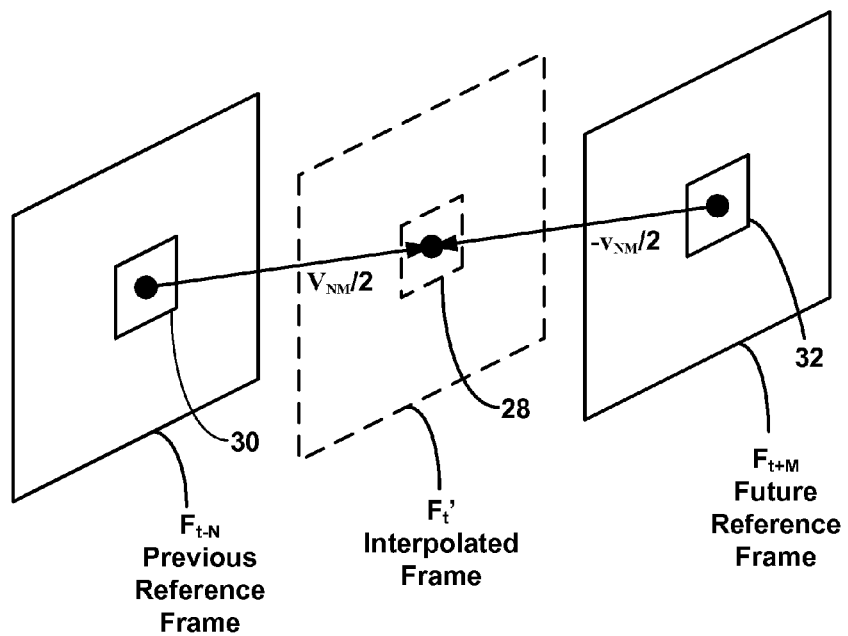
FIG. 2A is a diagram illustrating an example of a technique for interpolation of a video unit in a video decoder.

FIG. 2A is a diagram illustrating an example of a simple technique for interpolation of an additional frame to support a FRUC technique in video decoder 14. In general, to interpolate a macroblock (MB) 28 in an interpolated frame $F_t'$ between a selected previous frame $F_{t-N}$ and a selected future frame $F_{t+M}$, video decoder 14 may rely on a motion vector $v_{NM}$ extending between an MB 30 in previous frame $F_{t-N}$ and a corresponding MB 32 in future frame $F_{t+M}$. In this example, time t indicates the temporal location, i.e., time, at which the additional frame to be interpolated would appear in the video sequence. Frames $F_{t-N}$ and $F_{t+M}$ are frames that temporally precede (t−N) and follow (t+M), respectively, the additional frame $F_t'$ that requires interpolation. In the example of FIG. 2A, frames $F_{t-N}$ and $F_{t+M}$ serve as reference frames for interpolation of the additional frame $F_t'$.

N and M indicate temporal offsets, relative to time t, and may be equal or nonequal to one another. For example, if N=1 and M=2, frame $F_{t-N}$ may be the frame immediately preceding the interpolated frame, and frame $F_{t+M}$ may be the second frame after the interpolated frame. In a simple example in which N=1 and M=1, for interpolation, the vector $v_{13}$ extending between frame $F_{t-N}$ and frame $F_{t+M}$ may generally be divided by two (for 1:2 frame rate conversion) to produce motion vectors $v_{NM}/2$ and $-v_{MN}/2$ and identify a corresponding MB 28 in the frame $F_t'$ to be interpolated. Hence, in this simplified example, the position of MB 28 is a function of the motion vectors $v_{NM}/2$ and $-v_{NM}/2$, where N=1 and M=1 for purposes of this example. MB 28 may be assigned a set of pixel values that correspond to MB 30 or MB 32, or an average of the pixel values of MB 30 and 32. For higher or lower frame upconversion, e.g., 1:X conversion, the motion vectors would be scaled accordingly. For other cases, e.g., in which at least one of N and M is not equal to one, different motion vectors obtained through motion estimation and motion vector processing may be used.

In addition, for some types of interpolation, FRUC unit 22 may rely on multiple reference frames, such as two or more previous frames and two or more future frames. In general, a reference frame refers to a frame that is used, either alone or in combination with one or more other reference frames, to interpolate a frame, such as a skipped frame. In the interpolation process, pixel values associated with macroblocks present in one or more reference frames may be used to interpolate pixel values in corresponding macroblocks in the additional frame to be interpolated, e.g., as shown in FIG. 2A. The pixel values may include luminance and/or chrominance pixel values.

As one example, an interpolated macroblock may include pixel values equal to pixel values in a macroblock in a previous frame, pixel values in a macroblock in a future frame, or an average of the pixel values in the corresponding macroblocks in the previous and future frames. The macroblocks in the interpolated frame may be motion compensated relative to corresponding blocks in the reference video frames, as shown in FIG. 2A. The macroblocks may be identified by motion vectors extending between the previous and future frames, as shown in FIG. 2A. The illustration of interpolation shown in FIG. 2A is one example, and should be considered nonlimiting of the techniques broadly described in this disclosure. A wide variety of different interpolation techniques may be used for frame substitution in accordance with this disclosure.

Figure 2B:
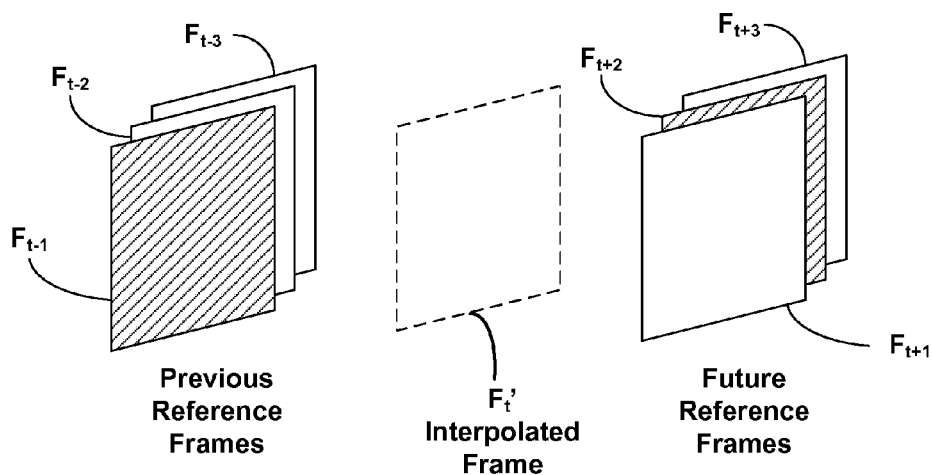
FIG. 2B is a diagram illustrating interpolation of a video unit using selected reference video units.

FIG. 2B is a diagram illustrating interpolation of an extra video frame using selected reference frames. In the example of FIG. 2B, FRUC unit 22 selects reference frames $F_{t-1}$ and $F_{t+2}$ for use in interpolating the additional frame $F_t'$. FRUC unit 22 may analyze one or more characteristics of multiple previous frames $F_{t-1}$, $F_{t-2}$, and $F_{t-3}$ and multiple future frames $F_{t+1}$, $F_{t+2}$, and $F_{t+3}$. In the example of FIG. 2B, FRUC unit 22 analyzes three previous reference frames and three future reference frames for purpose of illustration. In this example, FRUC unit 22 may select one previous reference frame and one future reference frame, based on this analysis, for use in interpolation of interpolated frame $F_t'$. However, the actual number of previous and future reference frames may be different than the example of FIG. 2B. In addition, the number of previous frames analyzed by FRUC unit 22 may be different from the number of future frames analyzed by the FRUC unit. In general, FRUC unit 22 may select a previous frame and a future frame that, based on the quality analysis, are likely to produce interpolation results with an acceptable level of quality. In the example of FIG. 2B, selected reference frames $F_{t-1}$, and $F_{t+2}$ are indicated by cross-hatching.

Figure 2C:
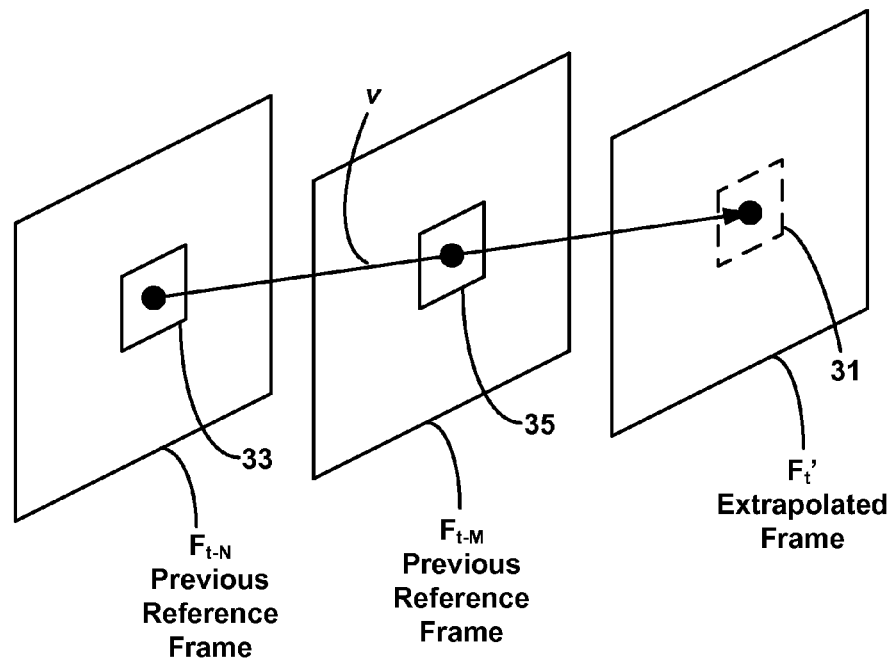
FIG. 2C is a diagram illustrating an example of a technique for extrapolation of a video unit in a video decoder.

FIG. 2C is a diagram illustrating an example of a technique for extrapolation of a video unit in video decoder 14. In the example of FIG. 2C, two previous reference frames $F_{t-M}$ and $F_{t-N}$ are used to extrapolate an additional frame $F_t'$ to support frame substitution. In general, to extrapolate an MB 31 in a frame $F_t'$ following a selected previous frame $F_{t-N}$ and a selected previous frame $F_{t-M}$, video decoder 14 may rely on a vector v extending between a corresponding MB 33 in previous frame $F_{t-N}$ and a corresponding MB 35 in previous frame $F_{t+M}$. In this example, t indicates the temporal location, i.e., time, at which the additional frame to be interpolated would appear in the video sequence. Frames $F_{t-N}$ and $F_{t+M}$ are frames that temporally precede by (t−N) and (t+M), respectively, the additional frame $F_t'$ that requires extrapolation. In the example of FIG. 2C, previous reference frames $F_{t-N}$ and $F_{t+M}$ serve as reference frames for extrapolation of the additional frame $F_t'$. However, one or more previous reference frames or one or more future reference frames may be used to extrapolate the additional frame $F_t'$. In other words, the additional frame may be extrapolated forward or backward using previous frames or future frames, respectively.

As in the example of FIG. 2A, N and M in FIG. 2C indicate temporal offsets, relative to time t, and may be equal or nonequal to one another. For example, if N=2 and M=1, frame $F_{t-M}$ may be the frame immediately preceding the extrapolated frame, and frame $F_{t-N}$ may be two frames before the extrapolated frame. MB 31 may be assigned a set of pixel values that correspond to MB 33 or MB 35, or an average of the pixel values of MB 33 and 35. The extrapolation process may make use of motion compensated extrapolation. As in the case of interpolation, for extrapolation, a reference frame may refer to a frame that is used, either alone or in combination with one or more other reference frames, to extrapolate an extra frame to be added to the decoded video frames.

The extrapolation may be motion compensated by extrapolating motion vector v from corresponding blocks in the reference frames, as shown in FIG. 2C. In the extrapolation process, pixel values associated with MBs present in one or more reference frames may be used to extrapolate pixel values in corresponding MBs in the additional frame to be extrapolated. The illustration of extrapolation shown in FIG. 2C is one example, and should be considered nonlimiting of the techniques broadly described in this disclosure. A wide variety of different extrapolation techniques may be used for frame substitution in accordance with this disclosure.

Figure 2D:
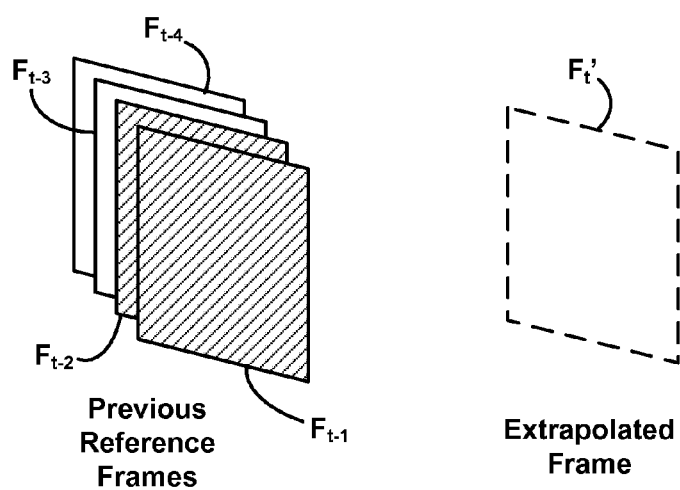
FIG. 2D is a diagram illustrating extrapolation of a video unit using selected reference video units.

FIG. 2D is a diagram illustrating extrapolation of an extra video frame using selected reference frames. In the example of FIG. 2D, FRUC unit 22 selects reference frames $F_{t-1}$ and $F_{t-2}$ for use in extrapolating the additional frame $F_t'$. FRUC unit 22 may analyze one or more characteristics of multiple previous frames $F_{t-1}$, $F_{t-2}$, and $F_{t-3}$ or multiple future frames, depending on whether previous or future frames are used for extrapolation. In the example of FIG. 2D, FRUC unit 22 analyzes four previous reference frames $F_{t-1}$, $F_{t-2}$, $F_{t-3}$, $F_{t-4}$ for purpose of illustration. In this example, FRUC unit 22 may select two previous reference frames, based on this analysis, for use in extrapolation of frame $F_t'$. However, the actual number of reference frames used for extrapolation may be different than the example of FIG. 2D. In general, FRUC unit 22 may select reference frames that, based on the quality analysis, are likely to produce extrapolation results with an acceptable level of quality. In FIG. 2D, selected reference frames $F_{t-1}$ and $F_{t-2}$ are indicated by cross-hatching.

Figure 3:
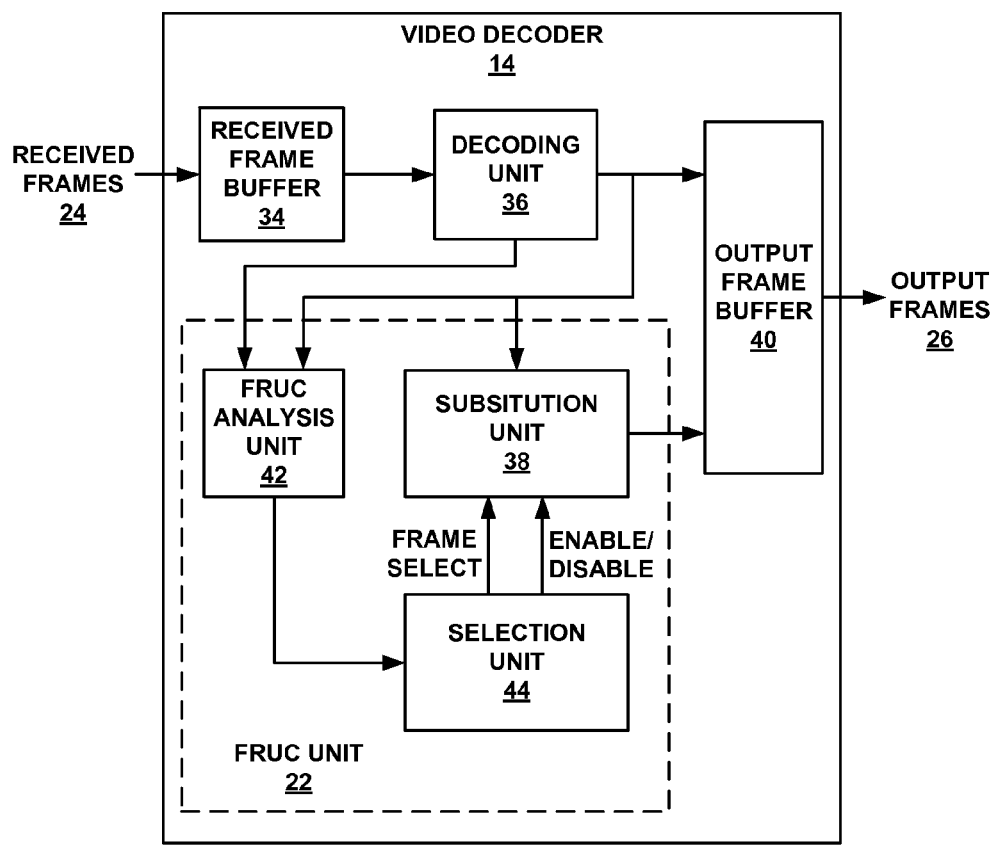
FIG. 3 is a block diagram illustrating an example of a video decoder configured to select reference frames for use in frame substitution.

FIG. 3 is a block diagram illustrating an example of video decoder 14 of FIG. 1 in more detail. In the example of FIG. 3, video decoder 14 includes received frame buffer 34, decoding unit 36, frame substitution unit 38, output frame buffer 40, FRUC analysis unit 42, and selection unit 44. Frame substitution unit 38, FRUC analysis unit 42 and selection unit 44 may form part of FRUC unit 22 of video decoder 14. In the example of FIG. 3, FRUC unit 22 resides within video decoder 14. As mentioned above, however, FRUC unit 22 may reside outside of video decoder 14 in other implementations, e.g., within a video post-processor module or video display processor or MDP device. Received frame buffer 34 receives and stores encoded frames that are transmitted over channel 19 from video encoder 12. Decoding unit 36 decodes the received frames using an applicable coding process and places the decoded frames in output frame buffer 40.

The received frames 34 may exclude various frames to be interpolated or extrapolated. Such frames may include frames that were skipped by encoder 12, frames or portions of frames that are lost during transmission across channel 19, and frames that were not supported by the basic frame rate of encoder 12. To promote spatio-temporal quality, frame substitution unit 38 may be configured to either interpolate or extrapolate additional frames based on analysis and selection of particular received frames for use in the interpolation or extrapolation, as applicable.

As mentioned previously, interpolation by frame substitution unit 38 may include any of a variety of interpolation techniques such as motion-compensated interpolation (MCI), linear interpolation, bilinear interpolation, bicubic interpolation, spline interpolation, nearest neighbor interpolation, or the like. Interpolation may make use of a single reference frame for unidirectional interpolation or two or more frames for bidirectional interpolation. Likewise, extrapolation may rely on one or more frames. In some cases, frame substitution unit 38 may disable frame substitution and instead apply frame repetition, e.g., by repeating a previous or future frame in place of a frame to be added.

Frame substitution unit 38 adds substituted or repeated frames to video output frame buffer 40. The decoded frames and substituted or repeated frames in video output frame buffer 40 may be used to drive a video output device such as a display. As an example, video decoder 14 may form part of any of a variety of devices including digital video capabilities, including a wireless communication device such as a mobile radio telephone, a digital media player, a personal digital assistant (PDA), a digital television, or the like. Alternatively, the frames in output frame buffer 40 may be transmitted to one or more other devices for archival or display. In each case, the substituted or repeated frames produced by frame substitution unit 38 supplement frames decoded by decoding unit 36, e.g., to enhance temporal visual quality of a video clip.

As further shown in FIG. 3, frame substitution unit 38 may receive decoded frames from the output of decoding unit 36 for use as reference frames in interpolating or extrapolating frames. The decoded frames received from decoding unit 26 may be pixel domain frames produced by decoding unit 36 based on encoded frames from received frame buffer 34. Frame substitution unit 38 may use the decoded reference frames as reference frames for interpolation or extrapolation of additional frames. The particular reference frames used for interpolation or extrapolation may be identified by selection unit 44 based on analysis of candidate reference frames by FRUC analysis unit 42.

Analysis unit 42 may be provided to analyze candidate reference video frames. For example, analysis unit 42 may obtain decoded frames in the pixel domain from the output of decoding unit 36, e.g., for analysis of objective quality metrics such as a structural similarity metric (SSIM), blockiness, and/or blurriness, and optionally color bleeding, to determine the quality of candidate reference frames for use in interpolation or extrapolation. Alternatively, or additionally, analysis unit 42 may analyze coding information for candidate reference frames, such as QP values and CBP values associated with the candidate frames, as an indication of the relative quality levels of the frames. Coding information such as QP values and CBP values may be parsed from the bitstream associated with frames in received frame buffer 34, e.g., by decoding unit 36, and provided to analysis unit 42 as further shown in FIG. 2A. Hence, in some implementations, analysis unit 42 may receive decoded pixel domain frames from the output of decoding unit 36 and/or bitstream information such as QP and CBP values parsed from candidate frames by decoding unit 36.

The video frames obtained from decoding unit 36 may be considered candidate reference frames in the sense that they may be used by substitution unit 38 as reference frames for substitution of additional frames. For each frame to be added, analysis unit 42 may analyze pixel domain information and/or bitstream information for a subset of previous and/or future frames, relative to the frame to be added, and provide an output to selection unit 44 to identify frames that should be selected for use in frame interpolation or extrapolation by substitution unit 38. Selection unit 44 may be configured to select one or more frames for interpolation or extrapolation of the additional frame based on the analysis output by analysis unit 42. In addition, in some cases, selection unit 44 may be configured to direct substitution unit 38 to enable or disable frame substitution, e.g., when the analysis indicates that none of the candidate reference frames is suitable for use in frame substitution at an acceptable quality level.

As shown in FIG. 3, selection unit 44 may generate a frame selection signal or command that directs frame substitution unit 38 to select one or more of the frames from received frame buffer 34 for use in interpolation or extrapolation of the frame to be added. For example, for each frame to be added, selection unit 44 may direct frame substitution unit 38 to select one previous frame and one future frame for use in interpolation. Frame substitution unit 38 then may apply the selected frames as reference frames for interpolation of a skipped frame. As an illustration, a previous frame and a future frame may be used to interpolate blocks in the frame to be added based on motion vectors extending between corresponding blocks in the previous and future frames, e.g., as shown in FIG. 2A. As another illustration, selection unit 44 may direct frame substitution unit 38 to select a pair of previous frames for use in extrapolation of the additional frame.

Selection unit 44 also may generate a frame substitution enable/disable command. When the analysis by analysis unit 42 indicates that none of the candidate reference frames is suitable for use in frame substitution, selection unit 44 may disable interpolation or extrapolation by frame substitution unit 38. Also, selection unit 44 may disable interpolation in a resource-focused mode when the visual difference between frame substitution and frame repetition is relatively imperceptible. In either case, frame substitution unit 48 may repeat a previous or future frame in place of the additional frame instead of performing interpolation or extrapolation to produce a substitute frame. Frame repetition may consume substantially less power and computing resources than interpolation or extrapolation. When analysis unit 42 indicates that received frame buffer 34 contains suitable reference frames, selection unit 44 may enable frame substitution and identify the selected frames for use in the frame substitution.

The reference frames selected for frame substitution may be the frames closest to the frame to be added or frames further away from the frame to be added. In some cases, even though they would typically be selected for an ordinary FRUC process, the closest frames (i.e., nearest previous and nearest future frames) may actually have characteristics, e.g., due to VBR coding or other factors, that make them less suitable for use in interpolation or extrapolation than other reference frames. Analysis unit 42 analyzes the candidate reference frames to provide an indication of the suitability of such frames for use in frame substitution. Instead of simply using frames adjacent to the skipped frame as a matter of default, analysis unit 42 and selection unit 44 may permit frame substitution unit 38 to use reference frames that provide more optimal results.

Figure 4:
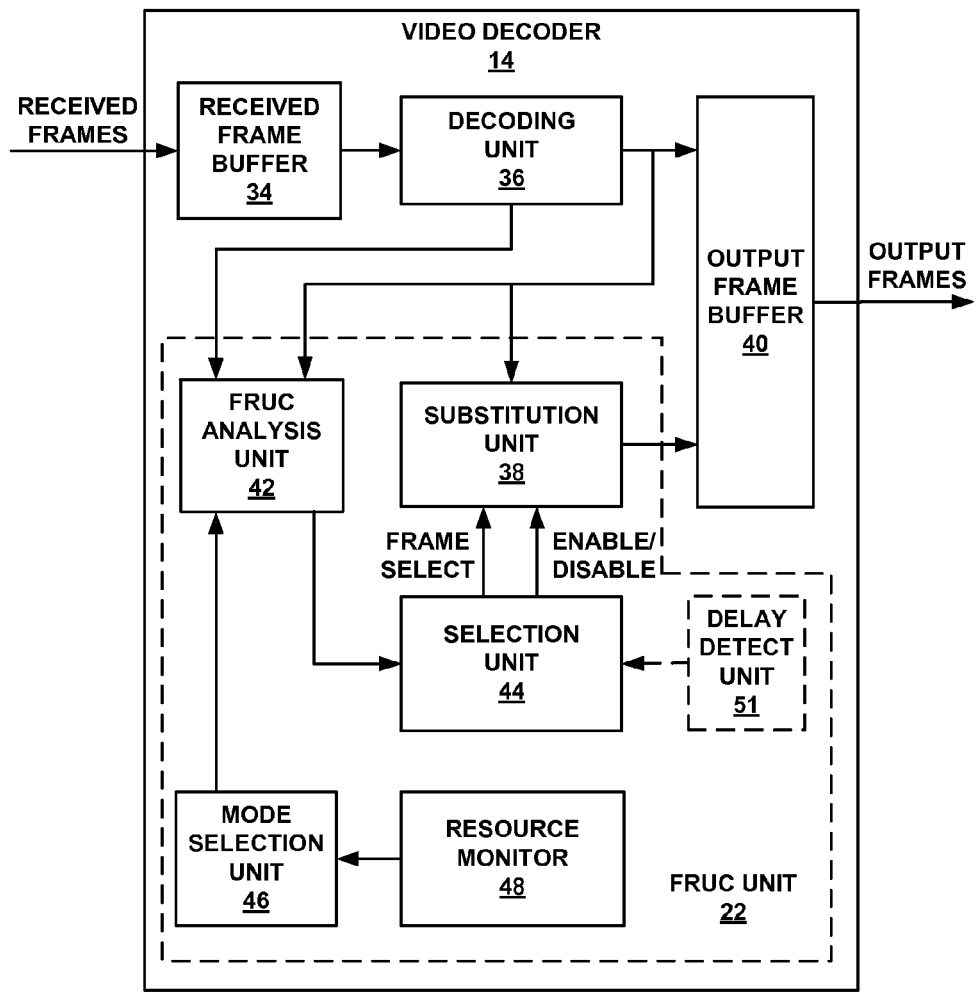
FIG. 4 is a block diagram illustrating another example of a video decoder configured to select reference frames for use in frame substitution.

FIG. 4 is a block diagram illustrating another example of video decoder 14 of FIG. 1 in more detail. In the example of FIG. 4, video decoder 14 substantially corresponds to the video decoder of FIG. 3A. FRUC unit 22 of video decoder 14 of FIG. 4 further includes, however, a mode selection unit 46 and a resource monitor 48. In addition, FRUC unit 22 may optionally include a delay detection unit 51. Mode selection unit 46 may support two or more modes of operation of FRUC unit 22. For example, FRUC unit 22 may be configured to operate in a quality-focused mode as a first operational mode or a resource-focused mode as a second operational mode. In the example of FIG. 4, FRUC unit 22 resides within video decoder 14. In other implementations, FRUC unit 22 may reside outside of video decoder 14, e.g., within a video post-processor module or video display processor or mobile display processor.

Resource monitor 48 may be configured to monitor, detect, estimate or otherwise determine available power, computing and/or memory resources within a device in which video decoder 14 is provided. In some cases, resource monitor 48 may be configured to monitor resource budgets applicable to the processing of frames. Hence, resource monitor 48 may be configured to monitor actual resources available at a given time that a frame is processed within video decoder 14, or monitor estimated resource consumption relative to a resource budget applicable to processing of a frame. In response to different resource levels, resource monitor 48 may trigger mode selection unit 46 to select a different mode (e.g., quality-focused or resource-focused) for operation of FRUC unit 22. Mode selection unit 46 may transmit a mode selection to FRUC analysis unit 42 to modify its analysis of candidate frames for reference frame selection. Alternatively, mode selection unit 46 may transmit a mode selection to enable or disable substitution (e.g., interpolation or extrapolation), as will be described.

As an example, resource monitor 48 may be configured to determine a power level by monitoring or estimating consumption of processing resources in decoder 14 relative to a budget for consumption of processing resources. In general, there is a correspondence between MIPS (million instructions per second) spent in a processor such as a digital signal processor (DSP) and power consumed for the DSP operations. There is also a correspondence between the amount of data fetched from external memory and power consumed for fetching such data. In addition, there is a correspondence between the amount of frame data sent to a display and power spent for this operation. This correspondence can be reliably established for a known device or chipset and then represented by entries in a lookup table. For example, MIPS, data fetching amounts, and display amounts may be used as indices that map to power consumption value entries in a lookup table.

For a FRUC application in a given chipset, it is possible to determine how much each operation requires in terms of MIPS, how much data is fetched from the external memory, as well as how much data is sent to a display. In one scenario, resource monitor 48 may be configured to calculate the power consumed for generation and display of each interpolated or extrapolated frame, and compare the level of consumed power to a power budget allocated to a frame or set of frames. The power budget may be a predetermined, fixed or adjustable level of power specified as a design requirement for a functional unit of a device, such as a video decoder (or entire CODEC) in a mobile wireless handset or other device.

The power budget may be allocated for a series of frames, such as a group of pictures (GOP) or other video sequence. As frames are processed, and power is consumed, the available power in the power budget is reduced. Resource monitor 48 may be configured to estimate how much power will be required to interpolate or extrapolate a new FRUC frame, e.g., based on a known correspondence between MIPS, data fetching, and display of an interpolated or extrapolated frame, which may be stored in a lookup table. As mentioned above, the power budget may be either fixed (i.e., not adjusted by a feedback loop from the device), or it can be adjusted based on a feedback loop from the device.

For a given frame, if there is enough power remaining in the power budget for interpolation, the interpolation process can be enabled. Alternatively, the interpolation process can be disabled if there is insufficient power remaining in the power budget. In accordance with an aspect of this disclosure, instead of enabling and disabling interpolation, resource monitor 48 and mode selection unit 46 may be configured to select different interpolation/extrapolation modes. In particular, based on an available resource level determined by resource monitor 48, mode selection unit 46 may select either the quality-focused mode or the resource-focused mode.

For example, if MIPS, data fetching and/or display of previous frames in a video sequence have reduced the available power budget to a level below a first predetermined threshold, resource monitor 48 may indicate to mode selection unit 46 that the resource-focused mode should be selected. Alternatively, if the available power budget is above the first predetermined threshold, resource monitor 48 may indicate to mode selection unit 46 that the quality-focused mode should be selected. In some aspects, if the available power budget is below a second predetermined threshold, which is less than the first predetermined threshold, resource monitor 48 may indicate that interpolation-extrapolation could be disabled in favor of frame repetition or, possibly, neither interpolation, extrapolation nor frame repetition should be enabled, in order to conserve power in the device.

In monitoring available power in the power budget, resource monitor 48 may track MIPS expended per frame, data fetched per frame, and the amount of frame data sent for display over a given video sequence. For example, resource monitor 48 may maintain a running, cumulative total of MIPS, fetched data and displayed data for a particular GOP or other video sequence, and map such values to corresponding power consumption values. In particular, resource monitor 48 may map each of the values to a corresponding power consumption value, e.g., in one or more lookup tables, and then sum the values to produce an overall power consumption value. As an alternative, resource monitor 48 may access a multi-dimensional lookup table that maps a combination of indices relating to MIPS, fetched data and displayed data to an overall power consumption value for a frame or other video unit.

As a further alternative, resource monitor 48 may map such values to power consumption values on a frame-by-frame basis, and cumulatively add the power consumption values to produce a running total of power consumption over a video sequence. As an illustration, if a video sequence (e.g., a sequence of thirty frames) has a power budget of X and, at the nth frame in the sequence, the MIPS, fetched data and displayed data are estimated to have consumed an amount of power Y such that the available power budget is X−Y=Z, then resource monitor 48 may compare the available power budget to the predetermined first threshold to select either a quality-focused mode or a power-focused mode.

The power budget for the sequence may be divided by the number of frames in the sequence and updated over the course of the sequence in a variety of ways to provide more even allocation over the entire sequence, or frames in the sequence that may justify additional power budget, so that the power budget is not expended unevenly earlier in the video sequence. Various alternatives are available for estimating power consumption relative to a power budget in order to support selection of a quality-focused mode or a power-focused mode. Accordingly, the above examples are provided for purposes of illustration, and should not be considering limiting of the techniques broadly described in this disclosure.

In a quality-focused mode, FRUC unit 22 may perform reference frame selection based exclusively, primarily or substantially on one or more reference frame quality criteria. The quality criteria may indicate, for example, a level of interpolation or extrapolation quality likely to be produced by a selected reference frame. If none of the reference frames satisfies the quality criteria, frame substitution may be disabled by selection unit 44 for a particular frame to be added. In this case, frame substitution unit 38 may apply frame repetition instead of frame interpolation to approximate the frame to be added.

In a resource-focused mode, FRUC unit 22 may selectively enable or disable frame substitution for some frames based on a combination of both resource and quality considerations. For example, selection unit 44 may disable frame substitution when FRUC analysis unit 42 determines that the video sequence is generally static in the vicinity of the frame to be substituted. If the video sequence contains a low level of motion, there may be little or no advantage in performing substitution because the visual differences between interpolation or extrapolation and frame repetition may be small or even imperceptible. In this case, by disabling substitution, decoder 14 can avoid expending power and resources for interpolation or extrapolation with little impact to visual quality.

When there is sufficient motion to justify substitution in the resource-focused mode, analysis unit 42 may perform the quality analysis identical or similar to that used in the quality-focused mode. Hence, the resource-focused and quality-focused modes may not be completely separate modes. Rather, when the resource-focused mode is activated, the quality-focused mode may proceed only if the motion level is sufficient to justify interpolation or extrapolation, as applicable. The quality-focused mode may be activated alone, or the resource-focused mode may operate to disable frame substitution and thereby deactivate the quality-focused mode or enable substitution and activate the quality-focused mode. Notably, even in the quality-focused mode, substitution may be disabled if none of the candidate reference frames satisfy the quality criteria.

As an option, in the resource-focused mode, when substitution is enabled, the quality thresholds used for the quality analysis may be adjustable, e.g., as a function of the resource saving requirements of the video decoder 14. For example, the threshold may be adjusted based on available interpolation resources of the video decoder 14, such as available power, computing resources, and/or memory resources. In some implementations, the quality threshold may be adjusted based on a level of available power resources, such as a level of available power resources associated with video decoder 14, a video post-processor, and/or a video display processor, such as a mobile display processor (MDP). In either case, whether thresholds are fixed or adjustable, if substitution is enabled, analysis unit 42 may apply one or more quality criteria to select reference frames or disable substitution.

As an example, if the video sequence in the vicinity of the frame to be added is characterized by very low motion video content, the benefit of video frame interpolation or extrapolation may not be very noticeable. Hence, FRUC unit 22 may decide not only which frames to use as reference frames for video frame substitution, but also which frames to add by frame substitution, i.e., which frames to interpolate or extrapolate. For some frames, the cost of interpolation or extrapolation may not be justified by sufficient enhancement of temporal visual quality. For example, by avoiding interpolation for some skipped frames, in the resource-focused mode, FRUC unit 22 may balance savings in computing resources and associated power consumption with enhancement in interpolated frame quality and temporal visual quality of the video sequence. A zero motion vector count and/or small motion vector count may be used as decision criteria for determining whether to interpolate or extrapolate a particular frame based on motion content. Count thresholds may be derived in different ways. For example, the thresholds may be fixed for one or both of the zero motion vector count and the small motion vector count judge motion activity. Alternatively, one or both of the thresholds may be adjusted, e.g., based on resource levels of decoder 14.

In the examples of FIGS. 3 and 4, for quality-focused selection of reference frames for substitution, video decoder 14 may rely on a variety of quality-related criteria. For example, FRUC unit 22 may select reference frames for use in video frame substitution based on slice and/or frame loss information of the reference frames in combination with the reliability and type of error concealment method provided to reconstruct the reference frames. FRUC unit 22 may be configured to analyze the level of error due to the loss, and the quality of the error concealment mechanism available to correct the error. Alternatively, or additionally, FRUC unit 22 may analyze QP values and CBP values associated with the candidate frames as an indication of the relative quality levels of the frames. For example, the QP value may be coupled with the CBP value to judge the quality of a reference frame.

FRUC unit 22 also may apply objective visual quality metrics. The objective visual spatial quality metrics may be non-reference metrics such as structural similarity metric (SSIM), blockiness, and/or blurriness. The objective quality metrics may alternatively or additionally include color bleeding. The objective quality metrics may be used to produce quality scores for the candidate reference frames. Other examples of quality criteria may include the types of intra modes used in the candidate reference frames, or the intra mode and motion vector count for each of the candidate reference frames. Additional criteria may also be utilized as needed.

In some aspects, as described previously, FRUC unit 22 may be configured to disable frame substitution or bias the selection of reference video frames toward previous frames instead of future frames when a given video application requires shorter delays in end-to-end processing. In a video telephony application, for example, users may be engaged in a real-time or near real-time video conference which may require reduction or elimination of delays in processing and presentation of video. If a frame substitution technique relies on future frames, e.g., for interpolation or extrapolation, the delay in decoding and processing such future frames in order to produce an additional frame may not be tolerable. In this case, when the video application imposes a delay requirement, FRUC unit 22 may be configured to disable frame substitution, prohibit selection of future candidate reference frames, or prohibit selection of future candidate reference frames that are not within a predetermined number of frames of the frame to be added.

For example, as shown in FIG. 4, FRUC unit 22 may optionally include a delay detection unit 51 that detects a maximum delay or other quality of service requirement imposed by a given video application, and directs selection unit 44 to disable frame substitution or require selection of past frames or early future frames as reference frames for interpolation or extrapolation. If delay detection unit 51 detects that a video telephony application or other delay-sensitive video application requires minimal delay, the delay detection unit 51 may direct selection unit 44 to disable frame substitution. A delay-sensitive application or type of application that may be delay-sensitive may be detected by delay detection unit 51 based on receipt of a specific signal from a device in which a decoder 14 is embedded, receipt of a specific signal provided in side information associated with video data received by the decoder 14, or in any of a variety of other ways. In the case of detection of a delay-sensitive application, substitution unit 38 may apply frame repetition or deactivate FRUC altogether in order to avoid disconcerting delays that could undermine the quality of a video conference for the users.

Alternatively, delay detection unit 51 may direct selection unit 44 (and/or analysis unit 42) to enable frame substitution but require the use of past reference frames or early future reference frames for interpolation or extrapolation, e.g., based on a temporal distance requirement. Hence, delay detection unit 51 may impose constraints on selection unit 44 to avoid selection of particular future reference frames indicated as having sufficient quality, but excessive temporal distance from the frame to be added.

For example, frames that are one or two frames into the future, relative to the frame to be added, may be acceptable for use as reference frames for frame substitution. If a future frame is at a temporal distance that is several frames away from the frame to be added, however, the processing and presentation delay that could result from waiting for the frame to be decoded and analyzed may be unacceptable. The distance analysis may be applied to candidate reference frames after quality analysis or before quality analysis. If the distance analysis is applied before quality analysis, delay detection unit 51 may direct analysis unit 42 to suspend the quality analysis for a particular candidate reference frame if the candidate reference frame is a future frame and the distance of the frame from the frame to be added is too great.

As an alternative, delay detection unit 51 may direct analysis unit 42 to adjust its quality analysis when delay is a concern such that future reference frames that are situated an excessive distance from the frame to be added are given lower quality scores, or excluded from consideration in the quality analysis. In either case, the effect may be that some future reference frames are excluded from selection as reference frames so that frame substitution may proceed without adversely impacting delay characteristics of a delay-sensitive video application, such as video telephony. In some cases, for video telephony or other delay-sensitive video applications, delay requirements may preclude frame substitution, e.g., due to the real-time or near real-time service requirements of the video telephony application. For video streaming and playback, however, delay issues ordinarily may be less of a concern.

As described above, in some implementations, one or more of the candidate reference video units for use in interpolation or extrapolation of an additional video unit may be selected based at least in part on the temporal distance of one or more of the candidate reference video units from the additional video frame. The candidate reference video units may be selected based on temporal distance when a delay-sensitive application is detected. Alternatively, the candidate reference video units may be selected based on temporal distance on a regular basis, or in response to some other triggering event. Hence, in some aspects, temporal distance may form part of a quality analysis that is applied for selection of reference frames for use in interpolation or extrapolation.

Figure 5:
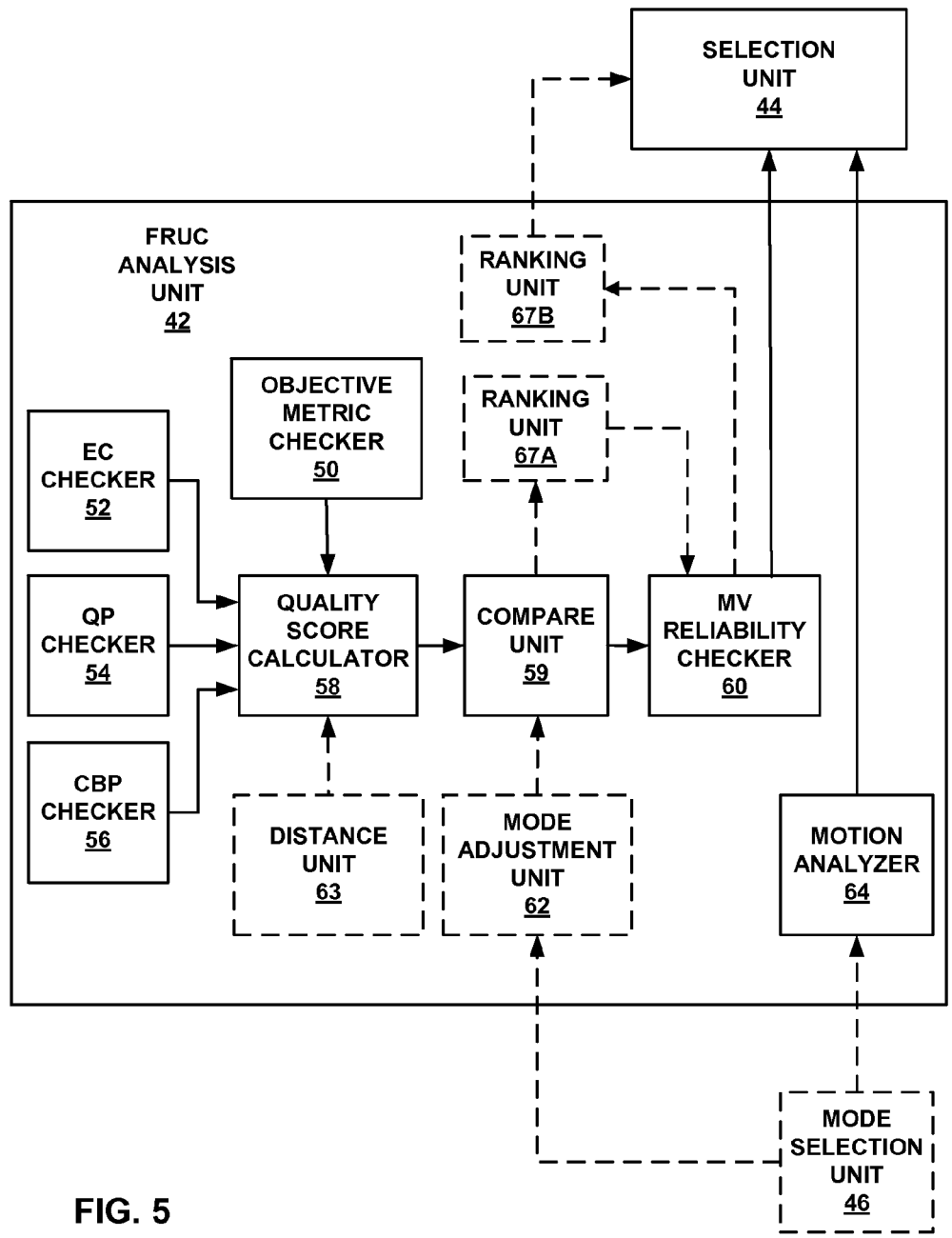
FIG. 5 is a block diagram illustrating an analysis unit that may be used with a video decoder as shown in FIG. 3 or FIG. 4.

FIG. 5 is a block diagram illustrating a reference frame analysis unit 42 for use with the video decoder 14 of FIG. 3 or FIG. 4. As mentioned previously, although analysis and selection of reference video frames is described for purposes of illustration, the structure and functionality of analysis unit 42 may be adapted for analysis and selection of other reference video units, such as slices or blocks (e.g., macroblocks or smaller blocks). In the example of FIG. 5, analysis unit 42 includes an objective metric checker 50, an error concealment (EC) checker 52, a quantization parameter (QP) checker 54, a coded block pattern (CBP) checker 56, a quality score calculator 58, compare unit 59, and a motion vector (MV) reliability checker 60.

The various units shown in FIG. 5 may be used in a quality-focused mode of operation, as well as a resource-focused mode of operation when interpolation is enabled. When the resource-focused mode of operation is selected, e.g., by mode selection unit 46, analysis unit 42 may activate a motion analyzer 64. In addition, optionally, analysis unit 42 may activate a mode adjustment unit 62 in the resource-focused mode. Selection unit 44 may consider outputs of MV reliability checker 60 and motion analyzer 64 to determine whether to perform frame substitution for a frame to be added and, if so, whether to select a frame being analyzed as a reference frame for use in frame substitution to add the frame.

Objective metric checker 50 may be configured to analyze candidate reference frames to determine SSIM values, and/or degrees of blockiness, blurriness, or color bleeding associated with such frames, and generate a quality score based on the determination. The quality score produced by objective metric checker 50 for a particular candidate reference frame may be low when substantial blockiness, blurriness, and/or color bleeding is detected, and high when substantially no blockiness, blurriness, and/or color bleeding. The quality score for different candidate reference blocks may vary between high and low as a function of such objective visual quality metric characteristics. Alternatively, the quality score may be expressed as either high or low based on comparison to a predetermined threshold.

When analysis unit 42 makes use of objective metric checker 50, the objective metric checker may be applied to decoded frames that are reconstructed by decoding unit 36. Hence, analysis unit 42 may analyze encoded frames obtained from received frame buffer 34 and, via objective metric checker 50, may receive and analyze reconstructed frames obtained by decoding frames from received frame buffer 34 via decoding unit 36. Objective metric checker 50 may analyze the reconstructed candidate reference frames for SSIM value, blockiness, blurriness, color bleeding or other objective quality metrics to generate a quality score.

EC checker 52 analyzes the candidate reference frames to determine whether each frame has suffered slice and/or frame loss and, if so, whether a reliable error concealment mechanism is available to reconstruct the encoded frame obtained from received frame buffer 34. In this sense, EC checker 52 may operate as an EC reliability checker. If the loss results in an error above a predetermined level, EC checker 52 may evaluate the quality of the error concealment mechanism available to correct the error. When there is no slice or frame loss, or there is a sufficient error concealment mechanism to compensate for the slice or frame loss, EC checker 52 may generate a relatively high score for a particular candidate reference frame. When error concealment is insufficient to compensate for the slice or frame loss, EC checker 52 may generate a low score. The score generated by EC checker 52 may vary according to the amount of slice or frame loss, or simply a high or low score based on comparison to a predetermined threshold.

EC checker 52 may determine whether there is a sufficient error concealment mechanism available in a variety of ways. As an example, EC checker 52 may identify the type of error concealment based on predetermined knowledge of the error concealment used for the type of video coding, e.g., H.264 (using motion vector from co-located macroblock), or the type of video coding known to be performed in the chip or chipset in which the decoder 14 is implemented. EC checker 52 may rely on previous off-line analysis of the effectiveness of particular error concealment mechanisms for different slice or frame loss scenarios.

For example, each error concealment mechanism may be rated for effectiveness in dealing with different numbers of losses, different locations of losses, numbers of affected blocks or units, error detection time, and the like. EC checker 52 may determine one of more of the above characteristics (i.e., number of losses, locations, error detection time) associated with a particular slice or frame loss, and then determine whether the available error concealment mechanism will be effective given those characteristics, and given prior knowledge of the performance of such an error concealment mechanism under similar conditions.

As an illustration, if error concealment mechanism X is used in decoder 14, and it is known that mechanism X is effective for losses characterized by number of losses less than Y1, location of losses in particular regions, and number of affected blocks/units less than Y2, given time for error detection processing of more than a time Z, then a loss that conforms to the above characteristics should be capable of concealment using mechanism X, in which case EC checker 52 may generate a high EC score.

In various scenarios, error concealment may fail if any one of the characteristics is not satisfied, or if one or more combinations of characteristics present in the slice or frame loss. If the loss does not conform to the above characteristics, EC checker 52 may generate a low EC score. Hence, EC checker 52 may rely on knowledge of the type of error concealment mechanism, and its effectiveness in concealing slice or frame losses having different characteristics.

QP checker 54 analyzes the quantization parameter (QP) values associated with each candidate reference frame. In general, a QP value indicates a quantization step size of the transform coefficients in a respective block of an encoded video frame. The QP value may be the same for all blocks in a frame, or vary for different blocks. As an example, QP checker 54 may analyze an average QP value of the blocks that form a reference frame. Alternatively, QP checker 54 may analyze a maximum or minimum QP value for a frame. QP checker 54 may generate a relatively low score if the average QP value for a frame is high, indicating coarse quantization of the video data in case of H.264 coding. Smaller QP values indicate finder quantization step size in H.264 coding, and generally higher video quality. Hence, for H.264 coding, if the average QP value is lower, QP checker 54 may generate a higher quality score.

CBP checker 56 analyzes a CBP value for each candidate reference frame. The CBP value may be an average CBP value for the blocks that form the frame. In general, the CBP value indicates that there are either no nonzero transform coefficients in a block or that there is at least one nonzero coefficient in a block. The transform coefficients may reside in a compression domain such as a discrete cosine transform (DCT), wavelet transform, or other compression transform domain. The CBP value analyzed by CBP checker 56 may be a luma or chroma CBP value, or both. For a given frame, CBP checker 56 may determine the number of blocks for which the CBP value indicates at least one nonzero transform coefficient value. In some aspects, QP checker 54 and CBP checker 56 may be combined. In this case, a combined score may be generated based on the average QP value and the CBP value.

If the QP value is below a predetermined QP threshold, and the CBP value is generally zero, indicating that substantially none of the blocks have nonzero coefficients, the quality of the frame may be indicated by a high score. A CBP value that is generally regarded as zero may be determined when the number of blocks for which the CBP value indicates at least one nonzero coefficient is below a CBP threshold. Alternatively, if the QP value is above the QP threshold, then the score may be low. A very high QP and zero or medium CBP value may indicate a low score. If the CBP is zero and the QP value is below the threshold, the motion estimation for a block is very accurate, which should result in a high quality score.

Quality score calculator 58 may be configured to generate an overall quality score for a candidate reference frame based on the outputs of one or more of objective metric checker 50, EC checker 52, QP checker 54, and CBP checker 56. The individual scores produced by objective metric checker 50, EC checker 52, QP checker 54, and CBP checker 56 may be constructed simply as high or low quality values, or high, medium or low quality values. Alternatively, the scores may be computed along numerous gradations or a substantially continuous scale. Quality score calculator 58 may accord equal weighting to each of the scores produced by objective metric checker 50, EC checker 52, QP checker 54 and CBP checker 56. Alternatively, quality score calculator 58 may apply a predetermined, uneven weighting to the scores such that the total quality score is a weighted summation of all of the scores.

As an illustration, in some implementations, quality score calculator 58 may attribute more weight to the scores output by QP checker 54 and CBP checker 56, than to the scores output by EC checker 52 and objective metric checker 50. In other implementations, the output of EC checker 52 may be more important. As stated above, quality score calculator 58 may weight the outputs. As an alternative, each of the checkers 50, 52, 54, 56 may be configured to produce an individually weighted score with preassigned weights. Quality score calculator 58 outputs a total score indicative of the quality of the candidate reference frame for use in interpolation of a skipped frame.

Given the quality characteristics used to calculate the score, e.g., objective metrics, EC characteristics, QP and CBP characteristics, the total score may indicate whether the candidate reference frame is likely to produce a frame substitution result with an acceptable level of quality. Compare unit 59 may compare the total score to a quality threshold value. If the total score is satisfactory, e.g., exceeds the quality threshold value, compare unit 59 indicates that the candidate reference frame has a level of quality that is acceptable for selection as a reference frame for interpolation or extrapolation, as applicable, of an additional, i.e., extra, frame. If the total score is less than the quality threshold value, then compare unit 59 determines that the candidate reference frame is not acceptable for selection as a reference frame for interpolation or extrapolation, as applicable. In each case, analysis unit 42 may then proceed to analyze the next candidate reference frame for the additional frame currently under consideration, or proceed to analyze reference frames for the next frame to be added. The number of candidate reference frames considered for a particular substitute frame may be varied according to design considerations.

If the total score is satisfactory, e.g., meets or exceeds the quality threshold value, compare unit 59 may indicate that the candidate reference frame under consideration is suitable for selection as a reference frame on the basis of quality. Alternatively, compare unit 59 may select the reference frames that are ranked most highly, as described above. In either case, in some implementations, to approve the reference frame for selection, analysis unit 42 may further include a motion vector (MV) reliability checker 60. MV reliability checker 60 may analyze the reliability of motion vectors in the candidate reference frame to ensure that the selected reference frames will produce quality frame substitution results if video frame substitution makes use of a motion-compensated prediction method for interpolation or extrapolation.

If the motion vectors are reliable, MV reliability checker 60 may indicate to selection unit 44 that the candidate reference frame under analysis may be selected as a reference frame for frame substitution. If the motion vectors are not reliable, however, MV reliability checker 60 may reject the candidate reference frame even though it has satisfied the quality requirements of compare unit 59. In this case, MV reliability checker 60 may indicate to selection unit 44 that the candidate reference frame under analysis should not be selected as a reference frame for frame substitution.

In some implementations, compare unit 59 may indicate appropriate frames for selection as reference frames as they are considered. In other words, as analysis unit 42 analyzes each candidate reference frame, if it identifies a suitable candidate reference frame, it may indicate that the candidate reference frame should be selected. The process may continue until analysis unit 42 identifies a sufficient number and type of candidate reference frames, at which point analysis unit 42 may stop analysis of candidate reference frames for interpolation or extrapolation of a current frame and move on to analysis of candidate reference frames for interpolation of the next frame to be added in the video sequence.

As a simple illustration, analysis unit 42 may identify a single previous reference frame and a single future reference frame for interpolation of a frame that resides temporally between the previous and future frames. Alternatively, for more complex types of interpolation, analysis unit 42 may identify multiple previous and future reference frames that can be selected for interpolation of a frame to be added. In each case, analysis unit 42 may analyze a subset of previous and future frames adjacent to the frame to be added until a sufficient number and type (e.g., previous and future, if necessary) are identified for selection. A finite number of frames may be analyzed. If none of the analyzed frames produces a sufficient quality score, then analysis unit 42 may indicate that no frames are selected, and that frame substitution unit 38 should apply frame repetition instead of frame substitution.

In some implementations, analysis unit 42 may use other types of quality criteria, such as the types of intra-coding modes used in candidate reference frames and/or intra mode and motion vector counts for the candidate reference frames. As an example, if the number of intra-coded blocks (e.g., macroblocks) in a particular candidate reference frame exceeds a mode decision threshold, analysis unit 42 may indicate that a low interpolation quality for the reference frame, e.g., such that the candidate reference frame should not be used for interpolation of an additional frame. The mode decision threshold may be static or dynamically adjusted, e.g., based on a number of blocks having a number of coding bits above a threshold in a candidate reference frame. A wide variety of other quality criteria may be used. Such information used for quality analysis may be considered as alternatives, or in addition, to other information described in this disclosure, such as objective quality metrics, QP and CBP characteristics, and EC characteristics.

Some additional frames may be interpolated or extrapolated using some of the same reference frames as other nearby frames to be interpolated or extrapolated. For this reason, in some cases, once a candidate reference frame is analyzed for quality, it may be desirable to store information relating to the quality for the candidate reference frame. In this manner, if the particular candidate reference frame is later considered as a candidate reference frame, its quality can be quickly determined without the need to perform the analysis again. The candidate reference frame may be relevant as a potential reference frame for a few frames to be interpolated or extrapolated in a portion of a video sequence.

As the video sequence proceeds, the stored information may become obsolete or at least less relevant due to the increasing temporal remoteness of the candidate reference frame relative to the frames to be interpolated or extrapolated. Accordingly, the information can be discarded at some point, e.g., after the video sequence has proceed to a point that is more than a predetermined number of frame away from the candidate reference frame. By storing quality information, it may be necessary to perform the quality analysis in analysis unit 42 only once for each candidate reference frame. Alternatively, quality analysis may be performed each time the frame is identified as a candidate reference frame for a frame to be added.

In some implementations, analysis unit 42 may be configured to rank the candidate reference frames that are analyzed in terms of pertinent quality levels. For example, analysis unit 42 may include a ranking unit (67A or 67B) that ranks candidate reference frames. In this case, instead of stopping when a suitable number and type of frames having quality scores that satisfy the quality threshold value have been found, analysis unit 42 may rank candidate reference frames to identify the frames producing the best quality scores. For example, analysis unit 42 may rank candidate reference frames that satisfy a quality level, e.g., meet or exceed the quality threshold value, as indicated by compare unit 59, in order of total quality score, and select the candidate reference frames that are ranked most highly.

As one option, with reference to FIG. 5, analysis unit 42 may include a ranking unit 67A that evaluates and ranks candidate reference frames identified by compare unit 59 as satisfactory, i.e., as meeting or exceeding the quality threshold value. Ranking unit 67 may select a number of the most highly ranked reference frames, consistent with the number of reference frames required for the type of frame substitution applied by frame substitution unit 38. The selected, i.e., most highly ranked candidate reference frames, then may be passed from ranking unit 67A to MV reliability checker 60 to determine whether they have reliable MV content. If so, MV reliability checker 60 may indicate to selection unit 44 that the frames should be selected for use in frame substitution. If the most highly ranked candidate reference frames do not have reliable MV content, MV reliability checker 60 indicates to selection unit 44 that frame substitution unit 38 should apply frame repetition instead of frame substitution.

As another option, because the ranking may be influenced by unreliable MV content, analysis unit 42 may pass all ranked candidate reference frames having quality scores that are satisfactory, e.g., meet or exceed the quality threshold value, to MV reliability checker 60. In particular, compare unit 59 may provide all candidate reference frames with passing scores to MV reliability checker 60. MV reliability checker 60 identifies the candidate reference frames that have both a satisfactory quality score, e.g., that meets or exceeds the quality threshold value, e.g., as indicated by compare unit 59, and reliable MV content. Analysis unit 42 may optionally include a ranking unit 67B that receives the output of MV reliability checker 60 and ranks the candidate reference frames in terms of quality score. Ranking unit 67B then may select a number of the most highly ranked candidate reference frames, and communicate the selected reference frames to selection unit 44. Selection unit 44 may notify frame substitution unit 38 of the selected reference frames for use in frame substitution to add a video frame.

MV reliability checker 60 may omit candidate reference frames that do not have reliable MV content, leaving the remaining candidate reference frames for ranking and selection as reference frames by ranking unit 67B. In particular, ranking unit 67B may identify the most highly ranked candidate reference frames that have reliable MV content to selection unit 44 for selection as reference frames as interpolation. Again, the number of reference frames that are selected may be a function of the type of frame substitution used by frame substitution unit 38, i.e., the type of interpolation or extrapolation, and the number of reference frames needed to support the frame substitution process.

MV reliability checker 60 may analyze motion vector reliability using any of a variety of different techniques. As one example, MV reliability checker 60 may be configured to apply a motion difference based approach. MV reliability checker 60 may operate to analyze motion vector information in both an X (horizontal) direction and a Y (vertical) direction of a video frame. In this case, MV reliability checker 60 may determine whether the differences between motion vectors in the X direction of blocks (e.g., macroblocks) in the candidate reference frame and motion vectors in the X direction of co-located blocks in a previous frame exceed a threshold. In this case, MV reliability checker 60 may determine that the motion vectors in the candidate reference frame are not reliable. For example, MV reliability checker 60 may count the number of unreliable motion vectors in the candidate reference frame, or determine an overall average difference between motion vectors in the candidate reference frame and the previous reference frame.

In addition to determination of motion vector reliability in the X (e.g., horizontal) direction, MV reliability checker 60 may determine motion vector reliability in the Y (e.g., vertical) direction in a similar manner. If MV reliability checker 60 detects either X direction MV unreliability or Y direction MV unreliability, the MV reliability checker may reject the current candidate reference frame under consideration and indicate to selection unit 44 that the candidate reference frame should not be selected as a reference frame for interpolation of a skipped frame. As an alternative, in some implementations, angle information may be used to evaluate both motion vector magnitude and direction. If MV's for the candidate reference frame are reliable, however, MV reliability checker 60 indicates to selection unit 44 that the candidate frame may be selected as a reference frame for interpolation or extrapolation of the extra frame.

As an alternative, MV reliability checker 60 may analyze MV reliability using a frame-to-frame motion change detection technique. According to this technique, MV reliability checker 60 may be configured to detect when the motion in the current candidate reference frame has changed substantially from the motion in another, adjacent frame, such as a previous or future frame. If the magnitude of the change is greater than a threshold value, MV reliability checker 60 determines that the MVs of the candidate reference frame are unreliable and should not be selected as a reference frame for frame substitution.

For the frame-to-frame motion change detection technique, to detect whether motion in the candidate reference frame and the adjacent frame is continuous, the following two methods may be used. First, motion change detection may be based on motion statistics. In this case, motion vector statistics may be calculated for both frames, i.e., the candidate reference frame and the adjacent frame. The statistics may include motion vector (magnitude and angle) mean and standard deviation. Second, motion change detection may be based on motion vector labeling. In this case, motion change detection based on statistics may rely on the range of motion on the frame level to make decision. The difference of motion for each co-located macroblock in the two frames may not be detected. To solve this problem, however, motion change detection based on motion vector labeling may be used.

As a further alternative, MV reliability checker 60 may analyze MV reliability using a motion trajectory based technique. In this case, the motion trajectory based approach determines whether a motion vector from the adjacent frame should be used by looking at where the macroblock would be in the candidate frame if it had followed the same motion trajectory as in the adjacent frame. If the object carried by the macroblock has significant overlap with the area of interest in the candidate frame (i.e., the location of the lost macroblock), then its MV may be considered reliable and the candidate frame should be used for frame substitution. Otherwise, if it moves away from the area of interest, then its MV is not reliable and the candidate frame should not be used for frame substitution.

The quality threshold value used by compare unit 59 may be predetermined and selected to represent a quality level that is believed to correlate with acceptable frame substitution results. The quality threshold value may be fixed or adjustable. In some implementations, for example, the quality value threshold value may be adjustable as a function of a mode in which decoder 14 operates. In operation, analysis unit 42 may first check whether the resource-focused mode is on or off. If mode selection unit 46 indicates the quality-focused mode, mode adjustment unit 62 may not adjust the existing quality threshold value. If mode selection unit 46 indicates the resource-focused mode, however, mode adjustment unit 62 may adjust the quality threshold value. For example, in some implementations, mode adjustment unit 62 may increase the quality threshold value to require the selection of higher quality frames as reference frames for interpolation or extrapolation of a frame.

In some implementations, when the resource-focused mode is selected, the quality threshold value may be increased from a first value to a second, increased value. In other implementations, when the resource-focused mode is selected, the quality threshold value may be increased to a value that is computed as a function of an available resource level. As resources such as available power or available computing resources become lower, for example, the quality threshold value may be higher. In this manner, the quality threshold value may be inversely proportional to the available resource level such that higher quality is required to justify the cost of frame substitution, i.e., cost of frame interpolation or extrapolation, when resource levels are lower. Hence, in some examples, in the resource-focused mode, analysis unit 42 may apply a motion activity threshold to determine whether to enable or disable frame substitution and, when frame substitution is enabled, use either a fixed quality threshold value or a quality threshold value that is adjusted as a function of available resource levels.

If none of the candidate reference frames for interpolation or extrapolation of a particular frame produce a quality score that satisfies the increased quality threshold value in the resource-focused mode, then no frames are selected for interpolation or extrapolation of the frame. In this case, selection unit 44 disables interpolation, in which case frame substitution unit 38 may suspend frame substitution and instead apply frame repetition. By requiring an increased quality threshold value in the resource-focused mode, mode adjustment unit 62, in effect, compels frame substitution unit 38 to disable frame substitution unless higher quality reference frames are available for frame substitution.

Mode selection unit 46 may select the resource-focused mode when resources are limited, e.g., when power, computing and/or memory resources are scarcer. The resource-focused mode may disable video frame interpolation when the benefit of video frame interpolation is not very noticeable, such as in the case of very low motion video content. In this manner, mode selection unit 46 and mode adjustment unit 62 impose a higher quality justification for frame interpolation or extrapolation when resources are limited. In other words, to justify the cost of frame substitution in terms of resource consumption, the actual results of the frame substitution should be of relatively high visual quality. When resources are less scarce, such that mode selection unit 46 selects the quality-focused mode, mode adjustment unit 62 may reduce the quality threshold value. The reduced quality threshold value permits frame substitution to proceed on a more frequent basis, as more candidate frames may be likely to satisfy the reduced quality threshold value.

In the resource-focused mode, mode selection unit 46 also may activate motion analyzer 64. In addition to activating mode adjustment unit 62 in some implementations to adjust the quality threshold value, motion analyzer 64 may analyze motion activity of one or more candidate reference frames to determine whether the pertinent video scene is relatively static or not. Motion analyzer 64 may analyze motion vector data from the candidate reference frames to determine whether the video scene is characterized by very little motion or significant motion. For example, motion analyzer 64 may analyze motion vectors of a current anchor frame to make a decision whether to enable or disable video frame substitution. The anchor frame may be a frame that is adjacent to, e.g., before or after, the skipped frame.

If there is very little motion indicated by the anchor frame, such that the scene is relatively static, motion analyzer 64 may generate an output to disable frame substitution. If the scene is relatively static, interpolation of a temporal, skipped frame ordinarily will not be justifiable, relative to frame repetition, even if the selected reference frames would produce a high quality frame substitution result. As an illustration, when the scene is relatively static, visual quality differences produced by frame interpolation and frame repetition may be relatively imperceptible. For this reason, the cost of interpolation and power consumed by video data traffic between video buffer and display is not justified by any significant gains in quality, and should be disabled. In this case, frame repetition may be more desirable from a quality and resource conservation perspective. When motion analyzer 64 indicates that frame substitution should be disabled, the quality-focused analysis for the currently considered reference frame may likewise be disabled.

In some implementations, motion analyzer 64 may compare the motion activity to a threshold value. The motion threshold value may be fixed or adjustable. For example, motion analyzer 64 may adjust the motion threshold value based on a level of available power, computing and/or memory resources. In the adjustable case, if the power resources are at a relatively high level, for example, the motion activity threshold value may be relatively low. If the power resources are at a relatively low level, for example, the motion threshold value may be relatively high. In either case, motion activity at or above the threshold value may trigger interpolation, subject to selection of one or more reference frames for use in frame substitution, consistent with the quality-focused mode of operation. For higher power levels, a lower threshold value means that less motion may be required to trigger frame substitution. For lower power levels, however, a higher threshold value means that higher motion may be required to trigger frame substitution.

Motion analyzer 64 and, optionally, mode adjustment unit 62, may be activated when mode selection unit 46 selects the resource-focused mode and deactivated when mode selection unit 46 selects the quality-focused mode. In the quality-focused mode, decoder 14 may operate to produce desirable visual quality. In the resource-focused mode, however, decoder 14 may combine both quality and resource conservation objectives. Mode selection unit 46 may select the resource-focused mode in response to detection of limited resources, e.g., by comparison of available resources to one or more resource thresholds. Hence, in some implementations, mode selection unit 46 may select the quality-focused mode by default and select the resource-focused mode based on the level of available resources. Alternatively, the resource-based mode may be the default mode, in which case mode selection unit 46 selects the quality-focused mode when available resources are above one or more resource thresholds.

In effect, mode selection unit 46 may direct selection unit 44 to selectively enable or disable interpolation or extrapolation of the additional video unit in the resource-focused mode, and direct the selection unit to enable interpolation or extrapolation of the additional video unit in the quality-focused mode. In particular, mode selection unit 46 may direct selection unit 44 to selectively enable or disable interpolation or extrapolation in the resource-focused mode by triggering motion analyzer 64. Selection unit 44 may then selectively enable or disable interpolation or extrapolation based on the output of motion analyzer 64. Alternatively, selection unit 44 may direct selection unit 44 to enable interpolation or extrapolation, e.g., by not triggering motion analyzer 64. Enablement of interpolation by selection unit 44 may still be subject to quality analysis by analysis unit 42 to select reference frames or to disable interpolation or extrapolation if no suitable reference frames are available.

As an additional, optional feature, in some aspects, analysis unit 42 may include a distance unit 63. As described above with reference to FIG. 4, a delay detection unit 51 may detect the operation of a delay-sensitive video application, such as a video telephony application. Delay detection unit 51 may direct selection unit 44 to avoid selection of future reference frames that are further in the future, relative to the frame to be added, in order to avoid delays in processing and presentation which could disrupt the visual quality of the video telephony. Accordingly, selection unit 44 may reject some candidate reference frames based at least in part on analysis of temporal distance of such frames from a frame to be added even though analysis unit 42 may indicate a relatively high quality for such frames. Although selection of reference frames based on temporal distance may be triggered based on detection of a delay-sensitive application, in some implementations, temporal distance may be used for reference frame selection on a regular basis, i.e., with or without detection of a delay-sensitive application.

As shown in FIG. 5, the delay feature may be built into analysis unit 42. In particular, instead of rejecting, via selection unit 44, future candidate reference frames that reside too far in the future relative to the frame to be added (i.e., based on excessive temporal distance), analysis unit 42 may be configured to assign relatively low quality scores to such frames. Selection unit 44 may not reject such frames based directly on temporal distance, but indirectly based on a low quality score resulting from the temporal distance. In either case, selection unit 44 can avoid selection of temporally distant reference frames that may introduce excessive latency into the frame substitution process. Again, temporal distance may be used for selection of reference frames on a selective basis when operation of a delay-sensitive application such as video telephony is detected, or on a regular basis, e.g., whether a delay-sensitive application is detected or not. In some cases, reference frames may be selected based at least in part on temporal distance on a regular basis without an operation that involves detection of a delay-sensitive application.

Distance unit 63 may determine, as one of the various frame characteristics, a distance of a future candidate reference frame from a frame to be added. Distance unit 63 may be configured to generate progressively lower scores for future candidate reference frames that are further away from the frame to be added. In some cases, distance unit 63 may produce a score of zero if a candidate reference frame is more than a maximum number of frames in the future relative to the frame to be added.

Distance unit 63 may be activated by delay detection unit 51 when a delay-sensitive video application is detected. Alternatively, delay detection unit 51 may cause the output of distance unit 63 to carry an increased weighting when a delay-sensitive application is detected. When an application, such as video playback, is not significantly delay-sensitive, distance unit 63 may be disabled or its output score may carry a reduced weighting in the overall quality score.

The various components, units or modules included in system 10, encoder 12 and decoder 14 in FIGS. 1-5, as well as other components described throughout this disclosure, may be realized by any suitable combination of hardware and/or software. In FIGS. 1-5, various components are depicted as separate components, units or modules. However, all or several of the various components described with reference to FIG. 1-5 may be integrated into combined units or modules within common hardware and/or software. Accordingly, the representation of features as components, units or modules is intended to highlight particular functional features for ease of illustration, and does not necessarily require realization of such features by separate hardware or software components. In some cases, various units may be implemented as programmable processes performed by one or more processors. For example, in various aspects, a motion analyzer, a resource monitor, and a selection unit could be realized by separate hardware and/or software units, or the same hardware and/or software units, or combinations thereof.

Figure 6:
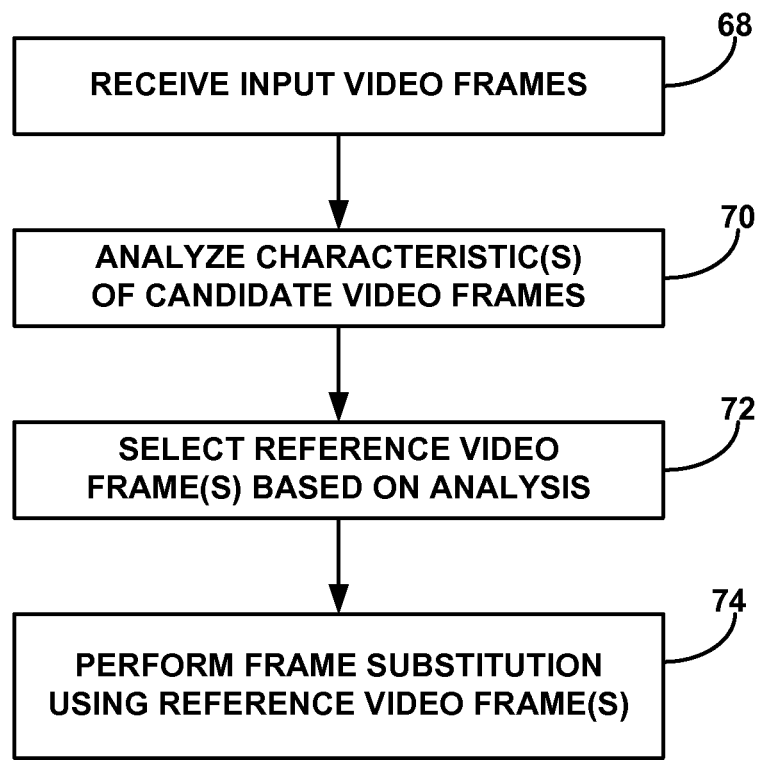
FIG. 6 is a flow diagram illustrating an example technique in which a video decoder selects reference video units for video unit substitution.

FIG. 6 is a flow diagram illustrating an exemplary technique in which video decoder 14 selects reference frames for video frame substitution. The process shown in FIG. 6 may be performed in the quality-focused mode, or in the resource-focused mode when frame substitution is enabled. As shown in FIG. 6, video decoder 14 receives input video frames (68). In the case of decoder 14, the input video frames may be received as encoded frames in an incoming bitstream, where some of the frames are missing due to frame skipping or the basic frame rate of encoder 12. In the case of an encoder 12, the input video frames may be source video frames to be encoded by the encoder. The temporal, excluded frames may be frames that have been intentionally skipped by video encoder 12 or frames that are lost in transmission across channel 19, or frames that were not supported by the basic frame rate of encoder 12 and need to be additionally created for frame rate conversion. In the example of FIG. 6, analysis unit 42 analyzes one or more characteristics of a set of candidate reference frames (70) for use in frame substitution.

The candidate reference frames may be selected from N previous frames and M future frames relative to the frame to be added, where N and M may be equal or unequal. As one illustration, three previous frames and three future frames may be considered, although the particular number of frames is for purposes of illustration and should not be considered limiting. Previous and future frames may be considered for bidirectional interpolation. For unidirectional interpolation or extrapolation, in some aspects, only previous frames or only future frames may be considered.

The one or more characteristics of the frames may relate to quality of the frames, and may be analyzed using pixel domain values, transform domain values, bitstream data, or otherwise. Based on the analysis, analysis unit 42 selects one or more of the candidate frames as reference frames (72). Using the selected candidate frames as reference frames, frame substitution unit 38 performs frame substitution by interpolation (or extrapolation, if applicable) of the frame to be added (74). The process outlined in FIG. 6 may be repeated on a substantially continuous basis by decoder 14 for interpolation (or extrapolation) of additional video frames in the received bitstream.

Figure 7:
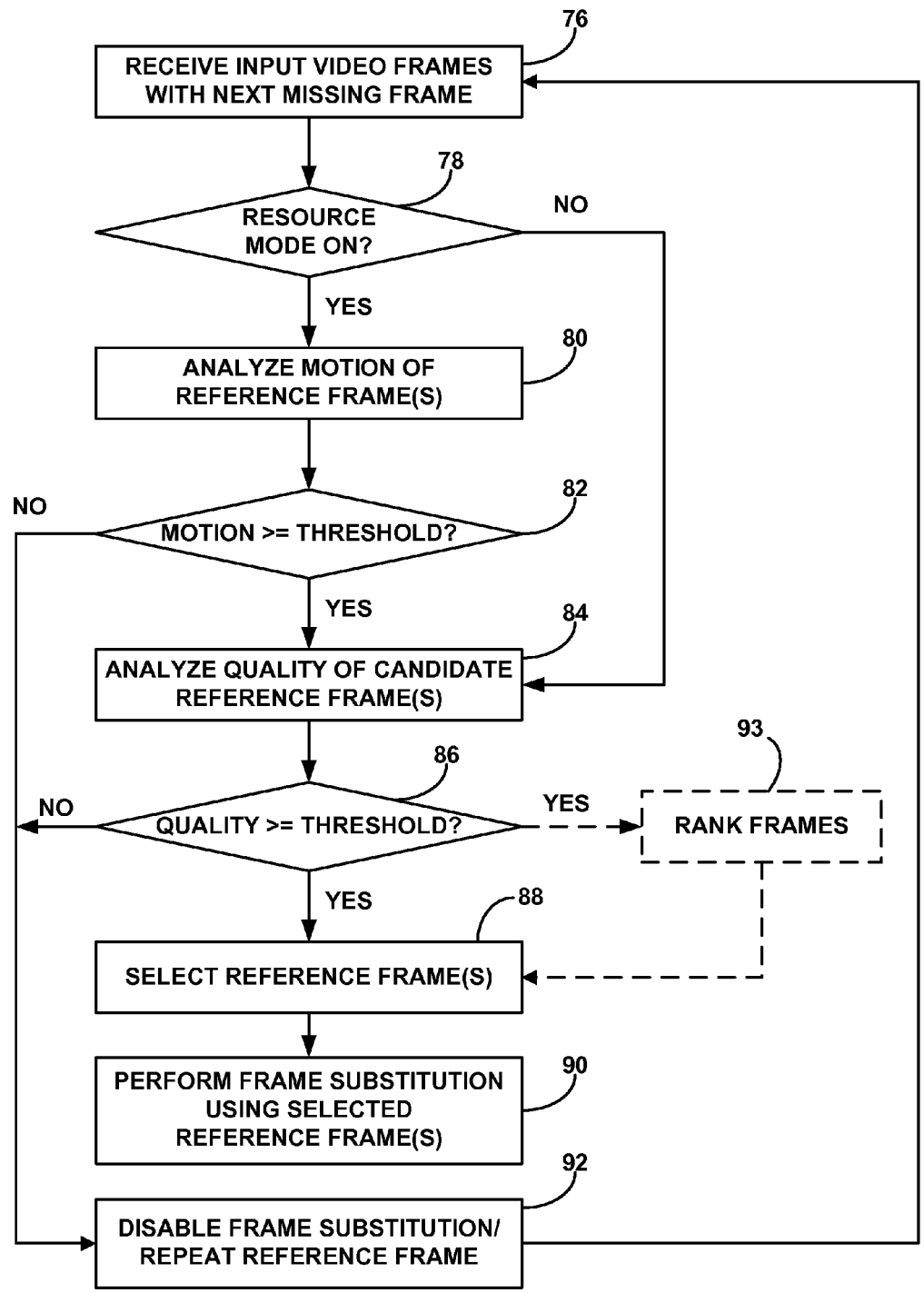
FIG. 7 is a flow diagram illustrating an example technique for reference video unit selection in more detail.

FIG. 7 is a flow diagram illustrating an example technique for reference frame selection in more detail. In general, analysis unit 42 may determine whether a resource-focused mode, such as a power-saving mode, is ON or OFF. If the resource-focused mode is ON, motion analyzer 64 analyzes motion activity of the candidate reference frame. For example, the received motion vectors for a candidate reference frame are analyzed. Based on motion vector analysis, a decision is made whether to interpolate (or extrapolate) a frame to be added or not. If the decision is to interpolate, the quality of reference frames are analyzed next, consistent with the quality-focused mode. Based on this analysis, another decision on whether to interpolate or extrapolate is made. If interpolation or extrapolation is elected, a reference frame (or frames) is selected based on quality analysis. Video frame interpolation or extrapolation is then performed using at least the selected reference frame and possibly multiple reference frames.

The process outlined in FIG. 7 may be repeated on a substantially continuous basis for each frame to be added, or selected frames to be added, in a video sequence received by video decoder 14. In the example of FIG. 7, decoder 14 receives an incoming bitstream containing encoded input video frames of a video sequence and excluding some frames (76). For interpolation or extrapolation of a missing frames, video decoder 14 may determine whether a resource-focused mode is ON or OFF (78). For example, mode selection unit 46 may indicate whether the frame substitution process of decoder 14 should operate in a resource-focused mode or a quality-focused mode.

If the resource-focused mode is activated (78), analysis unit 42 may activate motion analyzer 64 to analyze the motion indicated for each of the candidate reference frames (80). For example, motion analyzer 64 may analyze motion vector data from the candidate reference frames to determine whether the video scene is relatively static or includes significant movement. Motion analyzer 64 may analyze motion vectors of an anchor frame, such as a frame that is temporally adjacent to a substitute frame to be added, to make a decision whether to enable or disable video frame substitution.

If the motion level indicated by the anchor frame is greater than or equal to a threshold motion level (82), motion analyzer 64 may indicate to selection unit 44 that the level of motion is sufficient to justify frame substitution by interpolation (or extrapolation) of the frame to be added. In this case, analysis unit 42 may proceed to analyze the quality of the candidate reference frame or frames (84). If the motion level is below the threshold motion level, however, motion analyzer 64 indicates to selection unit 44 that frame substitution should not be used, in which case decoder 14 may repeat a reference frame (92) in place of the excluded frame instead of interpolating the frame. In this case, a previous or future frame may be repeated to effectively upconvert the frame rate of the video sequence.

In some implementations, for frame repetition, analysis unit 42 may simply select a previous frame or future frame and repeat that frame in place of the frame to be added. Because frame repetition is selected, there is no need to perform the various quality analysis operations of the quality-focused mode for the current frame. As an alternative, however, analysis unit 42 may apply the quality analysis to select a reference frame from one of a plurality of candidate reference frames and then use the selected reference frame as the repeated frame. In particular, analysis unit 42 may select a reference frame having a total quality score that satisfies, e.g., meets or exceeds, the quality threshold and use the selected frame for frame repetition. Hence, in some cases, quality-based selection of reference frames consistent with the quality-focused mode may be used not only for frame interpolation or extrapolation, but also for frame repetition.

If the motion level is at or above the threshold level (82), as discussed above, analysis unit 42 may proceed with the quality-focused mode of operation to analyze the quality of the candidate reference frame or frames and compare the resulting quality score to a quality threshold value (86). As described with reference to FIG. 5, for example, quality score calculator 58 may calculate a total quality score based on quality scores generated by one or more of objective metric checker 50, EC checker 52, QP checker 54, and CBP checker 56. Compare unit 59 may then compare the total quality score and compare it to the quality threshold value (86).

If the quality score is satisfactory, e.g., greater than or equal to the threshold (86), analysis unit 42 may indicate selection of the reference frame or frames to frame substitution unit 38. For example, selection unit 44 may identify the reference frame or frames for selection by frame substitution unit 38 for use in interpolation (or extrapolation) of the frame to be added. Frame substitution unit 38 may then proceed to perform frame substitution, e.g., by interpolating or extrapolating the frame using the selected reference frame or frames (90). If none of the candidate reference frames has a total quality score that is satisfactory, e.g., meets or exceeds the quality threshold value (86), compare unit 59 may indicate to selection unit 44 that no reference frames should be selected. In this case, selection unit 44 may indicate to frame substitution unit 38 that frame substitution should be disabled and that frame repetition should be applied (92) instead of frame substitution.

As shown in FIG. 7, analysis unit 42 may be optionally configured to rank candidate reference frames having total quality scores that satisfy the quality threshold (93). For example, for bi-directional interpolation, analysis unit 42 may rank previous candidate reference frames in order of quality level, rank future candidate reference frames in order of quality level, where previous frames are temporally prior to the frame to be added and future frames are temporally after the frame to be added, and then select the most highly ranked previous frame and the most highly ranked future frame for use in frame substitution. In the event of a substantial tie in the rankings, analysis unit 42 may select the frame that is temporally closest to the frame to be added. For unidirectional interpolation, analysis unit 42 may select the most highly ranked previous frame or the most highly ranked future frame, depending on whether the previous or future frame will be used as the reference frame. As a further example, in some cases, ranking may be used to select the most highly ranked frame for frame repetition, as well as frame substitution.

In some implementations, selection of the frames may be subject to MV reliability analysis by MV reliability checker 60, as described with reference to FIG. 5. In addition, in some implementations, the quality threshold value and/or other criteria or operations may vary between the quality-focused mode and the resource-focused mode. For example, mode adjustment unit 62 may increase the quality threshold value in the resource-focused mode to require higher interpolation quality to justify interpolation when resources are limited.

Figure 8:
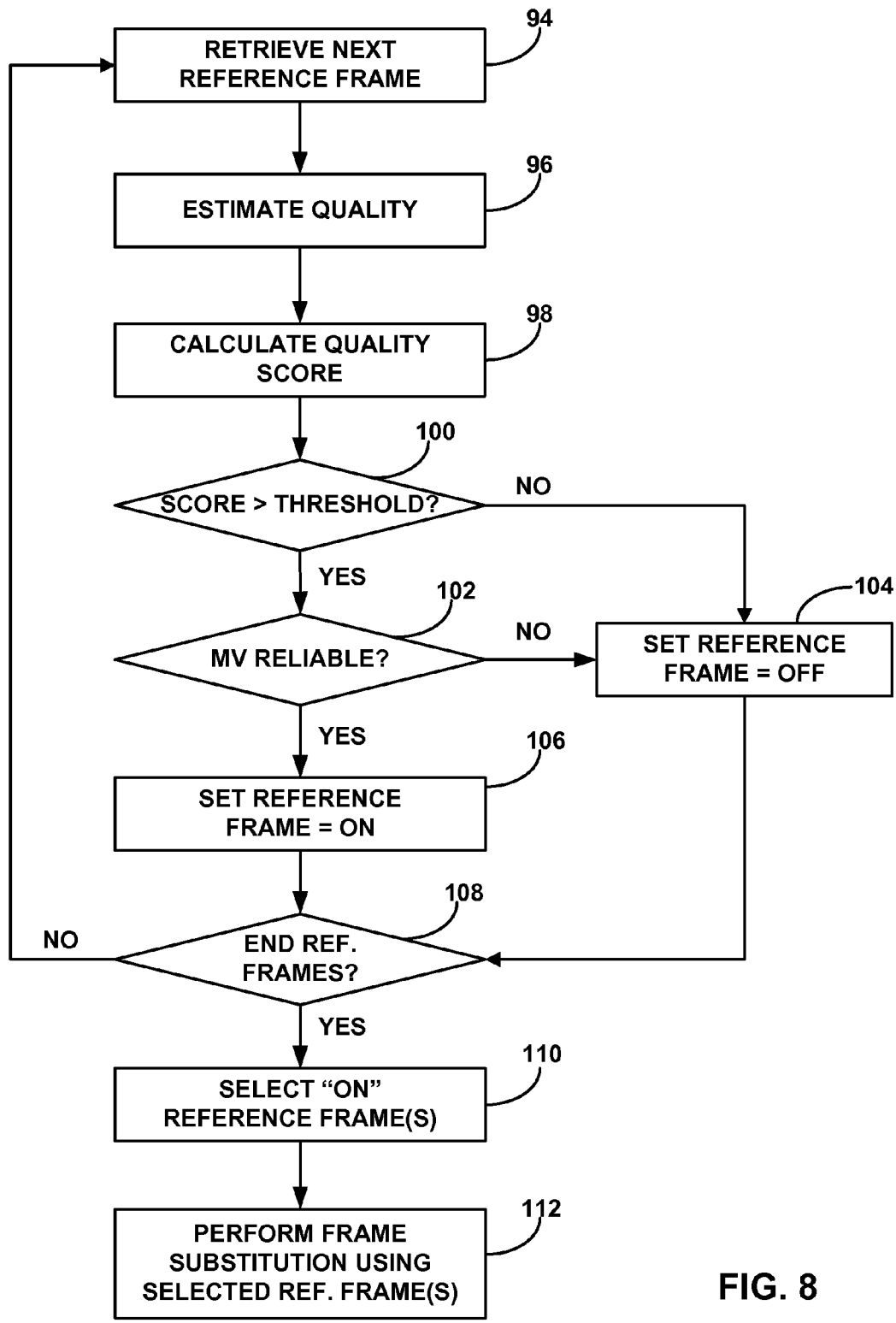
FIG. 8 is a flow diagram illustrating an example technique for quality analysis of reference video units to support reference video unit selection for video unit substitution.

FIG. 8 is a flow diagram illustrating an example technique for quality analysis of reference frames to support reference frame selection for video frame interpolation in accordance with a quality-focused mode. In general, the quality of candidate reference frames is estimated or analyzed. A quality score may be given for each candidate reference frame. The candidate reference frame may be a previous or future frame, relative to a skipped frame. If the quality score of a particular reference frame is not greater than or equal to a threshold, it is not selected to be used in video frame substitution. If the quality score of the reference frame is adequate, then the reference frame may be selected to be used in video frame interpolation or extrapolation. In some implementations, analysis unit 42 may require that motion vectors associated with the candidate reference frame are reliable. For example, motion vectors may be checked if video frame substitution uses a motion-compensated prediction method for interpolation or extrapolation.

As shown in the example of FIG. 8, analysis unit 42 may analyze multiple candidate reference frames in succession to identify reference frames, including previous frames and future frames, for interpolation or extrapolation of a frame. Upon retrieving the next candidate reference frame (94) from received frame buffer 34, analysis unit 42 estimates the quality of the candidate reference frame (96) and calculates a quality score (98), e.g., as described above with reference to FIG. 5. Is the score is satisfactory, e.g., greater than or equal to the quality threshold value (100), compare unit 59 passes the candidate reference frame to MV reliability checker 60 to determine whether the MV content of the frame is reliable (102).

If the total quality score is not greater than or equal to the quality threshold value (100), analysis unit 42 may set the candidate reference frame to "OFF" for purposes of selection for frame substitution (104). In this case, selection unit 44 does not select the "OFF" frame for interpolation or extrapolation of a substitute frame by frame substitution unit 38. If the total quality score is greater than or equal to the quality threshold value (100), and MV reliability checker 60 determines that the MV content is reliable (106), analysis unit 42 may set the candidate reference frame to "ON" for purposes of selection for frame substitution (106).

If analysis unit 42 has not considered all of the candidate reference frames, i.e., it has not reached the end of the candidate reference frames (108) in a predefined range of candidate reference frames, analysis unit 42 retrieves the next candidate reference frame for analysis. The number of candidate reference frames analyzed by analysis unit 42 may be preselected, and may include one or more previous frames and one or more future frames relative to the frame to be interpolated or extrapolated, e.g., as described with reference to FIGS. 2A-2D. When the end of the candidate reference frames is reached (108), selection unit 44 may select the candidate reference frames that have been set to "ON" (110) and communicate the selected frames to frame substitution unit 38. Frame substitution unit 38 then may interpolate or extrapolate the frame to be added too perform frame substitution using the selected reference frame or frames (112).

If there are no reference frames set to "ON," or an insufficient number of "ON" frames, selection unit 44 may indicate that frame substitution should be disabled, and that frame substitution unit 38 should instead apply frame repetition for the frame to be added. In some implementations, the FRUC process in FRUC unit 22 may be enabled and disabled on a selective basis. When FRUC is enabled, the process outlined in FIG. 8 may be repeated on a substantially continuous basis for each frame to be added, or selected frames, in the video sequence received by video decoder 14.

Again, as described with reference to FIG. 7, the process shown in FIG. 8 may include a ranking operation in which candidate reference frames that satisfy the quality threshold value are ranked. In this case, the highest ranked frames may be selected as reference frames for frame substitution.

Figure 9:
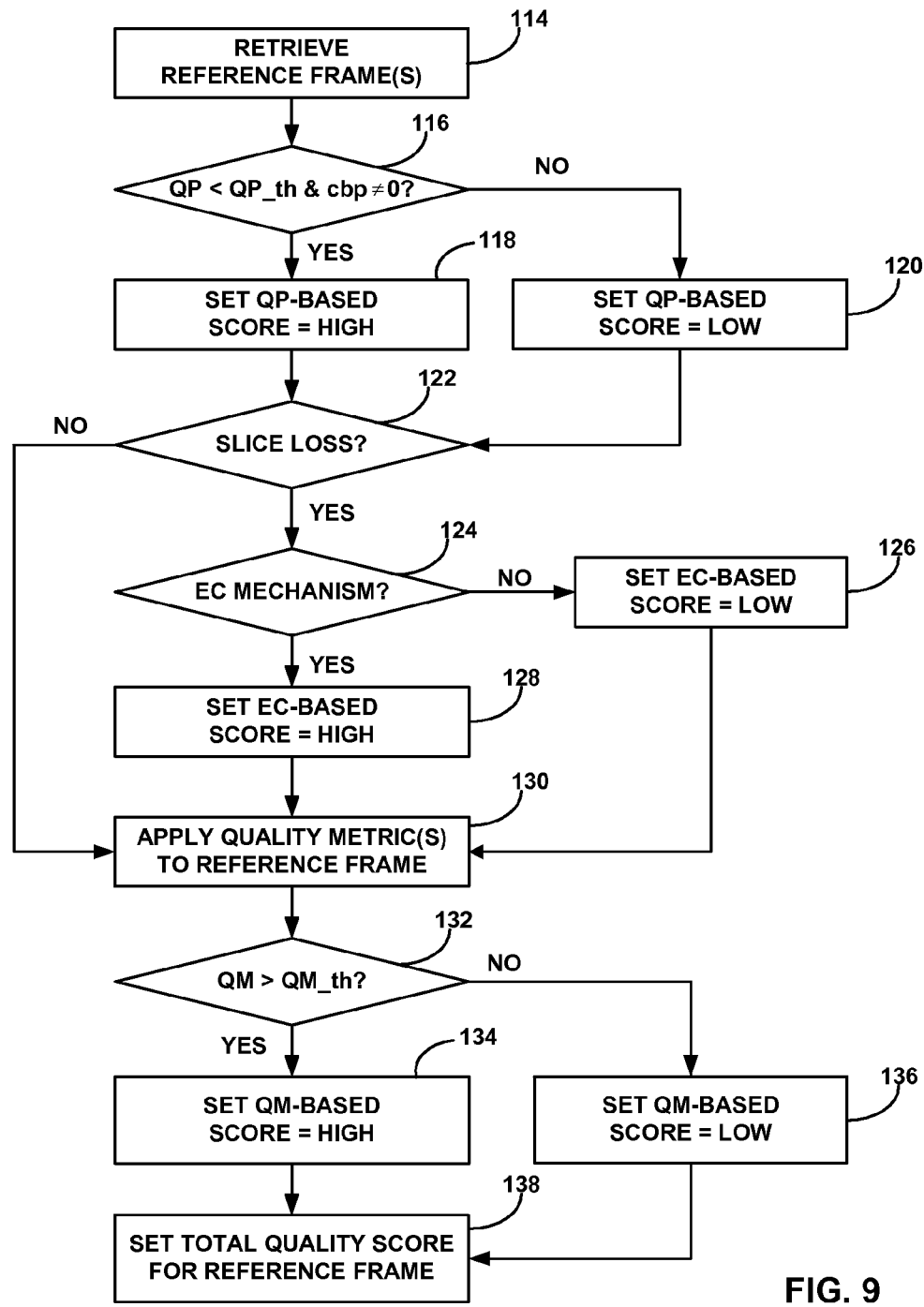
FIG. 9 is a flow diagram illustrating an example technique for generating quality scores for reference video units to support reference video unit selection for video unit substitution.

FIG. 9 is a flow diagram illustrating an example technique for generating quality scores for reference frames to support reference frame selection for video frame interpolation. The quality scores may be used to generate a total quality score, e.g., as described with reference to FIG. 5. In general, as an initial step, average QP values of each reference frame (future or previous reference frame relative to a skipped frame) as well as CBP values may be checked. If the QP value is smaller (e.g., a smaller QP value in H.264 coding corresponds to a finer quantization step size) than a threshold value, a high quality score may be given to the reference frame. The inverse may be true for some coding processes other than H.264 in which a smaller QP value corresponds to a coarser quantization step size.

In addition, a determination may be made as to whether a slice loss or multiple slice loss is present in the candidate reference frame. If there is a loss and if no error concealment is applied, then the quality score of the reference frame may be reduced. If there is a loss and the error is concealed, a higher quality score may be set for the reference frame. In some implementations, objective, no-reference visual quality metrics (such as blockiness, blurriness and/or color bleeding) may be applied to the reconstructed candidate reference frames. If the metrics provide high results, the total quality score of the reference may be increased. If a reference frame has a high total quality score, it may be used in interpolating the temporal skipped frame.

As shown in FIG. 9, analysis unit 42 retrieves the next candidate reference frame from received frame buffer 34 (114), and analyzes the QP and CBP values for the frame. In the example of FIG. 9, analysis unit 42 generates a combined QP-based score based on the QP and CBP values. If the QP value is less than an applicable QP threshold value (QP_th) and the CBP value is not equal to zero (116), analysis unit 42 sets a QP-based score for the frame to "HIGH" (118). If either the QP value is greater than or equal to the QP threshold value (QP_th) or the CBP value is approximately equal to zero (116), analysis unit 42 sets the QP-based score for the frame to "LOW" (120).

As further shown in FIG. 9, analysis unit 42 also may be configured to check the candidate reference frame for slice loss (122). With reference to FIG. 5, slice loss checking may be performed by EC checker 52. A slice loss may result from loss across channel 19 or some other loss or corruption of data. If there is a slice loss, analysis unit 42 may determine whether an adequate error concealment (EC) mechanism is available to correct for the slice loss (124). If not, analysis unit 42 sets an EC-based score for the candidate reference frame to "LOW" (126). If an adequate EC mechanism is available (124), analysis unit 42 sets the EC-based score to "HIGH" (128). In this case, if the lost slice can be reproduced using the EC mechanism, the quality of the candidate reference frame may be suitable for use as a reference frame for frame substitution. If the slice cannot be reproduced, however, the candidate reference frame should not be used for frame substitution.

Analysis unit 42 also may apply objective quality metrics to the candidate reference frame (130). For example, analysis unit 42 may analyze the decoded and reconstructed version of the candidate reference frame to analyze any of a variety of objective metrics such as blockiness, blurriness, color bleeding or the like. Hence, the objective metrics may be applied in the pixel domain to evaluate visual quality. Analysis unit 42 may quantify each of the objective metrics to formulate a quality metric score QM. If the quality metric score QM is greater than an applicable quality metric threshold (QM_th) (132), analysis unit 42 sets a QM-based score for the candidate reference frame to "HIGH" (134). If the quality metric score QM is less than or equal to the quality metric threshold (QM_th), analysis unit 42 sets the QM-based score to "LOW" (136).

Analysis unit 42 may set a total quality score for the candidate reference frame (138) based on a combination of the QP-based score, the EC-based score and the QM-based score. The total quality score may be compared to a threshold to determine whether to select the candidate frame for use in frame substitution. As described with reference to FIG. 5, the total quality score may be formulated according to a weighted summation of the QP-based score, the EC-based score and the QM-based score, where analysis unit 42 may attribute different weights to each of the individual scores. The order in which the individual QP-based score, the EC-based score and the QM-based score are obtained may be different from the order shown in FIG. 9. In addition, the particular types of scores shown in FIG. 9 may be subject to variation. In general, analysis unit 42 may be configured to obtain quality scores that indicate a likelihood that the candidate reference frame will contribute to an interpolation result with an acceptable level of quality.

Figure 10:
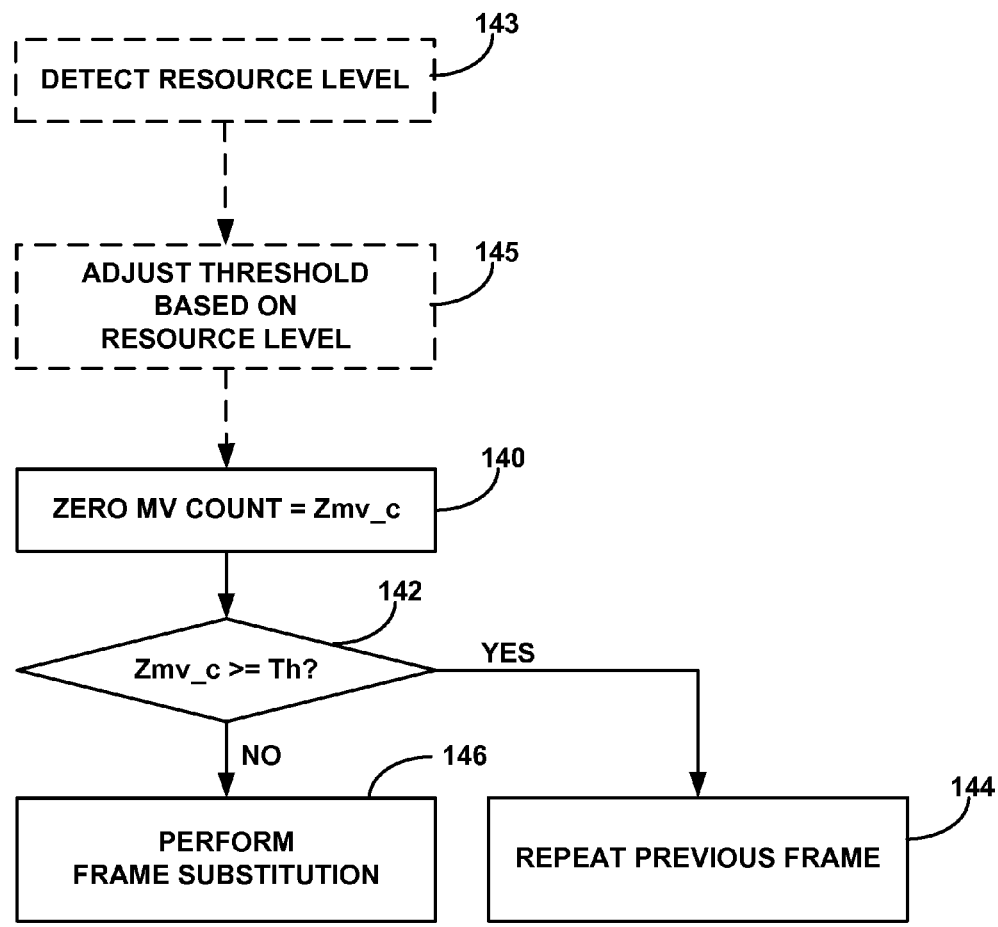
FIG. 10 is a flow diagram illustrating an example technique for selective substitution based on motion analysis in a resource-focused mode.
Figure 11:
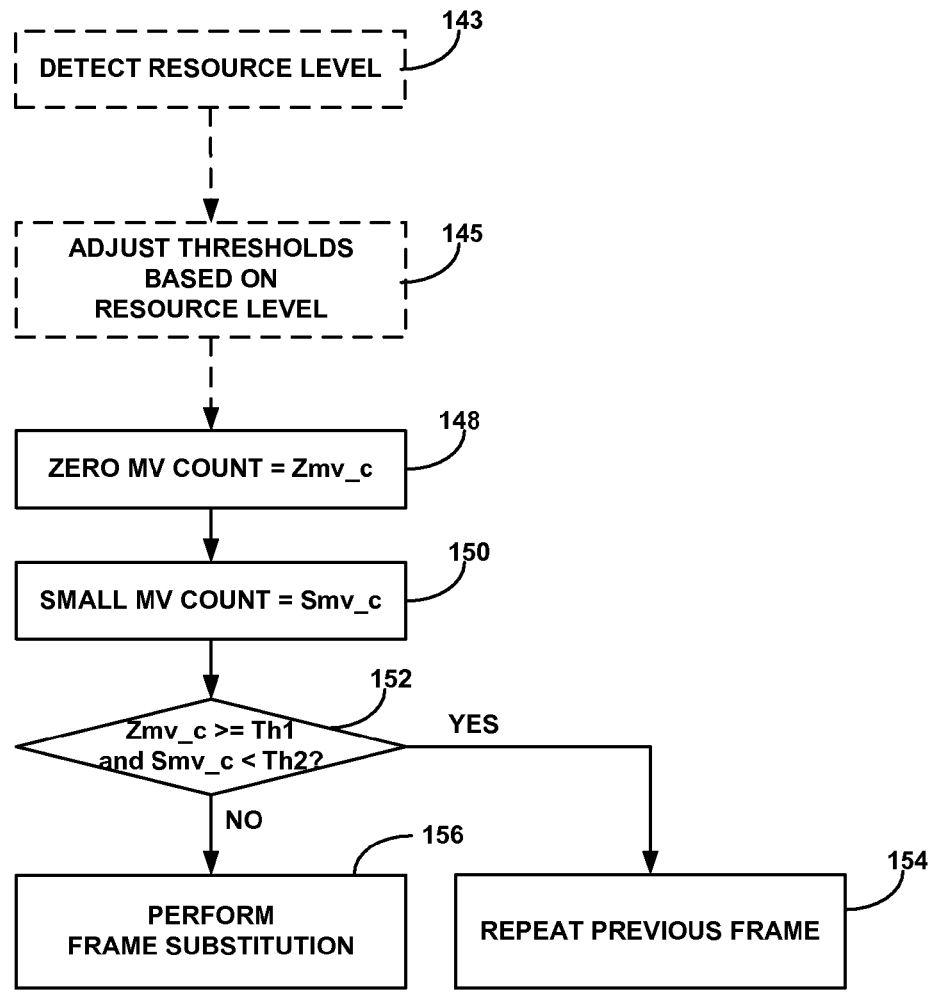
FIG. 11 is a flow diagram illustrating another example technique for selective substitution based on motion analysis in a resource-focused mode.

FIGS. 10 and 11 are flow diagrams illustrating example techniques for selective frame substitution in a resource-focused mode. In a resource-focused mode, analysis unit 42 may use motion activity as a measure to determine if a video scene represented by a reference frame is static or not. A zero motion vector count and/or small motion vector count may be used as decision criteria. In general, thresholds may be derived in two ways. In a non-adaptive case, for example, a fixed threshold for zero motion vector count and a fixed threshold for small motion vector count may be used to judge motion activity. In an adaptive-case, one or both of the thresholds may be adjusted based on, for example, the resource levels of decoder 14, such as levels of available power, computing resources, or memory.

In general, a resource-focused mode may be an optional mode of selective frame substitution in which interpolation or extrapolation is turned off, i.e., disabled, when there is no substantial perceptible difference between the results of frame substitution and frame repetition, e.g., when a difference between interpolation and frame repetition is not sufficient to justify the use of interpolation, e.g., in view of power, computing or memory constraints within the device associated with decoder 14. When motion activity is significant, however, decoder 14 may, in effect, revert to the quality-focused mode to select reference frames for frame substitution.

In some implementations, a resource-focused mode may be characterized as a power-save mode or power-optimized selective FRUC mode. In a resource-focused mode, motion activity may be used as a measure to decide if the video scene is static or not. If the algorithm determines that the scene is static, then a simple frame repetition technique may be used for FRUC, instead of video frame substitution, which is generally more computationally intensive and consumes more power. If the video scene is not generally static, however, frame substitution may be more desirable than frame repetition.

To determine whether a scene is static, motion vectors of a current anchor frame may be analyzed to make a decision whether to enable or disable video frame interpolation or extrapolation. The motion vectors may be used directly from the bitstream, obtained after processing of bitstream motion vectors in decoder 14, or obtained from a motion estimation module of the decoder 14. In some cases, some of the motion vectors used for motion analysis may be the same motion vectors used for interpolation or extrapolation. The anchor frame may be a frame adjacent to a frame to be added, such as a previous or future frame immediately adjacent or in proximity to the frame to be added. On the basis of this analysis, analysis unit 42 may make a decision on whether to enable or disable video frame interpolation for the frame presently under consideration. In one example, the number of zero motion vectors present in the frame can be used as a decision criteria.

A zero motion vector is a motion vector with a value of zero, or substantially zero. For example, in some implementations, motion vectors with values below a threshold value may be considered to be zero motion vectors. In some implementations, the motion vectors may be processed values from bitstream embedded motion vectors. If the zero motion vector count, i.e., the number of zero valued motion vectors, is greater than a threshold value, the scene may be determined to be static, in which case video frame interpolation is disabled. For static scenes, frame repetition may be used. Further enhancement may be added by using mode decision information, e.g., intra or inter coding mode decision information. For example, the number of zero motion vectors may be counted for non-intra coded macroblocks to obtain a more precise zero motion vector count.

In another example, a small motion vector count may be used as decision criteria in addition to zero motion vector count. A small motion vector may be a nonzero motion vector with a value that is below a predetermined threshold. One reason for adding small motion vector count is that, for example, some scenes, even though they may have a large number of static macroblocks indicated by zero motion vectors, may also contain a relatively small number of fast moving objects such as a thrown ball, a flying bird, or a passing vehicle. A new object that quickly enters or leaves a video scene over a series of video frames may produce significant motion activity in the frames.

Although fast-moving objects may occupy a small portion of the overall frame, it may be important to interpolate them in the FRUC-generated frame to preserve temporal quality. Hence, a second criterion that depends on small motion vector count, e.g., a small motion vector count threshold, may be added to ensure that scenes are absolutely static when frame interpolation is disabled. Furthermore, this criterion may account for the fast-moving small object problem implicitly.

In the example of FIG. 10, motion analyzer 64 counts the number of zero value motion vectors in the frame to produce the zero motion vector count (Zmv_c) (140). In general, each macroblock in the frame has a motion vector. If the motion vector for a macroblock has a value of zero, indicating no movement, then the motion vector is counted as a zero motion vector. Again, in some cases, a motion vector may be counted as a zero value motion vector if it has a small nonzero value below a threshold. In either case, once the number of zero motion vectors is counted, motion analyzer 64 determines whether the number of zero motion vectors, i.e., the zero MV count Zmv_c, is greater than or equal to an applicable threshold Th (142) If so, the video scene is relatively static. In this case, motion analyzer 64 communicates to selection unit 44 that interpolation or extrapolation should be disabled and that frame substitution unit 38 should instead apply frame repetition for the frame to be added (144). As mentioned previously, frame repetition may use a simple scheme of selecting the closest previous or future frame, or use a quality-based scheme to select a higher quality reference frame as the repeated frame.

If the zero MV count Zmv_c is less than the threshold (142), motion analyzer 64 communicates to selection unit 44 that frame substitution should be performed (146). In this case, interpolation (or extrapolation) may or may not be performed, subject to the selection of one or more suitable reference frames as a result of the quality analysis performed by analysis unit 42. In effect, when the scene is not static, analysis unit 42 may revert to the quality-focused mode to select one or more reference frames, if frames having sufficient quality for interpolation are available. If the quality analysis produces one or more suitable reference frames, selection unit 44 may communicate the selected frame(s) to frame substitution unit 38 for use in interpolation of the frame to be added.

The threshold Th (142) may be fixed. Alternatively, the threshold Th may be adjusted based on available frame substitution resources of the video decoder 14, such as a power level, a computing resource level, and/or a memory resource level. As shown in FIG. 10, in the resource-focused mode, analysis unit 42 may optionally detect a resource level (143) and adjust the threshold Th based on the detected resource level (145). For example, analysis unit 42 may determine available power resources, such as battery level, and/or available computing resources, number of available instructions per second, and/or available memory resources. The resource levels may be detected directly or estimated, e.g., based on known relationships between computing operations and resource consumption. In the case of a mobile device, if battery resources are low, analysis unit 42 may reduce threshold Th so that frame substitution is enabled when substantial amounts of motion are present. In either case, whether thresholds are fixed or adjustable, if frame substitution is enabled, analysis unit 42 may apply one or more quality criteria to select reference frames or disable frame substitution.

In the example of FIG. 11, motion analyzer 64 analyzes motion based on both the zero MV count and a small MV count. As shown in FIG. 11, motion analyzer 64 counts the number of zero valued motion vectors in the frame to produce the zero motion vector count (Zmv_c) (148) and counts the number of small motion vectors in the frame to produce the small motion vector count (Smv_c) (150). Small motion vectors may be motion vectors with nonzero values that are below a threshold value. Even when there is a predominance of zero motion vectors, there may be a number of nonzero motion vectors, including nonzero motion vectors that are small in the sense that they have values below a threshold value (referred to herein as small motion vectors). Small motion vectors may be associated with one or more small moving objects, such as a ball, bird, car, or the like. Motion analyzer 64 compares the zero MV count (Zmv_c) and the small MV count (Smv_c) to respective thresholds Th1 and Th2, respectively (152).

If the zero MV count (Zmv_c) is greater than or equal to the threshold Th1 and the small MV count (Smv_c) is less than the threshold Th2, motion analyzer 64 directs selection unit 44 to indicate that frame repetition should be applied instead of frame substitution (154). In this case, a zero MV count in excess of the threshold Th1 indicates that the video scene presented by the frame is generally static. At the same time, a small MV count that is less than the threshold Th2 indicates that there are no significant small objects moving within the video scene presented by the frame. In view of the generally static content of the frame, frame repetition is appropriate.

If the zero MV count (Zmv_c) is less than the threshold Th1 or the small MV count (Smv_c) is greater than or equal to the threshold Th2, motion analyzer 64 indicates that frame substitution should be performed (156), subject to selection of reference frames as part of the quality analysis performed by analysis unit 42. In this case, a zero MV count that is less than the threshold Th1 indicates that the video scene includes significant motion.

Even if the zero MV count is not less than the threshold Th1, the frame may include one or more relatively small moving objects that would be better presented by interpolation. Accordingly, motion analyzer 64 may indicate that interpolation should be performed when the small MV count is greater than or equal to the threshold Th2, indicating the presence of one or more small, fast-moving objects. Such objects generally may be small and faster moving than other objects in a frame. When frame content is not generally static or a generally static frame includes a small moving object, frame substitution, e.g., by interpolation or extrapolation of the frame, may be appropriate.

As in the example of FIG. 10, the thresholds Th1, Th2 in FIG. 11 may be fixed or adjusted based on available interpolation resources. In particular, one or both of the thresholds Th1, Th2 may be adjusted based on a determined resource level. As shown in FIG. 11, in the resource-focused mode, analysis unit 42 may optionally detect a resource level (143) and adjust the threshold based on the detected resource level (145). Again, analysis unit 42 may detect or estimate available power resources, such as battery level in a mobile device, and/or available computing resources, number of available instructions per second, and/or available memory resources. If battery resources are low, for example, analysis unit 42 may reduce threshold Th1 and increase threshold Th2 so that interpolation is enabled when substantial amounts of motion are present.

In some cases, a threshold used to classify a motion vector as a small motion vector may be fixed or adjustable based on format size. As discussed above, a small motion vector may be a nonzero motion vector that has a value below a particular threshold. In some implementations, the threshold used to determine whether a nonzero motion vector is small or not may be adjusted based on a format size of the video units being decoded and interpolated or extrapolated. For example, a small motion vector may be classified by different thresholds for QCIF, CIF, QVGA and VGA frames, which having progressively larger format sizes. The value of the small motion vector threshold for a CIF frame may be smaller than the value of the small motion vector threshold for a VGA frame. In particular, a motion vector magnitude may be considered large in a smaller format frame but small in a larger format frame in consideration of the larger overall size of the larger format frame. Hence, in some implementations, motion analyzer 64 may adjust the small motion vector threshold value based on the format size of the video unit that is being interpolated or extrapolated. For example, the small motion vector threshold value used for smaller format frames may be less than the small motion vector threshold value used for larger format frames.

Figure 12:
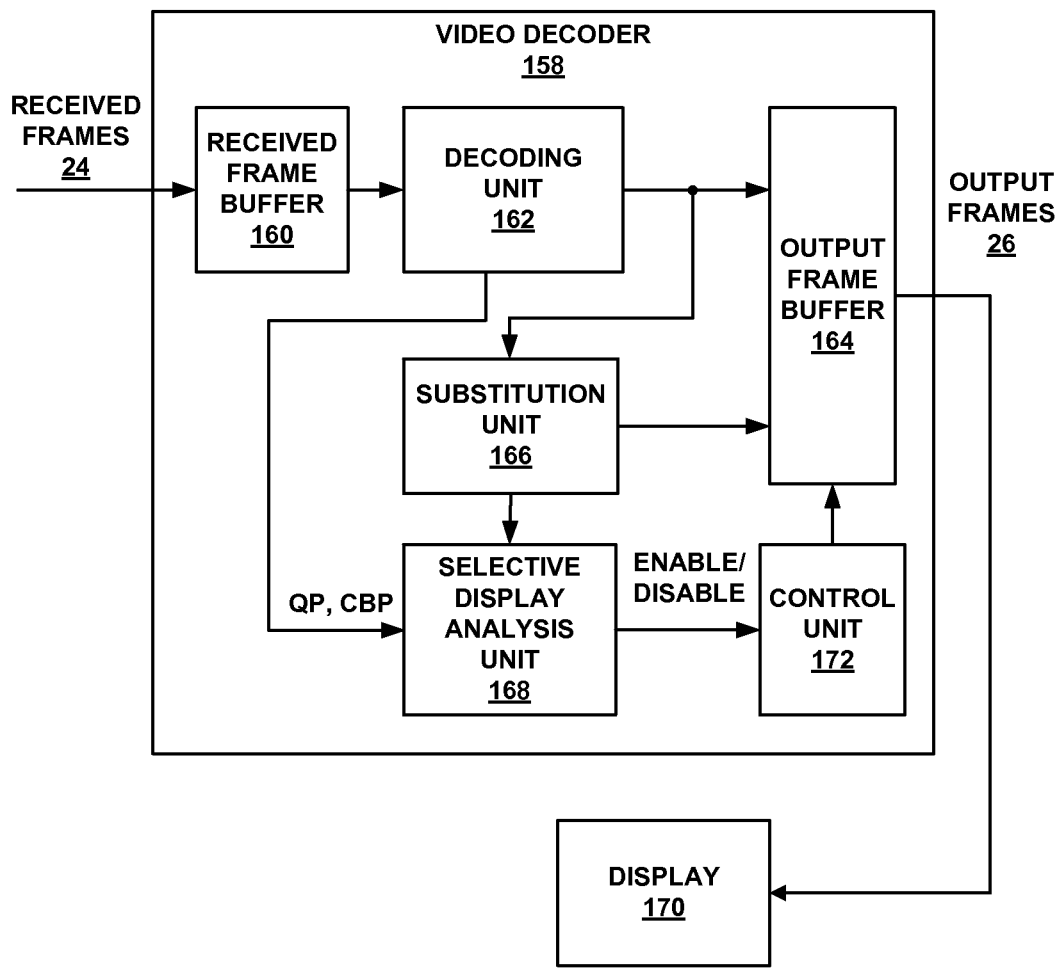
FIG. 12 is a block diagram illustrating an example of a video decoder configured to selectively enable or disable display of substitute frames.

FIG. 12 is a block diagram illustrating an example of a video decoder 158 configured to selectively enable or disable display of substitute frames, e.g., based on an analysis of one or more quality characteristics. For example, as will be described, video decoder 158 may be configured to analyze one or more characteristics associated with an interpolated or extrapolated video frame produced by a frame rate upconversion process in a video decoder, and selectively enable and disable presentation of the interpolated or extrapolated video unit on a display based on the analysis.

The analysis may involve analysis of any of a wide variety of quality characteristics. The quality characteristics may include at least one of a pixel domain characteristic, a transform domain characteristic, and/or motion vector reliability. The one or more quality characteristics may be used to formulate quality metrics including spatial quality metrics, temporal quality metrics, or other metrics. Such quality metrics may be useful in predicting the impact of an interpolated or extrapolated frame on the visual spatial and/or temporal quality of the video sequence when presented to a user by a display. Decoder 158 may be configured to selectively disable display of a substitute frame, even though the substitute frame has already been interpolated or extrapolated, if a quality level associated with the substitute frame does not satisfy a quality threshold.

A quality level that is associated with a substitute frame may be based on a quality level of the substitute frame itself. In some implementations, the quality level may be based on a quality level of one or more reference frames used to interpolate or extrapolate the substitute frame. In other implementations, the quality level may be based on a quality level of the substitute frame and one or more reference frames using to produce the substitute frame. In each case, the quality level may generally indicate the degree of enhancement of visual quality that may be achieved by displaying the substitute frame.

Even when a substitute frame has already been interpolated or extrapolated, it still may be desirable to selectively disable transmission and display of the substitute frame in a video decoder. For example, although interpolation or extrapolation has already been performed, the visual quality produced by displaying the substitute frame may be insufficient to justify expenditure of additional resources for transmission and display of the substitute frame. Instead, it may be more desirable to discard the substitute frame and repeat an adjacent frame, e.g., by holding the frame in the display for a longer period of time instead of transmitting a new frame, thereby conserving power or other resources that would be necessary to display the substitute frame. In some implementations, in addition to selectively disabling transmission and display of some frames, video decoder 158 also may disable one or more post-processing operations such as smoothing, sharpening, brightness control, and/or contrast enhancement for substitute frames to conserve additional resources.

In the example of FIG. 12, video decoder 158 includes a received frame buffer 160 that receives encoded frames 24, e.g., from encoder 12, a decoding unit 162 that decodes the received frames, an output frame buffer 164 that stores the decoded frames, a substitution unit 166 that performs frame substitution by interpolation or extrapolation to add frames to output frame buffer 164, and thereby support a FRUC process, and a selective display analysis unit 168. Analysis unit 168 may be configured to generate a signal or command. In response to the signal or command from analysis unit 168, control unit 172 may selectively enable or disable transmission of substitute frames from a video buffer, such as output frame buffer 164, to a display 170 for visual presentation to a user. In some aspects, analysis unit 168 may be selectively activated when decoder 158 is in a resource-focused mode, e.g., as described with reference to FIGS. 4, 5 and 7. Alternatively, in other implementations, the selective display analysis unit 168 may operate on a regular basis to selectively enable or disable display of substitute frames produced by substitution unit 166 with or without selective activation.

Substitution unit 166 performs frame substitution, such as frame interpolation or extrapolation, to add frames to the output frames stored in output frame buffer 164 and thereby support a FRUC process. Video decoder 158 may or may not apply reference frame selection techniques, as described elsewhere in this disclosure, to select particular reference frames for use by substitution unit 166 in interpolation or extrapolation of a substitute frame. In some aspects, substitution unit 166 may select one or more reference frames based on an analysis of those frames, or simply use one or more adjacent frames, to produce the substitute frames. In either case, however, analysis unit 168 may be further configured to analyze a quality level associated with a substitute frame to determine whether to display the substitute frame. The quality associated with the substitute frame may include one or more quality characteristics associated with the substitute frame itself, one or more quality characteristics associated with one or more of the reference frames used to interpolate or extrapolate the substitute frame, or a combination of both. To analyze quality, analysis unit 168 may apply objective quality metrics to the substitute (e.g., interpolated or extrapolated) frame and/or the reference frames used to interpolate or extrapolate the substitute frame.

Analysis unit 168 may direct control unit 172 to selectively enable or disable the display of a substitute frame from output frame buffer 164 via display 170 based on the quality analysis. For example, if the quality of one or more reference frames used to generate a substitute frame, and/or the quality of the substitute frame itself, do not satisfy an applicable quality threshold, analysis unit 168 may direct control unit 172 to disable transmission of the interpolated frame from output frame buffer 164 for presentation on display 170. If the quality is acceptable, however, the selective display analysis unit 168 may direct control unit 172 to enable transmission of the interpolated or extrapolated frame to display 170 for presentation to a user via display 170. In this manner, video decoder 158 may avoid expenditure of additional resources to display a substitute frame when the quality of the substitute frame is unsatisfactory.

When a substitute frame is not sent to display 170, it may be discarded from output frame buffer 164, e.g., by overwriting the frame with a frame that is subsequently decoded, interpolated or extrapolated. In this case, display 170 may simply repeat the previous frame (e.g., by holding the previous frame in the display for a longer period of time) that was sent from the output frame buffer 164 to the display, or transmit and repeat (e.g., hold) the next frame that follows the substitute frame. In this case, the display 170 may display the previous frame for an additional period of time, rather than display a substitute frame during that time. By using frame repetition, video decoder 159 may avoid the need to transmit and display the substitute frame, thereby conserving power and/or other resources. As mentioned above, selective display of substitute frames may be used alone or in combination with reference frame selection techniques as described elsewhere in this disclosure.

Analysis unit 168 may be configured to analyze one or more of a variety of quality characteristics associated with substitute frames produced by substitution unit 166. Quality characteristics analyzed by analysis unit 168, in some implementations, may be similar to those evaluated by objective metric checker 50 of FIG. 5. For example, analysis unit 168 may be configured to analyze pixel values associated with substitute (e.g., interpolated or extrapolated) frames produced by substitution unit 166, or pixel values associated with one or more reference frames used to produce the substitute frames, to determine degrees of blockiness, blurriness, color bleeding or other objective spatial quality metrics associated with such frames, and generate a quality score based on the determination.

Hence, the quality analysis may be performed by analyzing the substitute frames produced by substitution unit 166 in the pixel domain, or by analyzing decoded, reconstructed reference frames produced by decoding unit 162 in the pixel domain, or a combination of both. In an implementation in which reference frames are analyzed, the reference frames may be the reference frames used to interpolate or extrapolate the substitute frame. The quality score for a particular interpolated or extrapolated, substitute frame produced by substitution unit 166 may be low when substantial blockiness, blurriness, and/or color bleeding is detected in the substitute frame (or in one or more reference frames used to produce the frame) and high when there is substantially no blockiness, blurriness, and/or color bleeding.

The quality score for different substitute frames may vary between high and low as a function of such objective visual quality metric characteristics. Alternatively, the quality score may be expressed as either high or low based on comparison to a predetermined threshold. In either case, if the quality score for a substitute frame does not satisfy (e.g., is less than) a quality threshold, analysis unit 168 may direct control unit 172 to disable transmission of the frame from output frame buffer 164 to display 170. Alternatively, if the quality score for the substitute frame satisfies (e.g., is greater than or equal to) the threshold, analysis unit 168 may direct control unit 172 to enable transmission of the substitute frame from output frame buffer 164 to display 170 for presentation to a user.

As described above, analysis unit 168 may analyze quality characteristics associated with a substitute frame by analyzing pixel values of a substitute frame, pixel values of one or more reference frames used to produce the substitute frame by interpolation or extrapolation, or pixel values of one or more other frames in the vicinity of the substitute frame. If reference frames are analyzed, substitution unit 166 may indicate to analysis unit 168 which reference frame or frames were used to interpolate or extrapolate a particular substitute frame.

Using pixel values, as described above, analysis unit 168 may analyze one or more spatial quality metrics such as SSIM, blockiness, blurriness and/or color bleeding metrics associated with a substitute frame, and/or one or more reference frames used to produce the substitute frame. In some implementations, a pixel value analysis alternatively, or additionally, may be applied to other frames (in addition or as an alternative to the reference frames or substitute frame) that are temporally proximate to the substitute frame. If the spatial quality metric for a substitute frame, a reference frame, or another nearby frame does not satisfy an applicable threshold, analysis unit 168 may direct control unit 172 to disable display of the substitute frame.

As a simple illustration, if the amount of blockiness presented by pixel values associated with the substitute frame exceeds a threshold, analysis unit 168 may disable display of the substitute frame. In this manner, decoder 158 may avoid displaying a substitute frame that could adversely affect quality, or a substitute frame that provides a quality enhancement that is insufficient to justify the expenditure of additional display resources.

As an alternative, or an additional operation, for quality analysis, analysis unit 168 may analyze one or more temporal quality metrics, such as temporal fluctuation of spatial quality metrics. For example, analysis unit 168 may analyze fluctuation of spatial quality (e.g., SSIM, blockiness, blurriness, and/or color bleeding) between a substitute frame and one or more reference frames used to interpolate or extrapolate the substitute frame. If the temporal quality fluctuation is greater than a fluctuation threshold, analysis unit 168 may direct control unit 172 to disable display of the substitute frame.

Analysis unit 168 may consider temporal fluctuation of one or more spatial quality metrics alone or in combination with a spatial quality metric itself. For example, analysis unit 168 may disable display of the substitute frame if either the spatial quality metric or the temporal quality metric does not satisfy an applicable threshold. Alternatively, analysis unit 168 may compute a score based on a weighted summation of spatial quality and temporal quality values and compare the sum to a composite threshold value.

As further refinements, in some implementations, analysis unit 168 may be configured to analyze the locations of artifacts within a substitute frame, reference frame or other nearby frame. An artifact may be an undesirable visible feature that may be produced by blockiness, blurriness or color bleeding in a particular localized region of a displayed frame. Analysis unit 168 may analyze overall blockiness, blurriness or color bleeding for a frame, or consider such characteristics in the context of localized regions of a frame. For example, analysis unit 168 may analyze the pixel value variance of localized regions of a frame, e.g., 3 by 3 pixel regions, to generate an indication of texture in such regions. Smooth regions, generally indicated by low variance, may be more susceptible to visible artifacts caused by blockiness, blurriness, color bleeding or other artifacts. However, such artifacts may be less visible in higher variance regions with more texture.

Analysis unit 168 may produce localized spatial quality metrics for multiple localized regions within a frame, as an alternative or in addition to a spatial quality metric for a frame. If the localized spatial quality metrics for a frame do not satisfy an applicable threshold in any of the smooth regions, where artifacts would be more visible, analysis unit 168 may disable display of a substitute frame to reduce or avoid presentation of visible artifacts. If the localized spatial quality metrics do not satisfy the quality threshold only in higher variance regions with more texture, however, analysis unit 168 may permit display of the substitute frame with the recognition that artifacts will be invisible or less visible to the user in such regions. As a further alternative, analysis unit 168 may use different threshold values for different localized regions. In a smooth, low variance region, analysis unit 168 may use a higher quality threshold, in effect, requiring higher quality to reduce or avoid introduction of visible artifacts. In a higher variance region, analysis unit 168 may use a lower quality threshold, permitting display of the substitute frame when significant artifacts occur only, or substantially only, in high texture regions.

Analysis unit 168 may scan the frame to analyze localized regions as described above. If any of the localized regions, or a predetermined percentage of the localized regions, exhibits both a low variance (below a variance threshold) and a low quality metric (below a quality threshold), which may indicate a likelihood of visible artifacts in the displayed frame, analysis unit 168 may direct control unit 172 to disable display of the substitute frame. The predetermined percentage may be a threshold value that is fixed or adaptive. In other implementations, analysis unit 168 may be configured to analyze the size of regions in which artifacts may be visible, e.g., by considering whether localized regions having both low texture and low quality are contiguous. Hence, analysis unit 168 may analyze a percentage of all localized regions having significant artifacts relative to a percentage threshold and/or sizes of any of the artifacts (e.g., indicated by low quality/low texture regions) relative to a size threshold to determine whether to enable or disable display of a substitute frame.

Analysis unit 168 may additionally, or alternatively, analyze quality associated with the substitute frame using other types of data, such as data indicating reliability of motion vectors associated with reference frames used to interpolate or extrapolate the substitute frame. Other examples of data that may be used by analysis unit 168 for quality analysis include compressed domain information such as information relating to discrete cosine transform (DCT) or wavelet transform coefficients associated with one or more reference frames used for interpolation or extrapolation of a substitute frame. Compressed domain information may include, for example, QP and CBP values. As shown in FIG. 12, in some implementations, analysis unit 168 may receive QP and CBP values from decoding unit 162. The QP and/or CBP values may be associated with reference frames used to interpolate or extrapolate a substitute frame. Using QP, CBP values, and/or other compressed domain information, analysis unit 168 may analyze quality of substitute frames.

As an example, analysis unit 168 may evaluate motion vector reliability in a manner similar to that described above, e.g., with reference to FIGS. 5 and 8. If motion vector reliability of one or more reference frames is unsatisfactory, analysis unit 168 may direct control unit 172 to disable display of the substitute frame. Analysis unit 168 may apply any of a variety of techniques for determining motion vector reliability, such as a motion difference based approach, a frame-to-frame motion change detection approach, or a motion trajectory based approach, e.g., in a manner similar to that described above with respect to MV reliability checker 60 of FIG. 5. Analysis unit 168 may consider motion vector reliability alone or in combination with other quality metrics described herein, e.g., including pixel domain quality metrics, temporal metrics, or localized metrics, to determine whether to enable or disable display of a substitute frame.

As described above, analysis unit 168 may analyze quality based on compressed domain information such as QP and/or CBP values associated with reference frames used to interpolate or extrapolate a substitute frame. The compressed domain information may be obtained from the reference frames in received frame buffer 160, e.g., by parsing the bitstream associated with the received frames. As an example, analysis unit 168 may be configured to analyze QP and/or CBP associated with reference frames in a manner similar to that described with reference to QP checker 54 and CBP checker 56, and quality score calculator 58 of FIG. 5, and the process illustrated in the flow diagram of FIG. 9. If the QP and CBP values indicate a relatively high quality for the reference frame, e.g., by comparing QP to a QP threshold QP_th and determining whether the CBP value is nonzero as shown in FIG. 9, then analysis unit 168 may direct control unit 172 to enable display of the substitute frame that was interpolated or extrapolated using the pertinent reference frame. If the QP and CBP values indicate a low quality, however, analysis unit 168 may direct control unit 172 to disable display of the substitute frame.

The analysis of compressed domain information and MV reliability may be used by analysis unit 168 either alone or in combination with other quality information, such as spatial quality information or temporal quality information, to determine whether to display a substitute frame. In some implementations, analysis unit 168 may be configured to analyze a variety of quality information in combination. For example, analysis unit 168 may analyze objective spatial and/or temporal quality metrics in the pixel domain (e.g., SSIM, blockiness, blurriness, and color bleeding and/or associated temporal fluctuation), as well as transform domain information such as QP and CBP values, and possibly error concealment (EC) reliability information, to generate a quality score, and then apply a motion vector (MV) reliability analysis to determine whether to display a substitute frame for which the quality score is acceptable.

For error concealment (EC) reliability, analysis unit 168 may apply an EC analysis similar to that described with reference to EC checker of FIG. 5 and the processor of FIG. 9. For example, analysis unit 168 may analyze one or more reference frames used to produce a substitute frame and determine if there is a slice loss. If so, analysis unit 168 may determine whether a suitable EC mechanism is available. If there is no suitable EC mechanism, analysis unit 168 may direct control unit 172 to disable display of the substitute frame by display 170. If an acceptable EC mechanism is available, however, analysis unit 168 may permit display of the substitute frame. Analysis of slice loss and the EC mechanism may be performed alone as a basis for selectively enabling or disabling display of a substitute frame, or in combination with analysis of other quality characteristics, such as spatial quality, temporal quality, motion vector reliability, or the like.

In some implementations, analysis unit 168 may be configured to operate in a manner similar to analysis unit 42 of FIG. 5, except that analysis unit 168 determines whether to display a substitute frame instead of determining whether to select a particular reference frame of frames for use in interpolating or extrapolating the substitute frame. Notably, because the substitute frame has already been produced by substitution unit 166, analysis unit 168 may analyze objective quality characteristics of the substitute frame in the pixel domain, either in addition or as an alternative to analyzing quality characteristics of one or more reference frames. For example, analysis unit 168 may consider the quality of the substitute frame alone or in combination with the quality and/or motion vector reliability of one or more reference frames. Alternatively, analysis unit 168 may consider the quality and/or motion vector reliability of the reference frames without considering the quality of the substitute frame.

Analysis unit 168 may be effective in selectively providing substitute frames to display 170 when such frames are more likely to contribute favorably to visual and/or temporal quality. Even though interpolation or extrapolation has already been performed, discarding the frame still may be advantageous if the quality level does not justify the additional resources required to transmit and display the frame. Large amounts of power may be required to transmit a substitute frame from output frame buffer 164 to display 170.

In general, analysis unit 168 may be configured to analyze one or more quality and/or motion characteristics of an interpolated or extrapolated video frame produced by a FRUC process performed by substitution unit 166 in video decoder 158. Based on the analysis, analysis unit 168 may direct control unit 172 to selectively enable and disable transmission of the interpolated or extrapolated video frame for presentation on display device 170. Although objective visual quality metric characteristics such as SSIM, blockiness, blurriness, and/or color bleeding may be analyzed for quality analysis, other quality metrics may be used.

In some aspects, decoder 158 may be configured to operate in different modes. In a first mode, such as a resource-focused mode, decoder 158 may selectively enable and disable transmission of interpolated or extrapolated video frames for display on display device 170 based on the quality analysis, e.g., via control unit 172. In a second operating mode, control unit 172 of decoder 158 may enable transmission of the interpolated or extrapolated frame for presentation on display device 170 without performing a quality analysis or without regard to the results of a quality analysis.

Analysis unit 168 also may be configured to consider the number of substitute frames for which display has been disabled over a past series of N previous substitute frames, where N represents a number greater than one. If more than a predetermined number or percentage M of previous substitute frames in the last N frames have not been displayed, e.g., due to quality characteristics, analysis unit 168 may enable the display of the current substitute frame. In this case, the current substitute frame may be displayed even though it may not satisfy the applicable quality thresholds. In this manner, analysis unit 168 may avoid skipping the display of a long series of substitute frames.

Alternatively, instead of enabling display, analysis unit 168 may reduce one or more applicable quality thresholds for the current substitute frame so that the substitute frame has a higher probability of being displayed. Hence, in either case, analysis unit 168 may determine whether to enable display of the current substitute frame based at least in part on the number of substitute frames that have not been displayed over a predetermined number of previous frames. As an illustration, if the number of previous substitute frames under consideration is N=10 and the threshold number of non-displayed frames M is 5, analysis unit 168 may direct control unit 172 to permit display of the current substitute frame if the number of non-displayed frames in the last 10 frames was 5 or more.

As a refinement, in some implementations, rather than considering the absolute number of substitute frames that have not been displayed in the last N substitute frames, analysis unit 168 may consider the number of consecutive substitute frames that have not been displayed. For example, analysis unit 168 may apply a consecutive count threshold of M. If the previous M+1, consecutive substitute frames have not been displayed, e.g., due to quality characteristics, analysis unit may direct control unit 172 to enable display of the current substitute frame. Analysis unit 168 may apply any of a wide variety of threshold schemes to determine whether a current substitute frame should be displayed based on the non-display of previous substitute frames. Accordingly, this description is provided for purposes of illustration and without limitation.

Figure 13:
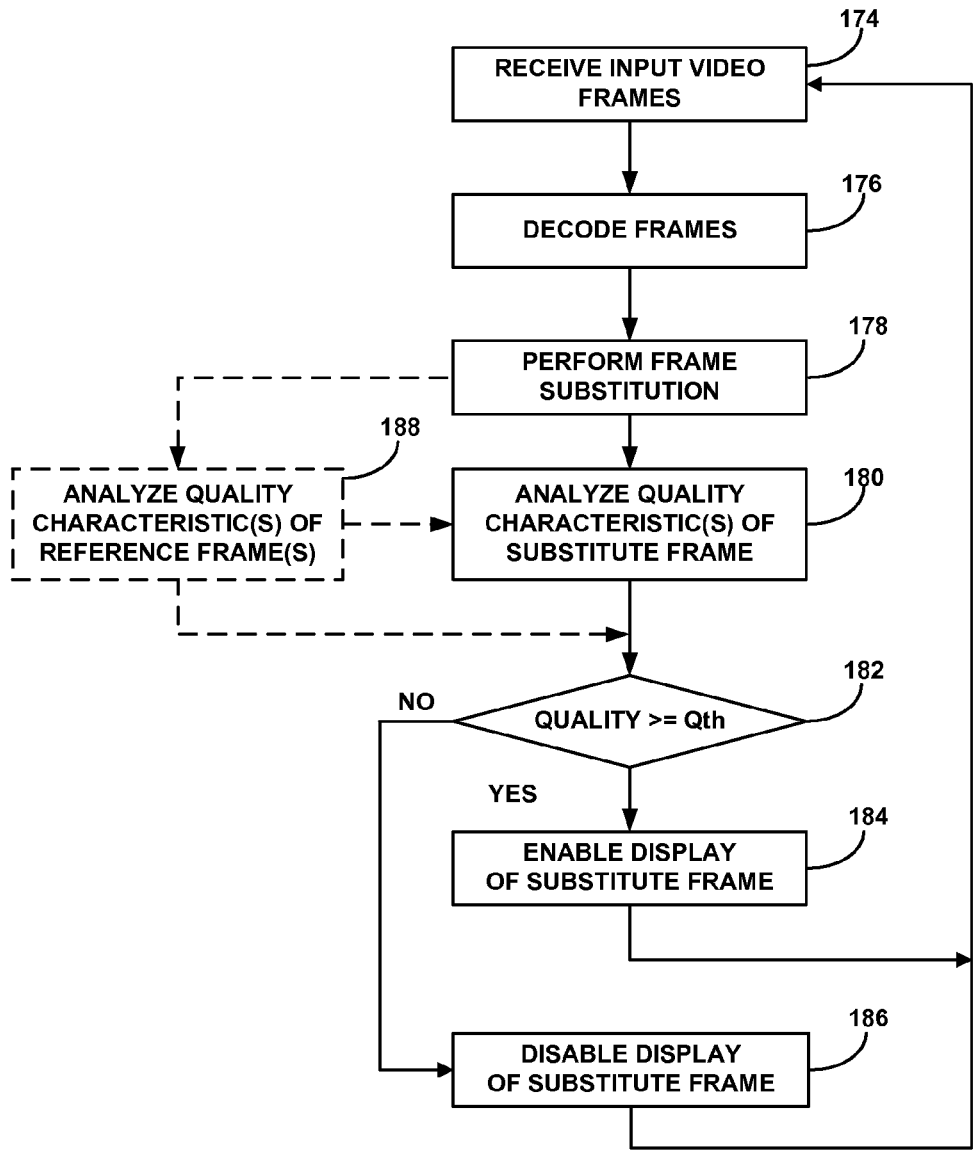
FIG. 13 is a flow diagram illustrating an example technique for selective display of substitute frames based on quality analysis.

FIG. 13 is a flow diagram illustrating an example technique for selective display of substitute frames. Decoder 158 of FIG. 12 may be configured to perform the technique of FIG. 13. As shown in FIG. 13, decoder 158 may receive input video frames (174), decode the frames (176), and perform frame substitution (178) to produce substitute frames using some of the received frames as reference frames for interpolation or extrapolation. An analysis unit, such as an analysis unit 168 provided in decoder 158, may analyze one or more quality characteristics of all or some of the substitute frames (180). In some implementations, the analysis unit may be provided in video decoder 158, a video post-processing unit, or in a video display processing unit, such as a mobile display processor (MDP). For example, analysis unit 168 may analyze various objective quality characteristics such as SSIM, blockiness, blurriness or color bleeding in an interpolated or extrapolated frame produced by substitution unit 166.

If the quality of the substitute frame satisfies a quality threshold, e.g., is greater than or equal to the quality threshold (182), analysis unit 168 may direct control unit 172 to enable display of the substitute frame (184), e.g., by enabling transmission of the frame from the output frame buffer 164 to display 170. If the quality does not satisfy the quality threshold (182), e.g., is less than or equal to the threshold, analysis unit 168 may direct control unit 172 to disable display of the substitute frame (186). In some cases, the quality threshold may be adaptively adjusted, e.g., based on available resources. Hence, even if some resources have been expended to produce the substitute frame, decoder 158 may avoid consumption of additional resources when quality of the substitute frame is not satisfactory, e.g., in relation to a predefined threshold quality level.

In the example of FIG. 13, analysis unit 168 may be configured to analyze the quality of a substitute frame itself to determine whether to display that substitute frame. Hence, in some cases, there may be no need to analyze other frames. In other implementations, however, analysis unit 168 may analyze the quality of one or more reference frames used to produce a substitute frame as the basis for determining whether to display the substitute frame. As indicated by block 188, analysis unit 168 may optionally analyze the quality of one or more reference frames either alone or in combination with analysis of the quality of the substitute frame. The quality analysis of the substitute frame may generally involve analysis of pixel domain values of the substitute frame. As described above, quality analysis of the reference frames may involve analysis of pixel domain values, transform domain values, MV reliability, EC reliability, or the like.

Figure 14A:
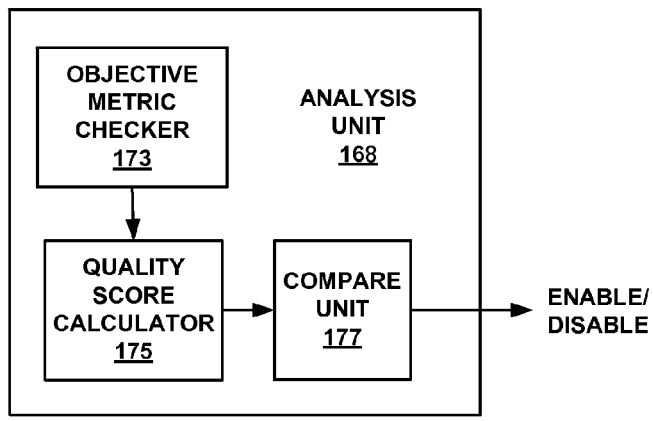
FIG. 14A is a block diagram illustrating an analysis unit that may be used with a video decoder as shown in FIG. 12.

FIG. 14A is a block diagram illustrating an analysis unit 168 that may be used with a video decoder 158 as shown in FIG. 12. In the example of FIG. 14A, analysis unit 168 is configured to analyze quality associated with a substitute frame using objective one or more quality metrics for the substitute frame. For example, an objective metric checker 173 may analyze objective spatial quality metrics such as SSIM, blockiness, blurriness, or color bleeding for the substitute frame. Such metrics may be obtained, for example, from pixel values of the substitute frame. In some implementations, objective metric checker 173 may analyze frames as a whole or on a localized region basis. Quality score calculator may 175 may generate a quality score based on the objective quality metric or metrics. Compare unit 177 may compare the quality score to a threshold to determine whether to enable or disable display of the substitute frame. If the quality score satisfies the quality threshold, compare unit 177 may direct control unit 172 to permit display of the substitute frame via display 170. If the quality score does not satisfy the quality threshold, compare unit 177 may direct control unit 172 to disable display of the substitute frame. In this case, a previous or future frame may be repeated by display 170 instead of the substitute frame.

Figure 14B:
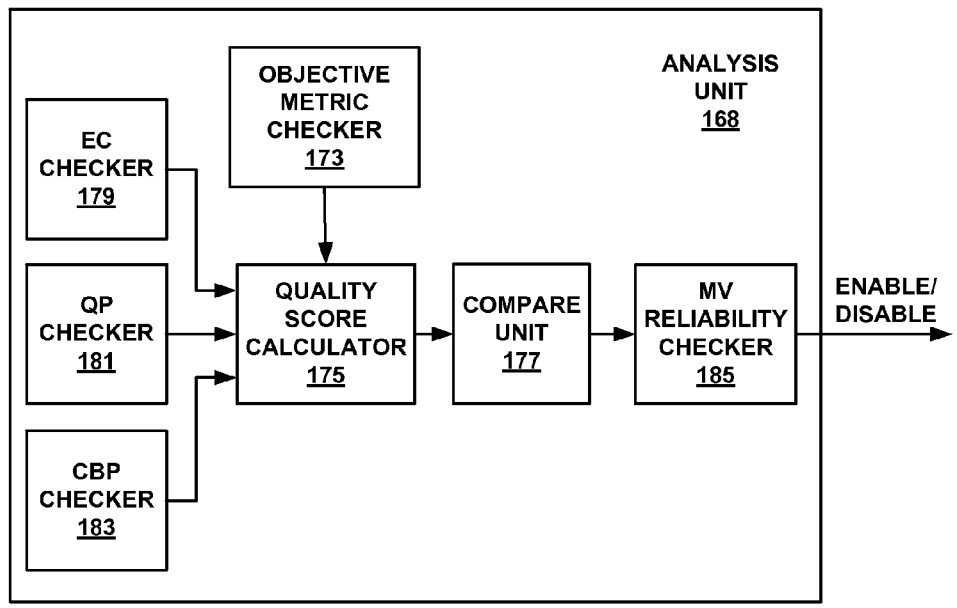
FIG. 14B is a block diagram illustrating another analysis unit that may be used with a video decoder as shown in FIG. 12.

FIG. 14B is a block diagram illustrating another analysis unit 168 that may be used with a video decoder 158 as shown in FIG. 12. In the example of FIG. 14A, analysis unit 168 is configured to directly analyze the quality of the substitute frame. In the example of FIG. 14B, analysis unit 168 may be configured to analyze the quality of reference frames, the quality of the substitute frame, or a combination of both. In addition, in FIG. 14B, analysis unit 168 may be configured to analyze pixel values, transform domain values, motion vectors, and/or other types of information. In general, analysis unit 168 may be configured in a manner somewhat similar to analysis unit 42 of FIG. 5. For example, analysis unit 168 may include one or more of an objective metric checker 173, quality score calculator 175, compare unit 177, EC checker 179, a QP checker 181, a CBP checker 183, and an MV reliability checker 185.

Objective metric checker 173 may analyze a substitute frame and/or one or more reference frames used to produce the substitute frame to produce an indication of objective spatial quality and/or temporal quality, as described above. In some implementations, objective metric checker 173 may analyze frames as a whole or on a localized region basis. EC checker 179 may detect slice loss and determine whether an acceptable EC mechanism is available. QP checker and CBP checker 181, 183 may generate an indication of quality based on QP and CBP values for reference frames.

Quality score calculator 175, in some implementations, may calculate an overall quality score for consideration in selective display of a substitute frame, e.g., in a manner similar to that described with reference to FIGS. 5 and 9. The quality score may be reset for each substitute frame. However, if quality metrics that have been analyzed for a previous substitute frame are useful for the current substitute frame, they may be retained and reused. As one example, QP and CBP data, MV reliability data, or EC reliability data that have been determined for a particular reference frame used for interpolation or extrapolation of one substitute frame may be reused if the same reference frame is used for another substitute frame.

Quality score calculator 175 may be configured to generate an overall quality score for a candidate reference frame based on the outputs of one or more of objective metric checker 173, EC checker 181, QP checker 181, and CBP checker 183. In a manner similar to the process described with reference to FIGS. 5 and 9, the individual scores produced by objective metric checker 173, EC checker 181, QP checker 181, and CBP checker 183 may be constructed simply as high or low quality values, or high, medium or low quality values, or computed along numerous gradations or a substantially continuous scale. Quality score calculator 175 may accord equal or uneven weighting to each of the individual scores, e.g., such that the total quality score is a weighted summation of all of the scores.

The quality characteristics that are used to calculate the total score, e.g., objective metrics, EC characteristics, QP and CBP characteristics, may indicate whether the substitute frame is likely to produce an acceptable visual quality level when presented by display 170. Compare unit 177 may compare the total score to a quality threshold value. If the total score is satisfactory, e.g., meets or exceeds the quality threshold value, compare unit 177 indicates that the substitute frame has a level of quality that is acceptable for presentation by display 170. If the total score is less than the quality threshold value, then compare unit 177 determines that the substitute frame is not acceptable for presentation by display 170. In each case, analysis unit 168 may then proceed to analyze quality for selective display of the next substitute frame.

Even if the quality score indicates that quality is satisfactory, MV reliability checker 185 may be provided to determine whether motion vectors associated with one or more reference frames used to produce the substitute frame are reliable. MV reliability checker 185 may analyze the reliability of motion vectors in one or more reference frames to ensure that the selected reference frame(s) are likely to produce quality frame substitution results if frame substitution makes use of a motion-compensated prediction method for interpolation or extrapolation. If the motion vectors are reliable, MV reliability checker 185 may transmit an enable signal to control unit 170 to cause the substitute frame to be displayed by display 170. If the motion vectors are not reliable, however, MV reliability checker 185 may transmit a signal to control unit 172 so that the substitute frame is not displayed by display 170. Instead, control unit 172 may disable display of the substitute frame, such that display 170 may repeat a previous or future frame in place of the substitute frame.

Figure 15:
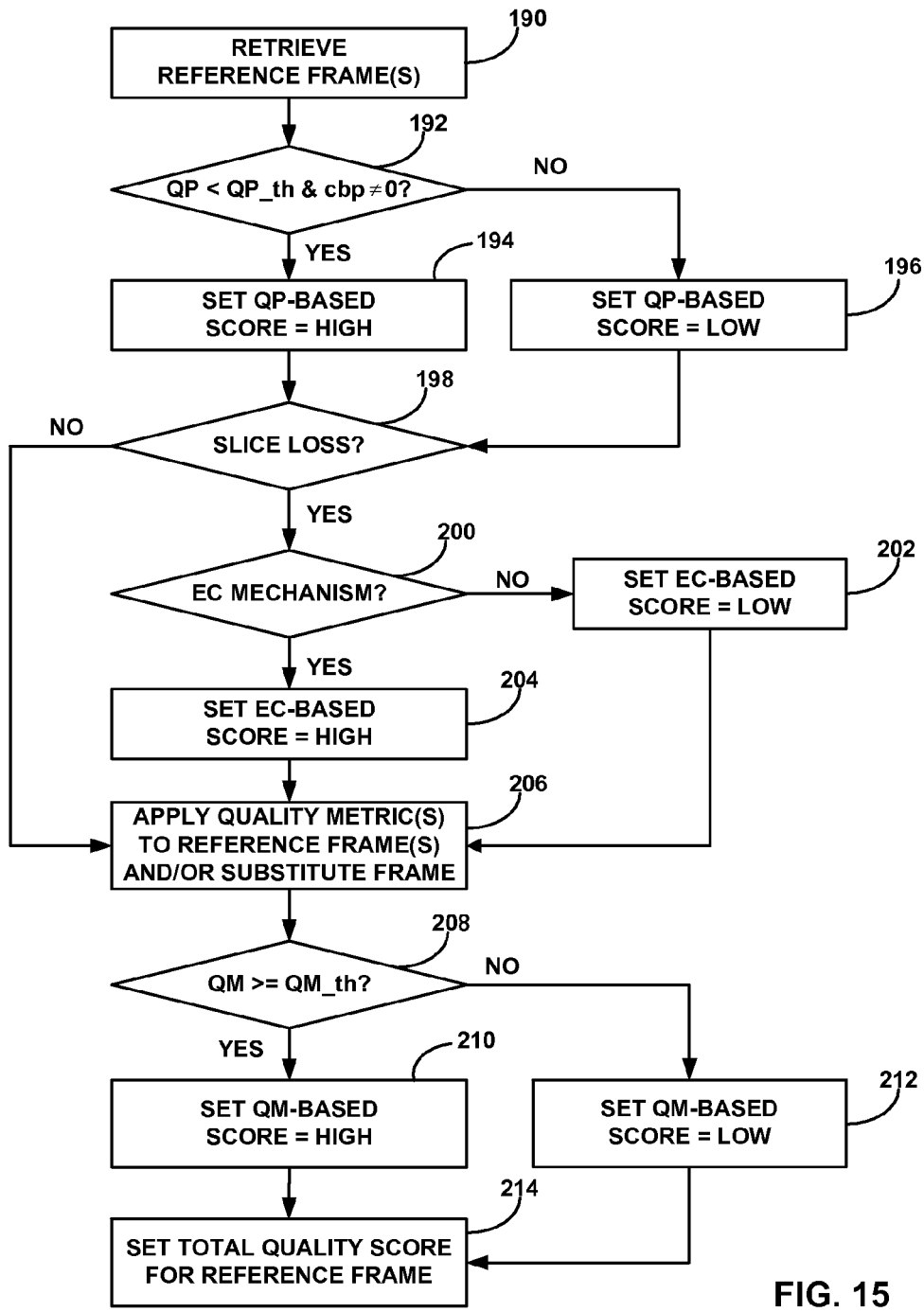
FIG. 15 is a flow diagram illustrating an example technique for generating quality scores to support selective display of substitute frames.

FIG. 15 is a flow diagram illustrating an example technique for generating quality scores to support selective display of substitute frames. The process of FIG. 15 may be similar to the process of FIG. 9. However, as described with reference to FIGS. 12-14, the scoring process may be used for selective display of substitute frames that have already been interpolated or extrapolated, instead of for selection of reference frames to perform interpolation or extrapolation. As shown in FIG. 15, in considering whether to display a substitute frame, analysis unit 168 may retrieve one or more reference frames used for interpolation or extrapolation to produce the substitute frame (190) from received frame buffer 160, and analyze the QP and CBP values for the reference frame. As in the example of FIG. 9, as shown in FIG. 15, analysis unit 168 may generate a combined QP-based score based on the QP and CBP values. If the QP value is less than an applicable QP threshold value (QP_th) and the CBP value is not equal to zero (192), analysis unit 168 sets a QP-based score for the frame to "HIGH" (194). If either the QP value is greater than or equal to the QP threshold value (QP_th) or the CBP value is approximately equal to zero (192), analysis unit 42 sets the QP-based score for the frame to "LOW" (196).

As further shown in FIG. 15, analysis unit 168 also may be configured to check the reference frame or frames for slice loss (198). With reference to FIG. 14B, slice loss checking may be performed by EC checker 179. If there is a slice loss, analysis unit 168 may determine whether an adequate error concealment (EC) mechanism is available to correct for the slice loss (200). If not, analysis unit 168 sets an EC-based score for the reference frame to "LOW" (202). If a reliable and adequate EC mechanism is available (124), analysis unit 168 sets the EC-based score to "HIGH" (204). In this case, if the lost slice can be reliably reproduced using the EC mechanism, the quality of the reference frame may indicate that the substitute frame is reliable. If the slice cannot be reproduced, however, the reference frame may indicate that the substitute frame could include erroneous information that should not be displayed.

Analysis unit 168 also may apply objective quality metrics to the reference frame(s) and/or the substitute frame (206). For example, analysis unit 168 may analyze the decoded and reconstructed version of the reference frame(s) to analyze any of a variety of objective metrics such as blockiness, blurriness, color bleeding or the like. In addition, analysis unit 168 may analyze the pixel domain values of the substitute frame. Hence, the objective metrics may be applied to the reference frame(s) and/or substitute frame in the pixel domain to evaluate visual quality. Analysis unit 168 may quantify each of the objective metrics to formulate a quality metric score QM. If the quality metric score QM is greater than or equal to an applicable quality metric threshold (QM_th) (208), analysis unit 168 sets a QM-based score for the substitute frame to "HIGH" (210). If the quality metric score QM is less than or equal to the quality metric threshold (QM_th), analysis unit 168 sets the QM-based score to "LOW" (212) for the substitute frame.

Analysis unit 168 may set a total quality score for the substitute frame (214) based on a combination of the QP-based score, the EC-based score and the QM-based score. The total quality score may be formulated according to a weighted summation of the QP-based score, the EC-based score and the QM-based score for the reference frame(s) and/or substitute frames, where analysis unit 168 may attribute different weights to each of the individual scores. The order in which the individual QP-based score, the EC-based score and the QM-based score are obtained may be different from the order shown in FIG. 15. In addition, the particular types of scores shown in FIG. 15 may be subject to variation. In general, analysis unit 168 may be configured to obtain quality scores that indicate a likelihood that a substitute frame will not undermine visual quality and will contribute a degree of visual quality enhancement that justifies the expenditure of additional resources to display the substitute frame.

Figure 16:
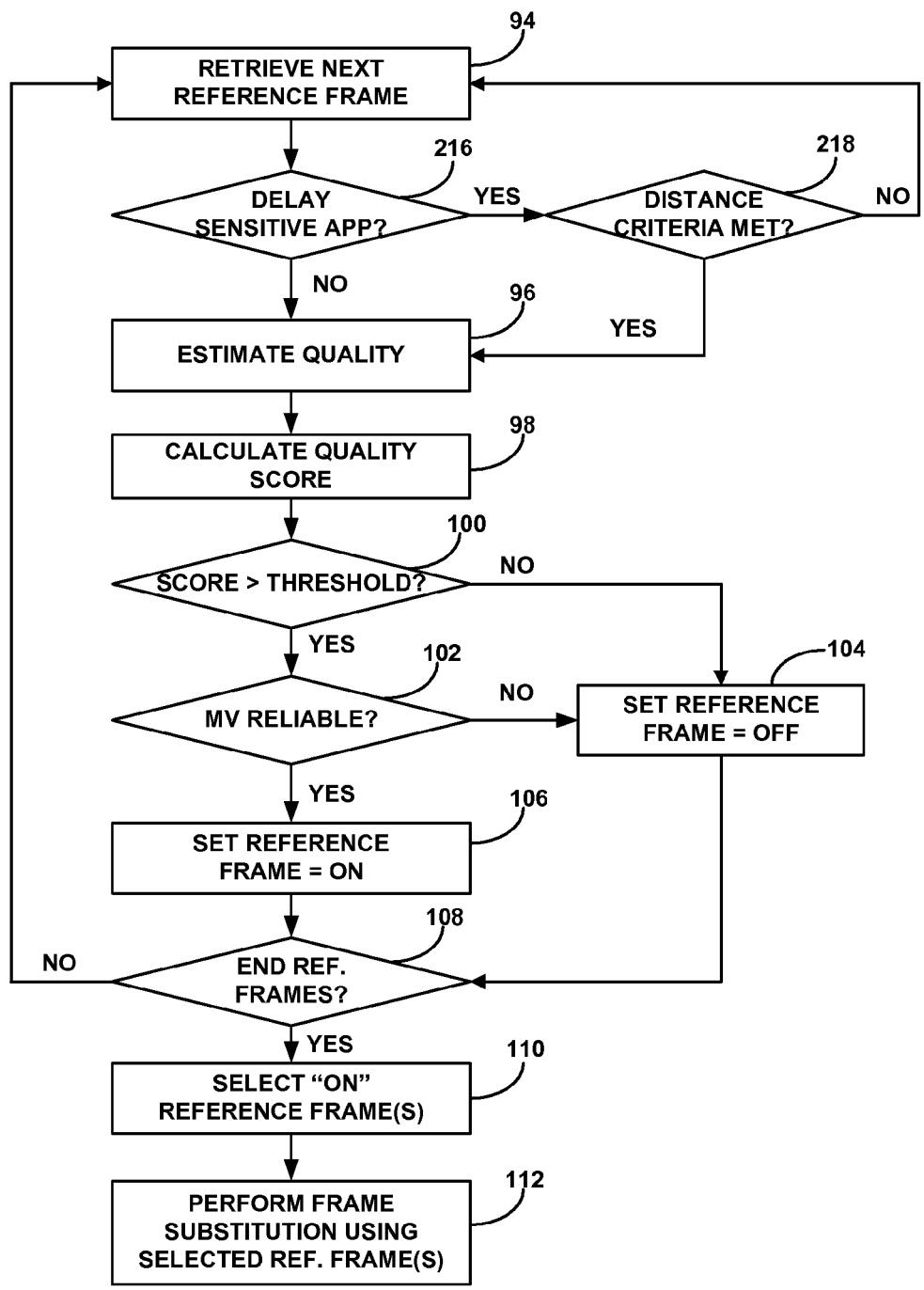
FIG. 16 is a flow diagram illustrating an example technique for quality analysis of reference video units to support reference video unit selection for video unit substitution when the video units support a delay-sensitive video application.

FIG. 16 is a flow diagram illustrating an example technique for motion and/or quality analysis of reference video units to support reference video unit selection for video unit substitution when the video units support a delay-sensitive video application. The flow diagram of FIG. 16 corresponds substantially to the flow diagram of FIG. 8, but further includes the operations of determining whether the video application supported by decoder 14 is a delay sensitive application (216), such as video telephony and, if so, determining whether applicable temporal distance criteria are met (218).

In the example of FIG. 16, when a candidate reference frame is retrieved (94), and a delay-sensitive application is detected (216), decoder 14 may determine whether the frame is a future frame relative to the frame to be added. If so, decoder 14 determines whether the distance of the future reference frame is less than a threshold distance. If the candidate reference frame is a previous frame or a future frame that is less than the threshold distance away from the frame to be added, the distance criteria are met (218). In some aspects, the distance may be expressed in terms of a number of frames separating the candidate reference frame and the frame to be added.

When the temporal distance criteria are met, decoder 14 may proceed with the quality analysis, e.g., as described with reference to FIG. 8 and shown in operations (96)-(112). If the distance criteria are not met, however, decoder 14 may proceed to remove the candidate reference frame from consideration as a reference frame for interpolation, and proceed to retrieve the next candidate reference frame (94) for consideration. Hence, the application of distance criteria for a delay-sensitive application may be subject to a variety of different implementations such as control of selection unit 44 (FIG. 4) to exclude particular reference frames based on temporal distance from the substitute frame, calculation of quality scores based in part on distance via distance unit 63 (FIG. 5), or control of analysis unit 42 to disable the quality analysis when the distance criteria are not met, e.g., as shown in FIG. 16.

In general, techniques for selecting reference frames for interpolation, as described in this disclosure, may provide a FRUC implementation that, in various aspects, may lower resource consumption by disabling frame substitution when not necessary or advantageous, and enhance the quality of interpolated frames by selecting good reference frame for use in frame substitution. Advantages of enhanced quality may be achieved by analyzing QP and CBP values, and selecting high quality reference frames based on this analysis, which may be especially useful in videos compressed with variable bit rate (VBR) control mechanisms.

In addition, enhanced quality may have achieved by not selecting frames with slice or frames losses as reference frames if there is no error concealment mechanism, or if the error concealment mechanism does not provide good quality frames. Avoidance of frames with slice or frame losses and inadequate error concealment may be especially useful when transmission losses occur such as in the case of video telephony applications. A resource-focused mode also may be effective in reducing power consumption, or consumption of other resources, while substantially maintaining objective and subjective video quality in low-motion video clips.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the disclosed techniques have been described. These and other aspects are within the scope of the following claims.

The invention claimed is:

1. A method comprising:
producing an interpolated or extrapolated video unit by a frame rate upconversion process;
analyzing one or more quality characteristics of the interpolated or extrapolated video unit produced by the frame rate upconversion process, wherein the one or more quality characteristics include one or more objective visual quality metrics; and
selectively disabling presentation of the interpolated or extrapolated video unit on a display based on the analysis.

2. The method of claim 1, wherein the interpolated or extrapolated video unit is an interpolated or extrapolated video frame.

3. The method of claim 1, wherein the one or more objective visual quality metrics include at least one of a blockiness metric, a blurriness metric, and a color bleeding metric.

4. The method of claim 1, further comprising disabling presentation of the interpolated or extrapolated video unit when the one or more quality characteristics do not satisfy a quality threshold.

5. The method of claim 1, wherein analyzing one or more quality characteristics of an interpolated or extrapolated video unit includes analyzing a pixel variance of a localized region of the interpolated or extrapolated video unit.

6. A video decoding device comprising:
means for producing an interpolated or extrapolated video unit by a frame rate upconversion process;
an analysis unit that analyzes one or more quality characteristics of the interpolated or extrapolated video unit produced by the frame rate upconversion process, wherein the one or more quality characteristics include one or more objective visual quality metrics; and
a control unit that selectively disables presentation of the interpolated or extrapolated video unit on a display based on the analysis.

7. The device of claim 6, wherein the interpolated or extrapolated video unit is an interpolated or extrapolated video frame.

8. The device of claim 6, wherein the one or more objective visual quality metrics include at least one of a blockiness metric, a blurriness metric, and a color bleeding metric.

9. The device of claim 6, wherein the control unit disables presentation of the interpolated or extrapolated video unit when the one or more quality characteristics do not satisfy a quality threshold.

10. The device of claim 6, wherein the device comprises a wireless communication device handset.

11. The device of claim 6, wherein the device comprises an integrated circuit device.

12. The device of claim 6, wherein analyzing one or more quality characteristics of an interpolated or extrapolated video unit includes analyzing a pixel variance of a localized region of the interpolated or extrapolated video unit.

13. A video decoding device comprising:
means for producing an interpolated or extrapolated video unit by a frame rate upconversion process;
means for analyzing one or more quality characteristics of the interpolated or extrapolated video unit produced by the frame rate upconversion process, wherein the one or more quality characteristics include one or more objective visual quality metrics; and
means for selectively disabling presentation of the interpolated or extrapolated video unit on a display based on the analysis.

14. The device of claim 13, wherein the interpolated or extrapolated video unit is an interpolated or extrapolated video frame.

15. The device of claim 13, wherein the one or more objective visual quality metrics include at least one of a blockiness metric, a blurriness metric, and a color bleeding metric.

16. The device of claim 13, the device further comprising means for disabling presentation of the interpolated or extrapolated video unit when the one or more quality characteristics do not satisfy a quality threshold.

17. The device of claim 13, wherein the means for analyzing one or more quality characteristics of an interpolated or extrapolated video unit includes means for analyzing a pixel variance of a localized region of the interpolated or extrapolated video unit.

18. A non-transitory computer-readable medium comprising instructions to cause one or more processors to:
produce an interpolated or extrapolated video unit by a frame rate upconversion process;
analyze one or more quality characteristics of the interpolated or extrapolated video unit produced by the frame rate upconversion process, wherein the one or more quality characteristics includes one or more objective visual quality metrics; and
selectively disable presentation of the interpolated or extrapolated video unit on a display based on the analysis.

19. The computer-readable medium of claim 18, wherein the interpolated or extrapolated video unit is an interpolated or extrapolated video frame.

20. The computer-readable medium of claim 18, wherein the one or more visual quality metrics include at least one of a blockiness metric, a blurriness metric, and a color bleeding metric.

21. The computer-readable medium of claim 18, the instructions further causing the one or more processors to disable presentation of the interpolated or extrapolated video unit when the one or more quality characteristics do not satisfy a quality threshold.

22. The computer-readable medium of claim 18, wherein the instructions to cause one or more processors to analyze one or more quality characteristics of an interpolated or extrapolated video unit produced by a frame rate upconversion process include instructions to cause one or more processors to analyze a pixel variance of a localized region of the interpolated or extrapolated video unit.

23. A method for selectively displaying interpolated or extrapolated video units, the method comprising:
producing an interpolated or extrapolated video unit by a frame rate upconversion process;
analyzing one or more characteristics associated with the interpolated or extrapolated video unit produced by the frame rate upconversion process, wherein the one or more characteristics include one or more quality characteristics of one or more reference video units used to generate the interpolated or extrapolated video unit, and wherein the quality characteristics include at least one of a quantization parameter value, a coded block pattern value, and a number of non-zero transform coefficients; and selectively disabling presentation of the interpolated or extrapolated video unit on a display based on the analysis.

24. The method of claim 23, wherein analyzing one or more characteristics associated with an interpolated or extrapolated video unit includes analyzing an average code block pattern value for blocks of a reference video unit.

25. A video decoding device comprising:
means for producing an interpolated or extrapolated video unit by a frame rate upconversion process;
an analysis unit that analyzes one or more characteristics associated with the interpolated or extrapolated video unit produced by the frame rate upconversion process, wherein the one or more characteristics include one or more quality characteristics of one or more reference video units used to generate the interpolated or extrapolated video unit, and wherein the quality characteristics include at least one of a quantization parameter value, a coded block pattern value, and a number of non-zero transform coefficients; and
a control unit that selectively disables presentation of the interpolated or extrapolated video unit on a display based on the analysis.

26. The device of claim 25, wherein analyzing one or more characteristics associated with an interpolated or extrapolated video unit includes analyzing an average code block pattern value for blocks of a reference video unit.

27. A video decoding device comprising:
means for producing an interpolated or extrapolated video unit by a frame rate upconversion process;
means for analyzing one or more characteristics associated with the interpolated or extrapolated video unit produced by the frame rate upconversion process, wherein the one or more characteristics include one or more quality characteristics of one or more reference video units used to generate the interpolated or extrapolated video unit, and wherein the quality characteristics include at least one of a quantization parameter value, a coded block pattern value, and a number of non-zero transform coefficients; and
means for selectively disabling presentation of the interpolated or extrapolated video unit on a display based on the analysis.

28. The device of claim 27, wherein the means for analyzing one or more characteristics associated with an interpolated or extrapolated video unit includes means for analyzing an average code block pattern value for blocks of a reference video unit.

29. A non-transitory computer-readable medium comprising instructions to cause one or more processors to:
produce an interpolated or extrapolated video unit by a frame rate upconversion process;
analyze one or more characteristics associated with the interpolated or extrapolated video unit produced by the frame rate upconversion process, wherein the one or more characteristics include one or more quality characteristics of one or more reference video units used to generate the interpolated or extrapolated video unit, and wherein the quality characteristics include at least one of a quantization parameter value, a coded block pattern value, and a number of non-zero transform coefficients; and
selective disabling presentation of the interpolated or extrapolated video unit on a display based on the analysis.

30. The computer-readable medium of claim 29, wherein the instructions to cause one or more processors to analyze one or more characteristics associated with an interpolated or extrapolated video unit include instructions to cause one or more processors to analyze an average code block pattern value for blocks of a reference video unit.

* * * * *